(12) United States Patent
Hayes et al.

(10) Patent No.: US 11,503,079 B2
(45) Date of Patent: *Nov. 15, 2022

(54) NETWORK SECURITY SYSTEM USING STATISTICAL OBJECT IDENTIFICATION

(71) Applicant: Blue Armor Technologies, LLC, Houston, TX (US)

(72) Inventors: John William Hayes, Clearwater Beach, FL (US); Charles Andrew Gram, Reno, NV (US)

(73) Assignee: Blue Armor Technologies, LLC, Houston, TX (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/353,117

(22) Filed: Jun. 21, 2021

(65) Prior Publication Data

US 2021/0314366 A1 Oct. 7, 2021

Related U.S. Application Data

(63) Continuation of application No. 15/998,262, filed on Jul. 24, 2018, now Pat. No. 11,095,687, which is a continuation-in-part of application No. 14/544,987, filed on Mar. 11, 2015, now abandoned, which is a continuation-in-part of application No. 13/987,747, filed on Aug. 27, 2013, now abandoned, which is a continuation-in-part of application No. 13/373,586, filed on Nov. 18, 2011, now Pat. No. 8,572,697.

(51) Int. Cl.
*H04L 29/06* (2006.01)
*G06F 17/00* (2019.01)
*H04L 9/40* (2022.01)
*H04L 69/22* (2022.01)
*H04L 69/163* (2022.01)

(52) U.S. Cl.
CPC .......... *H04L 63/20* (2013.01); *H04L 63/0485* (2013.01); *H04L 63/101* (2013.01); *H04L 69/163* (2013.01); *H04L 69/22* (2013.01)

(58) Field of Classification Search
CPC ... H04L 63/20; H04L 63/0485; H04L 63/101; H04L 63/163; H04L 69/22
See application file for complete search history.

(56) References Cited

U.S. PATENT DOCUMENTS

| 2004/0098619 | A1* | 5/2004 | Shay | H04L 63/02 713/153 |
| 2005/0094637 | A1* | 5/2005 | Umesawa | H04L 63/04 370/389 |
| 2006/0236370 | A1* | 10/2006 | John | H04L 61/00 726/1 |

(Continued)

*Primary Examiner* — Darshan I Dhruv
(74) *Attorney, Agent, or Firm* — Crain, Caton & James, P.C.; James E. Hudson, III

(57) ABSTRACT

Apparatus to enforce network policy based on identity authentication at a network endpoint device by offloading the authentication to a network attached authentication devices is disclosed. The authentication device may use Statistical Object Identification to perform the authentication. The present disclosure greatly reduces the resources needed by the network endpoint device to perform the authentication and eliminates the topological restrictions found in traditional network appliance based approaches.

4 Claims, 63 Drawing Sheets

(56) References Cited

U.S. PATENT DOCUMENTS

| | | | |
|---|---|---|---|
| 2009/0063665 A1* | 3/2009 | Bagepalli | H04L 63/0428 710/100 |
| 2011/0091066 A1* | 4/2011 | Alattar | H04N 1/32283 382/100 |
| 2013/0024684 A1* | 1/2013 | Chunduri | H04L 63/166 713/151 |
| 2013/0332982 A1* | 12/2013 | Rao | H04L 63/0892 726/1 |

* cited by examiner

PRIOR ART

PRIOR ART

PRIOR ART

PRIOR ART

PRIOR ART

PRIOR ART

Figure 28

| Identity | Dest IP Address | Dest Port | Protocol | Group | Rule |
|---|---|---|---|---|---|
| John | 121.34.22.15 | any | any | eng | allow |
| Mark | 121.34.21.100 | 80 | any | corp | redirect to port 799 |
| any | 121.34.22.120 | any | any | any | drop |
| none | any | any | any | any | drop |

Figure 29

| Session | Network Interface | Identity | Context Info | Auth Processing Info |
|---------|-------------------|----------|--------------|----------------------|
| 281 | eth0 | Mike | 1243 | eng |
| 785 | eth1 | John | CD1A | corp |
| 202 | eth0 | Mike | DC32 | any |
| 491 | eth0 | Dave | BBA3 | any |

28

30

Remote System has a copy of each Certificate that is expected to be used

Problem: A Certificate is too big to send the Remote System in its original form The Solution:
Create a representation of each Certificate, called a Cryptographic Hash, which is only 32 bits long, and send to the Remote System The Solution, in Greater Detail Remote System receives Ben's communication Accumulated Statistical Object Selector Original Object Identifier

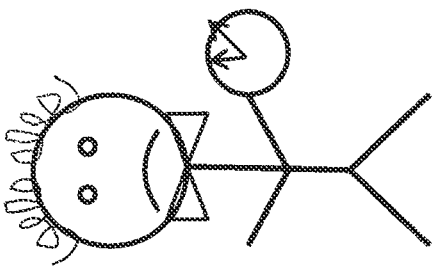
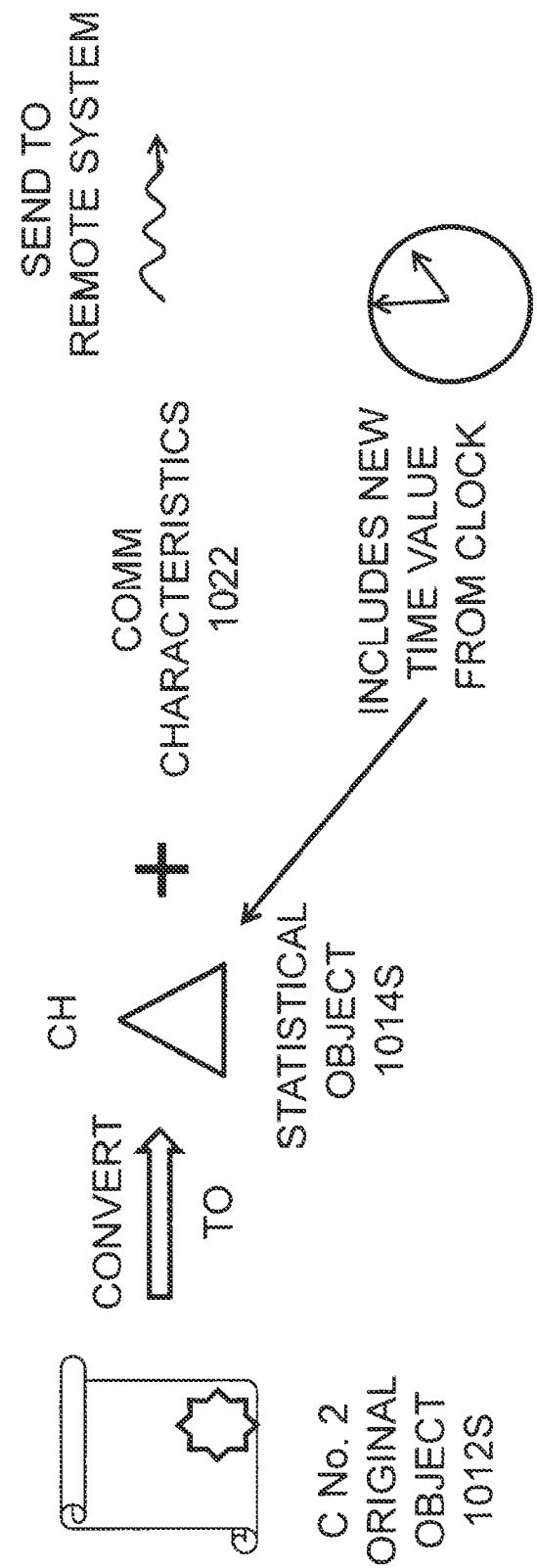
Figure 46
Ben's first communication fails.
Ben does not receive response to his first communication to the Remote System, so he tries again.

A match is found.

Greg & Sally are discarded!

NETWORK SECURITY SYSTEM USING STATISTICAL OBJECT IDENTIFICATION

CROSS-REFERENCE TO RELATED APPLICATIONS

This application is a continuation of U.S. patent application Ser. No. 15/998,262, filed Jul. 24, 2018, for Network security system using statistical object identification, which is a continuation-in-part of U.S. patent application Ser. No. 14/544,987, filed Mar. 11, 2015, for Method for network security using statistical object identification, now abandoned, which is a continuation-in-part of U.S. patent application Ser. No. 13/987,747, filed Aug. 27, 2013, for Method for statistical object identification, now abandoned, which is a continuation-in-part of U.S. patent application Ser. No. 13/373,586, filed Nov. 18, 2011, for Method for statistical object identification, issued Oct. 29, 2013 as U.S. Pat. No. 8,572,697.

STATEMENT REGARDING FEDERALLY SPONSORED RESEARCH OR DEVELOPMENT

Not Applicable.

BACKGROUND

Field

The present disclosure pertains to apparatus for efficiently and securely authenticating the identity of network traffic in arbitrary network topologies using statistical object identification.

Background

Organizations that use computers and computer networks continue to work on improving the security of both the networks and the computers themselves. Some security technologies are most effective when implemented directly on the computer. Historically, some security functions have been deployed as network devices, to allow a single device to provide security for multiple computers. Each of these approaches has pros and cons.

For security technologies deployed directly on each computer, called an "endpoint solution," the technology uses the resources of the endpoint computer including CPU processor cycles, memory and network bandwidth. For some security technologies, this use of endpoint resources can be substantial. Additionally, some security technologies require the distribution of cryptographic keys to every participating entity. When keys are widely distributed, the protection of those keys becomes more difficult to maintain.

In large organizations, often with many independent departments, networks and computer services may be added and organically grown without centralized planning, leading to network resources being deployed somewhat arbitrarily throughout the network. These network resources may have multiple network interfaces. When attempting to enforce network security policies, the lack of planning often leads to a lack of achievable policy enforcement points that do not adversely impact network and resource performance without the wholesale re-architecture of the network and the redeployment of the network resources. This can be exceedingly costly, in both dollars and time.

For policy enforcement points and security technologies deployed on a network appliance, the appliance may become a bottleneck and impact the performance of traffic flowing through it. Network security appliances also have a network topology requirement that the traffic must pass through the appliance for it to provide any security functions. For computers communicating with one another on a single LAN or network subnet, this topology requirement is often unachievable. When a computer has multiple network interfaces, this further complicates the network topology and complicates consistent implementation of security functions.

FIG. 1 illustrates an analogy relating to computer and network security as explained by a cargo operation at an airport A. A cargo truck B makes several trips every day from a warehouse to the airport cargo area H. Each trip, the cargo truck B must stop at the airport cargo security building D.

As shown in FIG. 2, during the first trip of the day, the cargo truck B is directed to the cargo truck authentication building F. The cargo truck B drives to the cargo truck authentication building F, where the identity of the driver of the cargo truck is authenticated and checked to see if that driver is allowed to proceed to the airport cargo area H.

As shown in FIG. 3, when it is determined that the cargo truck B is allowed to go to the cargo area H, the cargo truck B is given a day pass, and is then sent back to the airport cargo security building D. The cargo truck B presents the day pass, and is then allowed to proceed to the airport cargo area H where it delivers its cargo.

As shown in FIG. 4, if the cargo truck B makes another trip on the same day, it can present the day pass at the airport cargo security building D and then proceed directly to the airport cargo H. The next day, the cargo truck B must repeat the procedure to obtain a new day pass. This allows a single cargo truck authentication building F to issue day passes for multiple airport cargo security buildings D, increasing the efficiency of each of the airport cargo security buildings D. Although different in the identities used, the authentication mechanisms employed and the resources protected, this is analogous to one embodiment of the present disclosure.

A second analogy that may be employed to explain the background of one embodiment of the present disclosure is a set of buildings N protected by a security office P, which is shown in FIG. 5. The security officer's P job is to inspect the driver's license, the identity, of each person that enters the building N and determine if they have business in the building N before letting them proceed. If the building N does not get many visitors, then the security officer P will not be very busy.

To get better use from the security officer P, security camera's Q are placed at the entrance of some of the buildings N, as shown in FIG. 6. A security officer P is no longer needed at the buildings N with the security camera. The security officer P can see a person arriving at the building N and the identity in the form of a driver's license as an image S on a security monitor R.

Once the person has proven who they are and the security officer P has determined that they have business in the building N, the security officer P sends a door unlock signal T to open the door and let the person in, as shown in FIG. 7. Although different in the identities used, the authentication mechanisms employed and the resources protected, this analogy illustrates the background of the present disclosure.

An apparatus that would enable endpoint security that utilizes a security appliance that does not require that the appliance to be in the network data path would constitute a major technological advance, and would satisfy long felt needs and aspirations in the cyber security industry.

SUMMARY

The present disclosure provides an apparatus for authenticating an identity of network traffic using a network endpoint device, the network endpoint device having a hardware processor, which includes the network endpoint device and an authentication device, the network endpoint device including a TCP/IP protocol stack and an authenticated session table, the network endpoint device also for receiving an IP packet, the IP packet including a TCP header, the TCP header not including a TCP SYN bit, the authenticated session table for matching the IP packet to a session descriptor, the network endpoint device also for conveying the IP packet to the TCP/IP protocol stack, the authentication device including a network interface and a peering service, the peering service including an identity recognizer and a first table of policy rules, the authentication device for performing authentication, the authentication device for creating information to be conveyed to the network endpoint device and stored in the session descriptor, the authentication device using statistical object identification to perform authentication, the statistical object identification process requiring an exact match of the statistical object being evaluated, an accumulated statistical object produced by the statistical object identification process, the statistical object identification process calculating the probability of guessing the accumulated statistical object, and the statistical object identification process requiring the calculated probability to exceed a threshold.

BRIEF DESCRIPTION OF THE DRAWINGS

FIG. 28 is a depiction of one embodiment of the present disclosure, showing a first table of policy rules.

FIG. 29 is a depiction of one embodiment of the present disclosure, showing an authenticated session table.

FIG. 46 shows that Ben's first communication has failed to be authenticated.

DETAILED DESCRIPTION

I. Overview of One Embodiment the Disclosure

Figure 1:
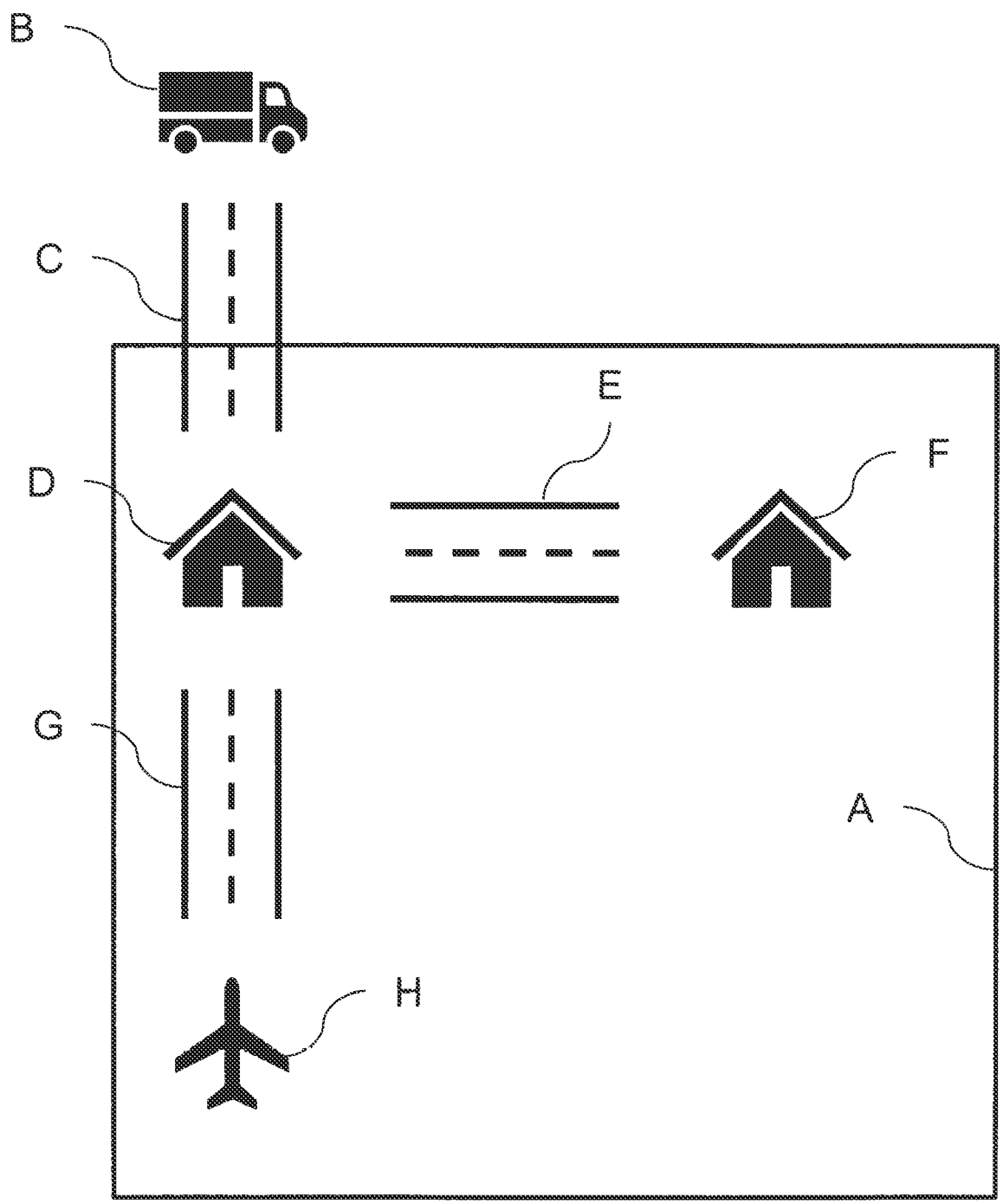
FIG. 1 is an illustration of security operations at a cargo airport.
Figure 2:
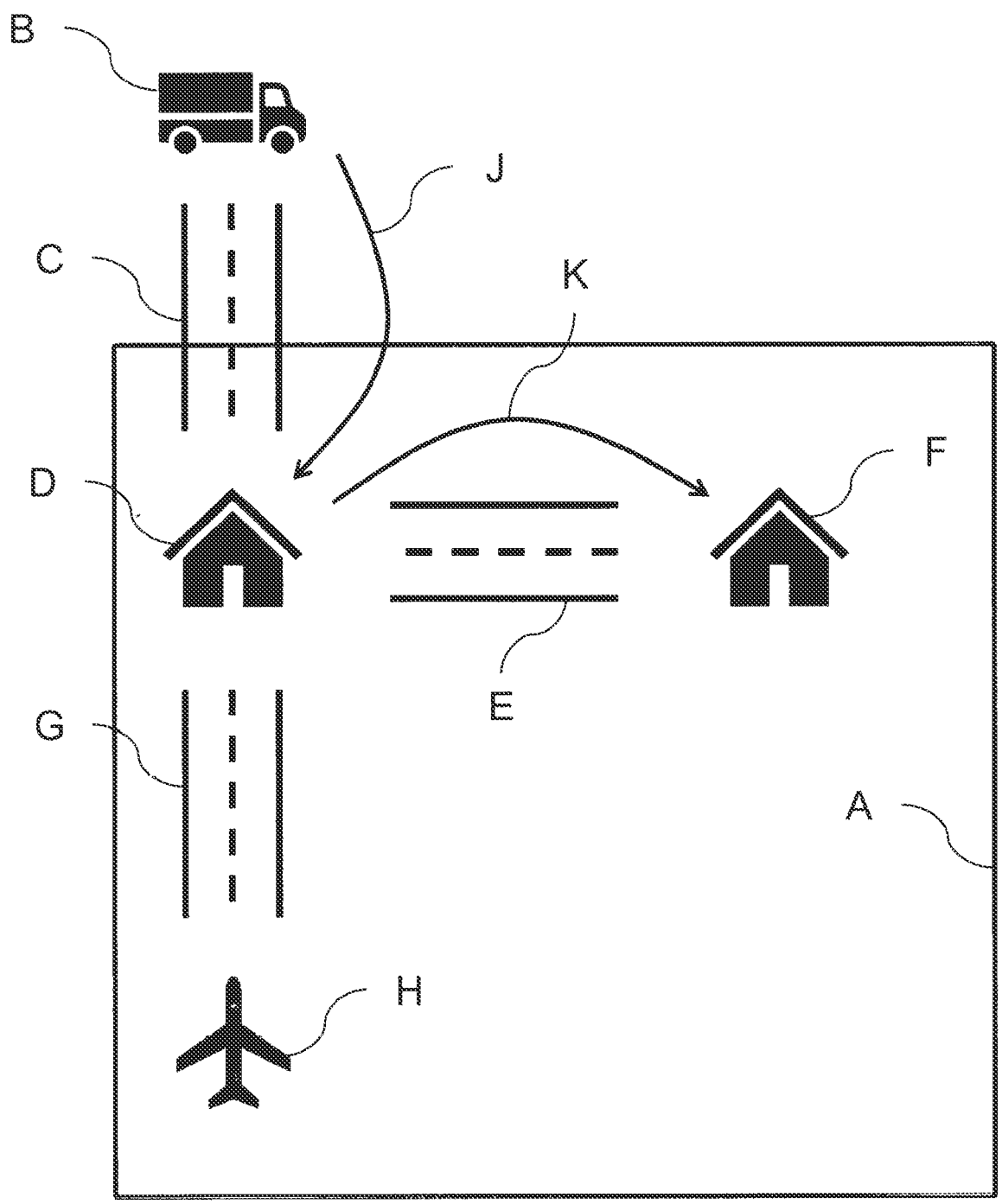
FIG. 2 is an analogy of one embodiment of the present disclosure.
Figure 3:
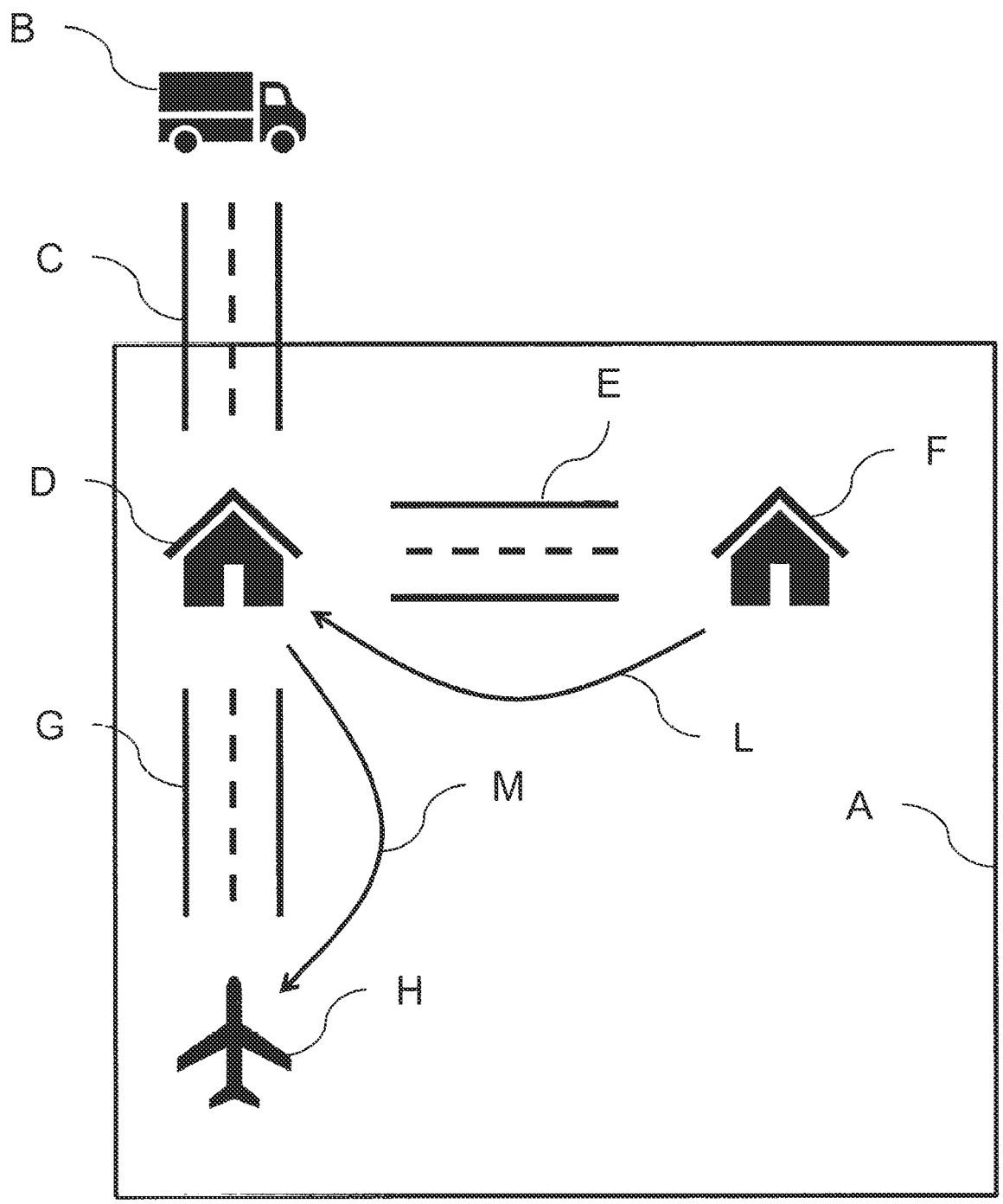
FIG. 3 is an analogy of one embodiment of the present disclosure.
Figure 4:
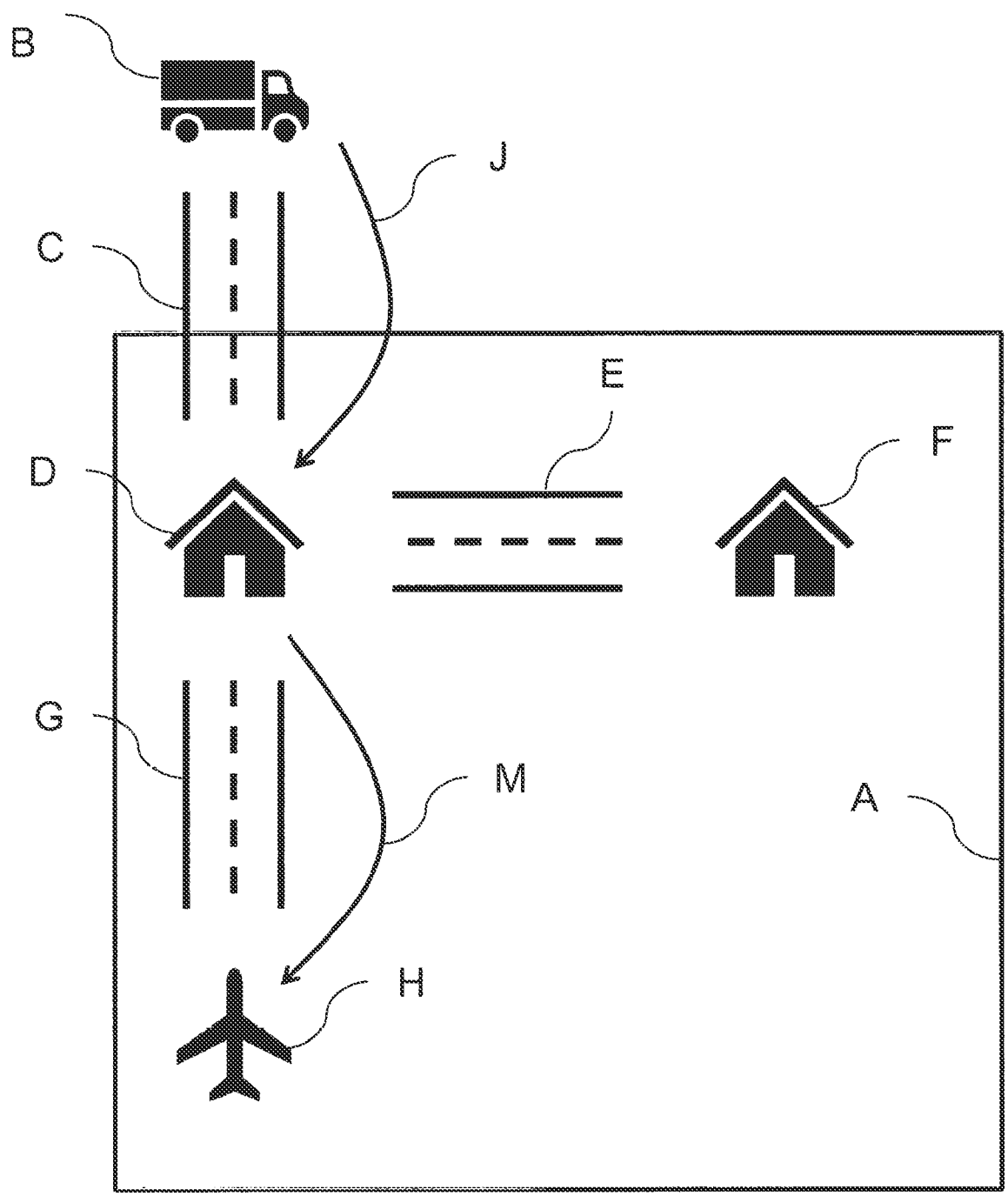
FIG. 4 is an analogy of one embodiment of the present disclosure.
Figure 5:
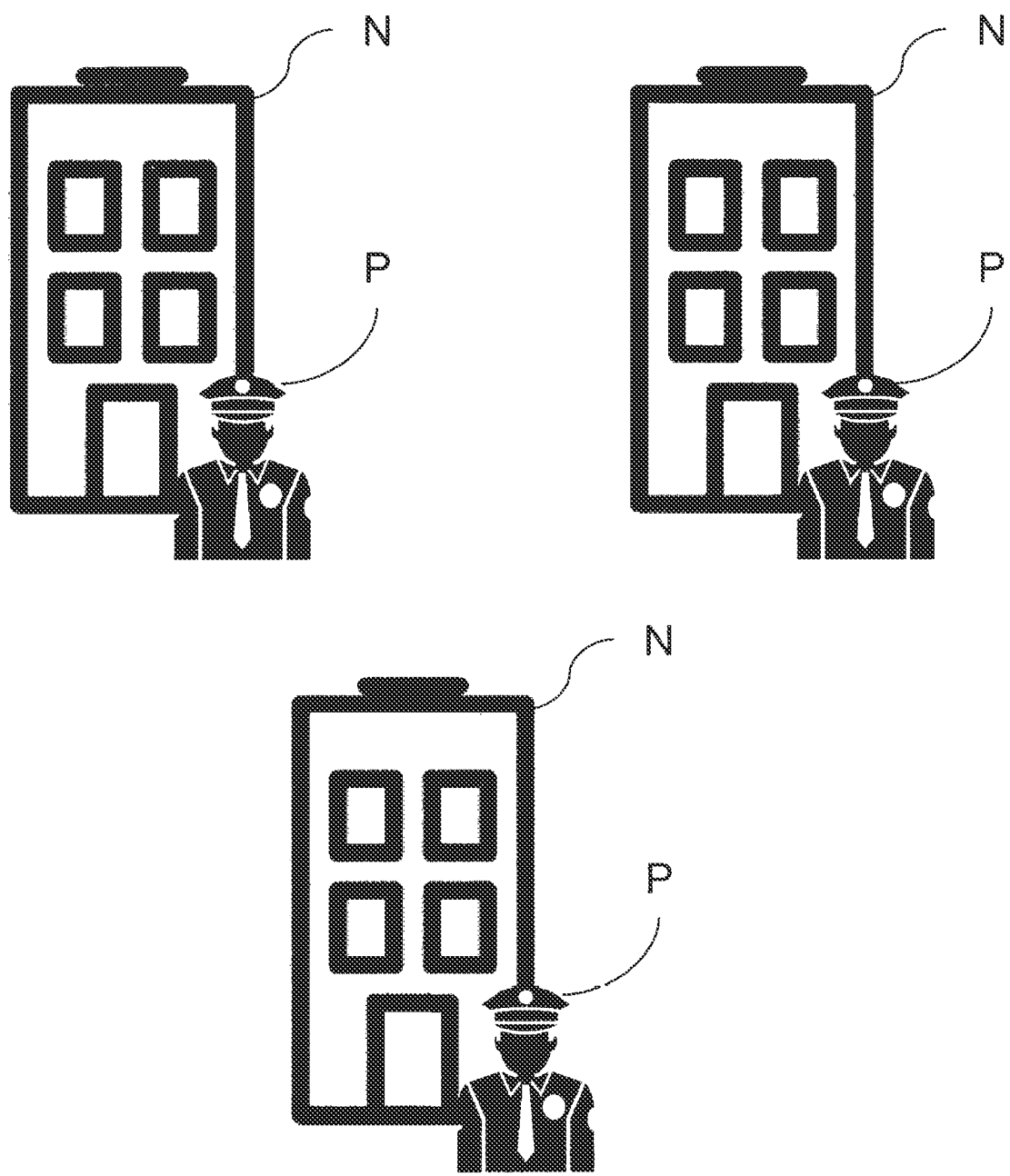
FIG. 5 is an illustration of three buildings and three security officers.
Figure 6:
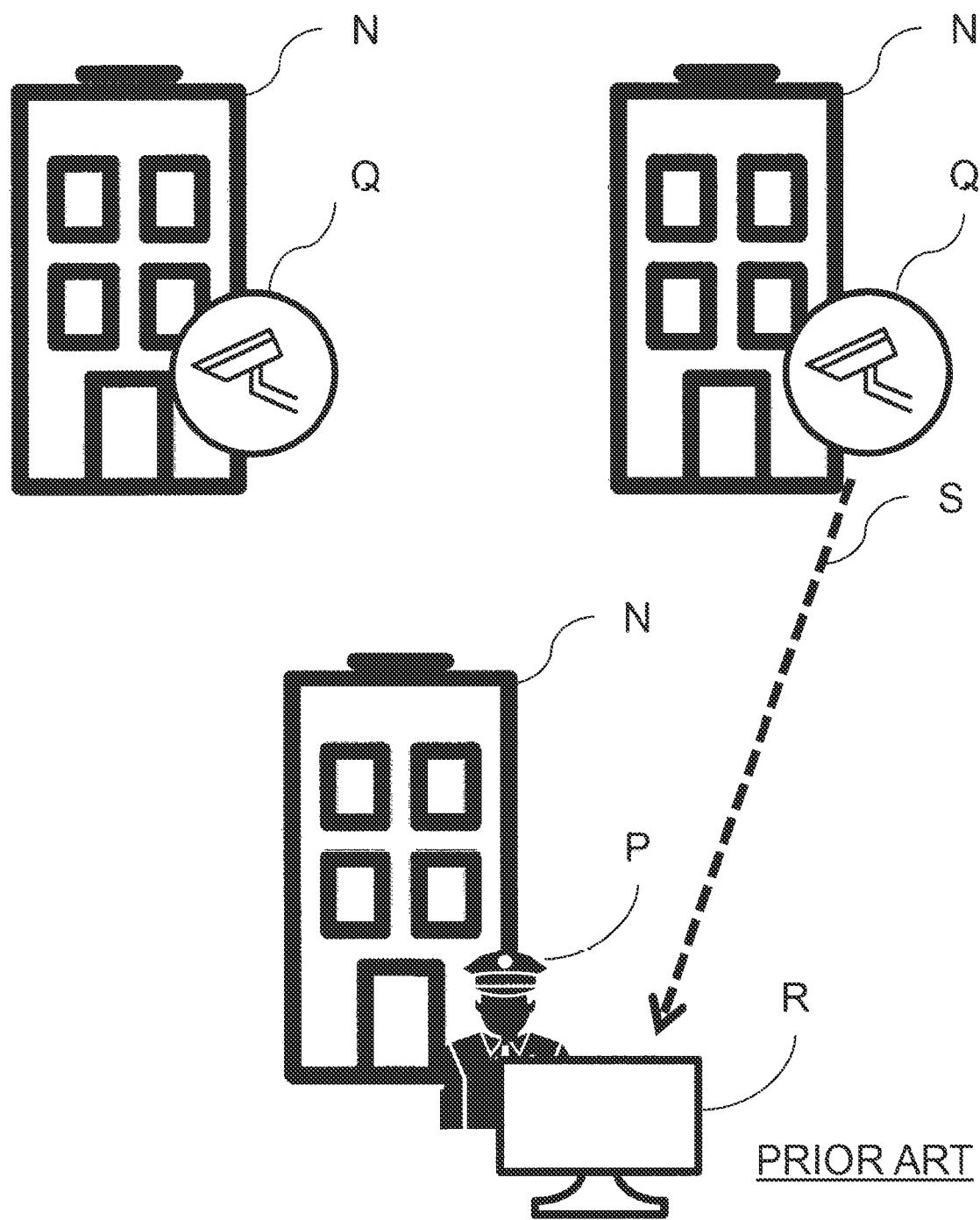
FIG. 6 is an analogy of one embodiment of the present disclosure.
Figure 7:
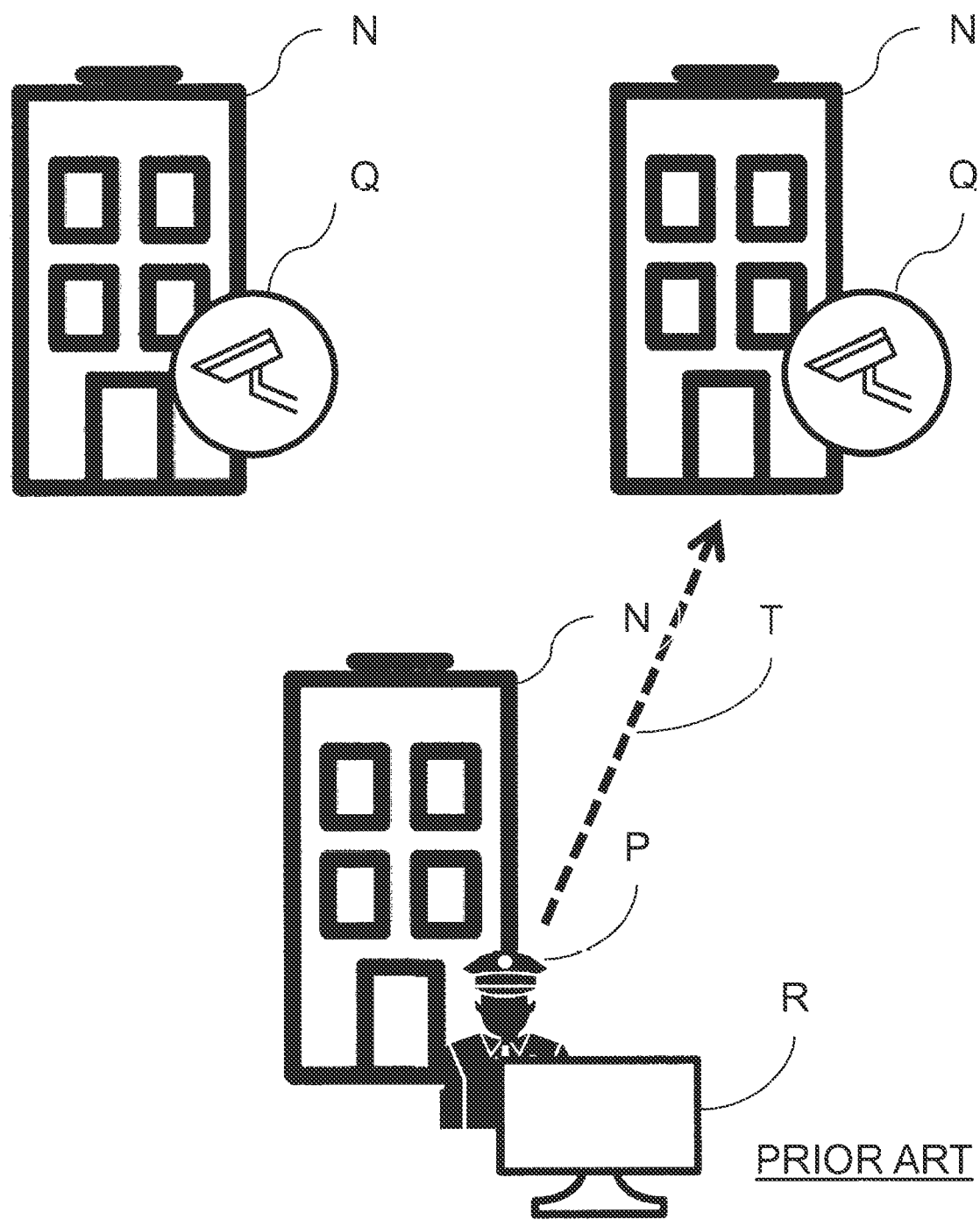
FIG. 7 is an analogy of one embodiment of the present disclosure.
Figure 8:
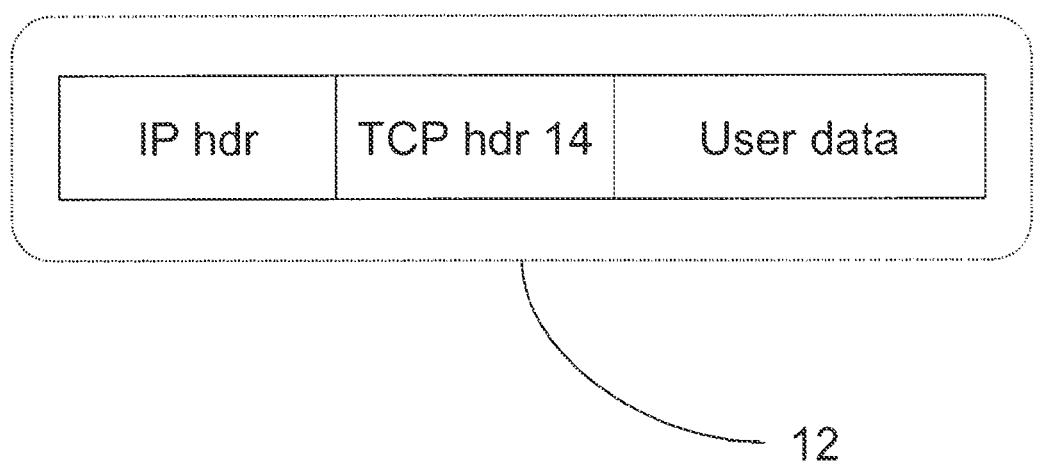
FIG. 8 is an illustration of an IP packet.

One embodiment of the present disclosure provides an apparatus for enforcing network policy based on identity authentication at a network endpoint device 10 by offloading the authentication process to a remote authentication device 18. An IP packet is shown in FIG. 8. By only sending those IP packets 12 that may contain identity 22 information to the authentication device 18, the network traffic flow between the remote network device 11 and the network endpoint device 10 is maintained once the TCP session initiation has been authenticated. This is particularly important when both the network endpoint device 10 and the remote network device 11 are located on the same LAN segment or network subnet, as traffic between two devices on the same LAN or subnet often directly communicate with each other, their traffic being processed by a local network switch. In this environment, known as a peering environment, it is often not possible to have a network appliance performing security functions such as authentication in the traffic path.

One embodiment of the present disclosure allows the use of an authentication device 18 without requiring that it is inserted directly into the network traffic path between two peering devices, hence the name of Peer Authentication.

The various embodiments of the present disclosure are directed to specific improvements to the way computers and networks operate. The various embodiments and implementations of the disclosures described in this Specification provide benefits to end users that are not generally obtainable using conventional devices or other systems.

The present disclosure improves the functioning of computer hardware, software and/or networks, and improves an existing technological process. The present disclosure does not merely utilize a generalized computer as a tool, but, rather, improves upon conventional computer functionality, and is directed to a specific improvement to the way computers and networks operate.

Figure 9:
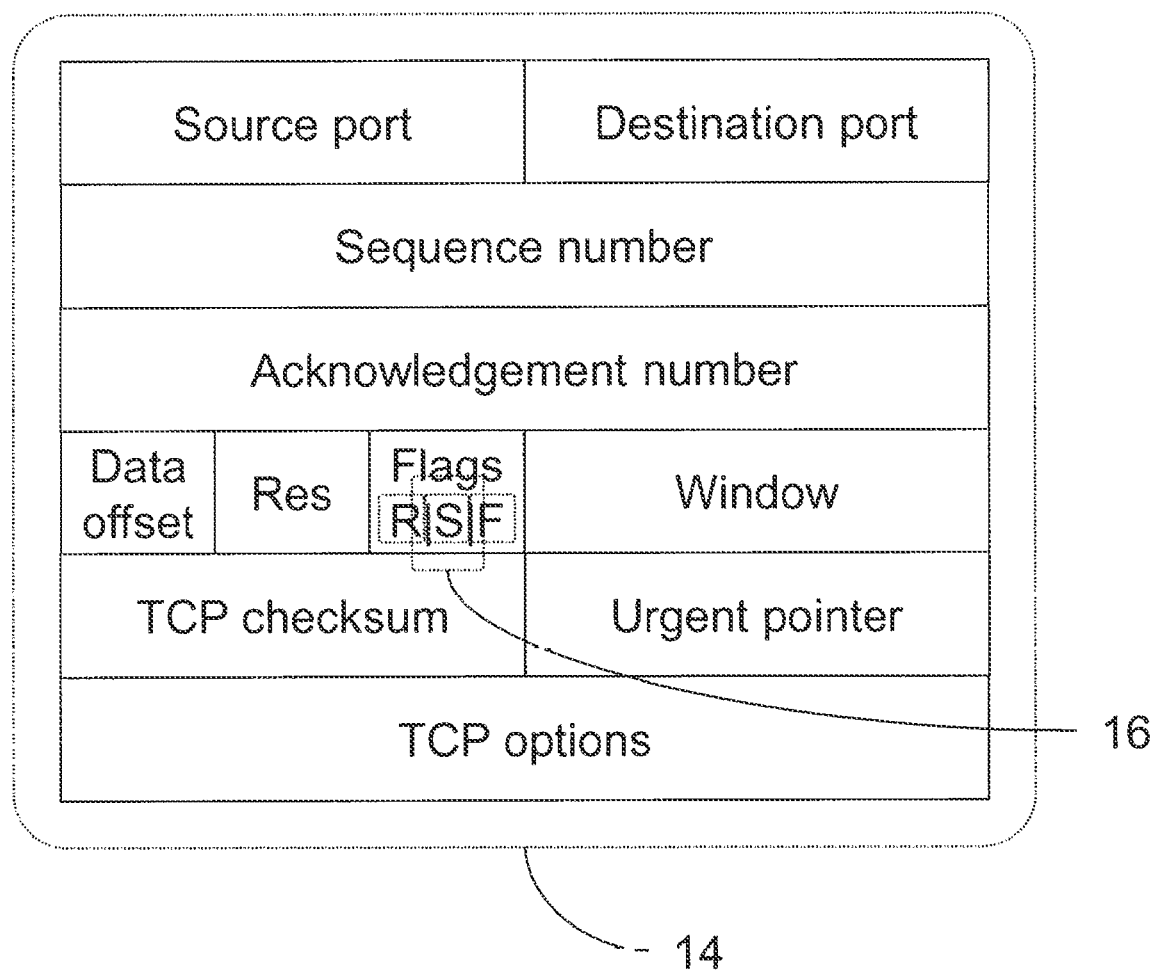
FIG. 9 is an illustration of a TCP header.

When a network endpoint 10 receives an IP packet 12 with a TCP header 14 with the TCP SYN bit set 16, this indicates that a remote network device 11 is requesting the establishment of a TCP session. A TCP header 14 is shown in FIG. 9. The sender, in this case the remote network device 11, can be authenticated using a process called Transport Access Control (TAC). When a large number of identities 22 are in use, the TAC process may consume a large number of compute and memory resources. To prevent the TAC process from consuming a large number of compute and memory resources on every network endpoint device 10, the TAC process can be offloaded to an authentication device 18. This authentication device 18 can process authorization requests from many network endpoint devices 10.

Other authentication mechanisms may employ statistical object identification (SOI) to perform the authentication. Similarly to TAC, when large numbers of identities 22 are in use, the SOI process may consume a large number of compute and memory resources. The SOI processes can be offloaded to an authentication device 18 which performs authentication on behalf of many network endpoint devices 10.

When a network endpoint 10 receives an IP packet 12 requesting the establishment if a TCP session, the request is sent to an authentication device 18. After authenticating the IP packet 12, the authentication device 18 returns the IP packet with any additional information needed for processing and the IP packet 12 is delivered to the TCP/IP protocol stack 32, establishing the TCP session. Subsequent IP packets 12 that are part of the same TCP session are delivered directly to the TCP/IP protocol stack 32.

Figure 15:
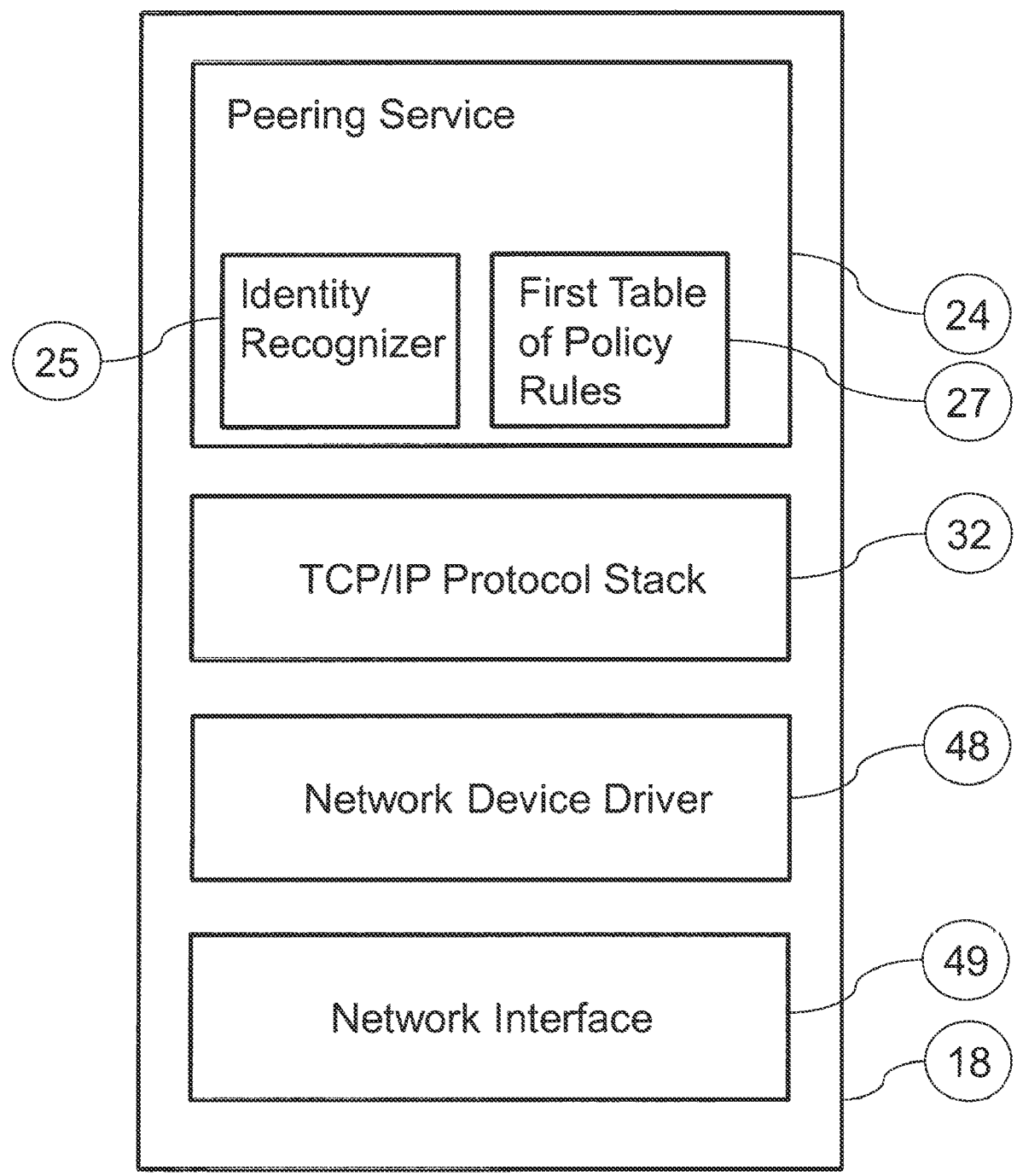
FIG. 15 is an architectural depiction of one embodiment of the present disclosure in an authentication device.

In a preferred embodiment, which is illustrated in FIG. 15, the peer authentication driver 46, which resides between the TCP/IP protocol stack 32 and the network device driver 48, may be assisted by a peer authentication management application 44. The peer authentication management application 44 is an application that establishes secured communications between the network endpoint device 10, the authentication device 18, and the peer authentication driver 46. The peer authentication management application 44 conveys the network endpoint's Identity to the authentication device. A preferred mechanism for conveying this Identity is to establish a secure tunnel to the authentication device 18 and using the network endpoint's 10 X.509 certificate to establish the secure tunnel. The peer authentication management application 44 is responsible for communicating IP packets 12, policy rules 26 and other information between these entities.

II. Statistical Object Identification

Statistical Object Identity (SOI) is described in U.S. Pat. No. 8,572,697, entitled Method for Statistical Object Identification, and in U.S. Ser. No. 13/987,747, entitled Method for Statistical Object Identification. The Applicants hereby incorporate both of these documents by reference.

One limitation of current information networks is that it is difficult to verify or approve a communication before the communication has been allowed to penetrate a network. One reason for this difficulty is that the means of IO verification, which is called a "certificate," is too large to send to the network in the initial set of digital information which initiates the communication, and which ultimately leads to an authentication.

Statistical Object Identity (SOI) solves this problem by reducing the information in the certificate which is used to authenticate the communication before it is allowed to proceed by converting the certificate to a much smaller "statistical object." SOI allows the network to determine the identity of the initiator of the communication before the communication is given access to the network. This method provides a security feature that substantially eliminates potentially detrimental and malicious attacks that could be perpetrated on the network using conventional technology.

SOI operates by using an identity certificate as an original object and using a sender to communicate a stream of statistical objects, based on the original object, to a communications receiver. The communications receiver aggregates the received statistical objects until an original object is unambiguously determined and the calculated probability satisfies a trusted probability threshold. If the communications receiver fails to unambiguously determine the original object or if the calculated probability fails to satisfy the probability threshold, the original object, the identity, is not recognized. An indication is made to communicate the identity determined by SOI or an indication is made to communicate of the lack of identity.

A detailed description of the operation of SOI begins in Section IX.

III. Transport Access Control

Transport Access Control (TAC) is described in U.S. Pat. No. 8,346,951, entitled Method for First Packet Authentication. The Applicants hereby incorporate this document by reference.

TAC provides a mechanism to authenticate a network connected device on the first packet of a TCP session request. TAC enables a network connected device to authorize a received TCP connection request without relying solely on an initiator's IP address. If the authorization is successful, then the connection establishment process is continued. If the authorization fails, the request is "blackholed," even though there is an application associated with the TCP port in the connection request. This protects against TCP port scanning and network reconnaissance.

The authentication mechanism uses various fields in the IP and TCP headers in the TCP connection request. All of these fields have a primary function that is defined in the IP and TCP specifications. The use of existing fields to pass an authentication key is necessary because the TCP protocol specification does not provide a mechanism to pass user data on a TCP connection request.

The goal of TAC is to enable an authentication mechanism that functions using only the fields in the IP and TCP headers that are normally present in the TCP connection establishment request. Within the IP and TCP headers there are fields that have strictly defined meanings that do not allow any additional encoding because this would alter the functionality of the IP and/or TCP protocols. Examples of such fields are the Source Address, Destination Address, Checksum, Source Port and Destination Port fields.

Within the TCP header, on a connection request (TCP-SYN), the Sequence Number (SEQ) field specifies the starting sequence number for which subsequent data octets are numbered. The TCP specification recommends that this number be randomly generated.

A remote network device 11 (TCP session initiator) generates an authentication key, now called an identity token. The initiator then sends a TCP connection request, inserting the authentication key in the SEQ field of the TCP header 14, to the desired network connected device. The receiving device, upon receiving the connection request, extracts the authentication key. The receiving device then processes the authentication key to authenticate it.

TAC provides methods for concealing the existence of a device connected to a computer network or concealing the existence of certain applications running on a device connected to a computer network. This concealment works by authorizing a TCP connection request using an authentication key embedded within the TCP connection request.

IV. Glossary

Agent—A software agent is a computer program that acts for a user or other program in a relationship of agency.

Aggregate Statistical Object—A data structure containing one or more statistical objects, a list of potential original objects that may have created the original object(s) and the communications characteristics that provide the association between multiple statistical objects.

Arbitrary Network Topology—Without regard to the layout of devices on a network.

Authentication—The process of verifying the authenticity of a presented identity credential.

Authentication Device—A device that performs authentication. In a preferred embodiment, an authentication device determines the identity to be authenticated, performs authentication of the identity and indicates a policy associated with the authenticated identity.

Authentication Key—An identity token.

Authentication Processing Information—Information provided by an authentication device to a second entity which enables the second entity to complete the authentication process. In the case of TAC, the authentication device provides a second Identity token which is used for bidirectional authentication on the TCP SYN/ACK transaction.

Authenticated Session Table—A table containing session descriptors of TCP sessions that have been authenticated.

Authenticated Session Processing—Authenticated session processing uses authentication processing information to properly respond to authenticated sessions. In the case of TAC, the authentication session processing inserts a bidirectional identity token into TCP SYN/ACK transaction.

Bidirectional Authentication—Authentication that occurs between two parties where each party is authenticated. This is in contrast to unidirectional authentication where only one party is authenticated.

Calculated Probability—The probability that an attacker can generate a valid identity token.

Certificate—A set of data that uniquely identifies an entity, contains the entity's public key, and is digitally signed by a trusted party, thereby binding the public key to the entity. Also known as a Public Key Infrastructure Certificate Communications Characteristics—Any of the characteristics, both physical and logical, that are available to distinguish one communication from another and to group discrete communication events into one or more related sequences of communications events.

Communications Receiver—The receiving entity of a communications. In the context of SOI, the receiving entity is generally a network device.

Connection—A logical pairing of two devices that enable them to communicate. A connection utilizes a series of packets to accomplish this. A TCP connection is an example of a connection.

Connection Establishment Process—The process of establishing a logical pairing of devices. For the TCP protocol, the connection establishment process includes the exchanging of TCP SYN messages.

Connection Request—A request by one device to another device to create a connection.

Context Information—Information describing the context of the connection request that is not contained within the included IP packet. For example, context information may include the VLAN id of the received connection request.

Device—A device is any object that is capable of being attached or connected to and communicating on a network. Examples of devices include computers, servers, clients, laptops, PDAs, cell phones, smart phones, network appliances, storage systems, virtual appliances, switches, routers, load balancers, caches, intrusion detection systems, VPNs, authentication devices, intrusion prevention systems, and firewalls.

Digital Identity—A digital representation of a set of characteristics by which a user, process or device is uniquely recognized.

Endpoint—Any network device that has an IP address and the ability to perform TCP/IP protocol processing.

Endpoint Security—Security processing performed on an endpoint. This may include identity credential authentication, access authorization, policy enforcement, behavioral analysis, logging and other security related actions and behaviors.

Field—In computer science, data that has several parts, can be divided into fields. For example, the TCP header has multiple fields, including source port number, destination port number, sequence number and acknowledgment number.

Hash or Hashing function—Any procedure or mathematical method that converts are large amount of data into a smaller amount of data. In one embodiment of the disclosure, the output may be a single integer or value which serves as an index to an array or database.

Hypervisor—In virtualization technology, hypervisor is a software program that manages multiple operating systems (or multiple instances of the same operating system) on a single computer system.

Identity—The fact of being who or what a person or thing is.

Identity Credential—An object that is verified when presented to the verifier in an authentication transaction. Identity Credentials may be bound in some way to the individual or device to whom they were issued.

Identity Token—Cryptographically secured data indicating the identity of the sending entity.

Initiator's IP Address—The IP address assigned to the device initiating communication.

IP—IP is the Internet Protocol. The Internet Protocol is a data oriented protocol used by devices to communicate across a packet switched network. IP information is carried by an IP header in an IP packet. The IP header contains device address information, protocol control information and user data information. The IP protocol is specified by the Internet Engineering Task Force (IETF) Request For Comment (RFC) 791 and its successors.

IP packet—A unit of information conveyed by an IP network. An IP packet includes an IP header and data. The IP header is formed in accordance with IP protocol specifications.

LAN—Local Area Network.

LAN Segment—A portion of a computer network.

Local Network Switch—A network switch is a computer networking device that connects devices together on a computer network by using packet switching to receive, process, and forward data to the destination device.

Logging Device—A device that receives and processes logs from other devices, often for purposes of aggregation, storage, display, data mining or analytics.

Memory Resource—The memory of a device. Memory is a resource because it finite in size and managed to provide different portions of memory to different programs.

Network—A network is a collection of computers, servers, clients, routers and devices that are connected together such that they can communicate with each other. The Internet is an example of a network.

Network Address Translation—A methodology of remapping one IP address space into another by modifying network address information in Internet Protocol (IP) datagram packet headers while they are in transit across a network device.

Network Subnet—A subnet is a logical subdivision of an IP network, a portion or a larger IP network.

Network Appliance—A fixed function device attached to a network for the purpose of performing set of functions such as computational, storage, networking or security.

Network Device Driver—A software module that communicates with a network interface. A network device driver is responsible for customizing the interactions to and from a specific network interface. Network Endpoint Device—Any network device that has an IP address and the ability to perform TCP/IP protocol processing.

Network Endpoint X.509 Certificate—A X.509 certificate bound to a network endpoint device. A network Endpoint X.509 Certificate is used to identify the endpoint device to which it is bound.

Network Interface—The physical or logical boundary between a network and a device. A network interface is responsible for formatting the network frames or packets as appropriate for the network medium. Many devices have multiple network interfaces.

Network Policy—The rules governing network and network connected device access. A network policy describes what network devices can access other networks and network devices. Network policy is often applied at policy enforcement points or at an endpoint.

Network Topology—The physical or logical layout of devices on a network. Every network has a topology, or the way that the devices on a network are arranged and how they communicate.

Network Traffic Flow—A sequence of related packets communicated between two network devices. For example, each TCP session is a network flow.

Object Activation Agent—A software agent that requests keying information from an Object Activation Service.

Object Activation Service—A service that provides keying information to an Object Activation Agent.

Original Object—An original object is a string of bits. It is also an input to the function that generate a statistical object.

Peer Authentication Driver—A software module that enables the authentication of network traffic using an authentication appliance.

Peering Device—A device communicating in a peering environment.

Peering Environment—A network environment where two endpoints communicate with each other without requiring the traversal of a policy enforcement point.

Peer Authentication Management Application—A software module that assists the peer authentication driver. The peer authentication management application is usually instantiated as an application and communicates with an authentication device on behalf of the peer authentication driver. The peer authentication management application provides management and communications services for the peer authentication driver.

Physical Appliance—A network appliance where the appliance functionality is rendered in physical hardware and software. Compare with a virtual appliance where the appliance functionality is rendered solely in software.

Policy Enforcement Point (PEP)—In networking, a chokepoint where network policy is enforced.

Protocol—In the field of telecommunications, a protocol is the set of standard rules for data representation, signaling, authentication, error detection and other features required to send information over a communications channel. Not all protocols provide all of these features. Protocols with different features may be layered on top of one another to provide a more robust feature set. Examples of protocols are the IP protocol and the TCP protocol. These protocols are often used together and referred to as the TCP/IP protocol.

Protocol Entity—A device, function, process or procedure that implements a communications protocol.

Remote Network Device—A device, of a pair of devices that forms a connection. Connections involve pairs of devices, the remote network device is half of the connection pair, indicating the remote device.

Rule—In networking, rules are formed in two parts, a communication descriptor and a policy. The communication descriptor contains information describing a network communication such as IP addresses, transport protocols (TCP, UDP, etc.) and transport port numbers. The policy described the action to be taken when the communications descriptor is matched. Example policies include discard, forward or redirect to an alternate destination. When the communication descriptor matches a network packet, the associated policy is enforced.

Secured Communications—Secure communication is when two entities are communicating and do not want a third party to listen in. For that they need to communicate in a way not susceptible to eavesdropping, interception or modification.

Secure Tunnel—In computer networks, a tunneling protocol is a communications protocol that allows for the secure movement of data from one network to another. A secure tunnel is the instantiation of a tunneling protocol.

Session Descriptor—A data structure that describes the TCP session (source IP address, source TCP port, destination IP address, destination TCP port), context information and authentication processing information.

SOI—Statistical Object Identification. A method of communicating a statistical representation of an original object.

SOI Insertion Policy Service—A service that generates statistical objects from an original object and inserts the generated statistical object into a message.

SOI Policy Service—A service that receives a message, extracts a statistical object and uses a local SOI resolution service to perform statistical object identification to determine the original object.

SOI Resolution Service—A service that uses SOI to determine an original object from a statistical object.

SSL—Secure Sockets Layer. A security protocol defined by the Internet Engineering Task Force (IETF).

Statistical Object—The output of a function that has a specified statistical distribution. Commonly, a statistical object is the output of a hashing function.

Symmetric Key—A cryptographic key that is used to perform both the cryptographic operation and its inverse, for example to encrypt and decrypt, or create a message authentication code and to verify the code.

Symmetric Key Authentication—An authentication algorithm that uses a symmetric key to create a message authentication code and to verify the code.

TAC Transport Access Control. A method of determining identity on the first packet of a TCP session.

TAC Bidirectional Identity Token—A TAC Identity token that is communicated during TCP SYN/ACK processing.

TCP—TCP is the Transmission Control Protocol. Using TCP, networked devices can create connections to one another, over which they can send data. The TCP protocol insures that data sent by one endpoint will be received in the same order by the other, and without any pieces missing. The TCP protocol also distinguishes data for different applications (such as a Web server and an email server) on the same device.

TCP Connection Request—A TCP SYN packet. This is the TCP packet sent to request the establishment of a TCP connection.

TCP Header—The portion of the communicated network packet that contains TCP protocol information.

TCP Port—The indicator of the application which is using a specific TCP connection. The use of TCP ports enables multiple application, with different TCP port numbers, to share the same IP address.

TCP port scanning and reconnaissance—The processing of using a TCP port scanner to probe and discover network devices and their applications. Port scanning is often used by administrators to verify security policies of their networks and by attackers to identify network services running on a host and exploit vulnerabilities.

TCP Protocol Specification—The specification that describes the correct operation of the TCP protocol. The TCP protocol is specified by the Internet Engineering Task Force (IETF) Request for Comment RFC-793.

TCP SYN Bit—A control bit within the TCP header that indicates a request for TCP session establishment.

TCP SYN/ACK Processing—The response by a TCP/IP protocol stack upon receiving a TCP SYN message to establish a TCP session. This is performed in accordance with the TCP specification.

TCP Session Initiation—The process of establishing a TCP session. This is performed in accordance with the TCP protocol specification.

TCP/IP Protocol Stack—The software that implements the TCP/IP communication protocol.

TLS—Transport Layer Security. A security protocol defined by the Internet Engineering Task Force (IETF).

Traffic Path—In a computer network, there are often multiple paths between two endpoints. The traffic path is the path that the network traffic flow takes. Note that this path may change during the life of a flow.

Virtual Appliance—A network appliance where the appliance functionality is rendered solely in software. Compare against a virtual appliance where the appliance functionality is rendered in physical hardware and software.

X.509 Certificate—A certificate that conforms to the X.509 standard for public key certificates.

V. Embodiments

FIG. 8 is an illustration of an IP packet 12, including a TCP header 14.

FIG. 9 is an illustration of a TCP header 14 and shows the location of the TCP SYN bit 16.

Figure 10:
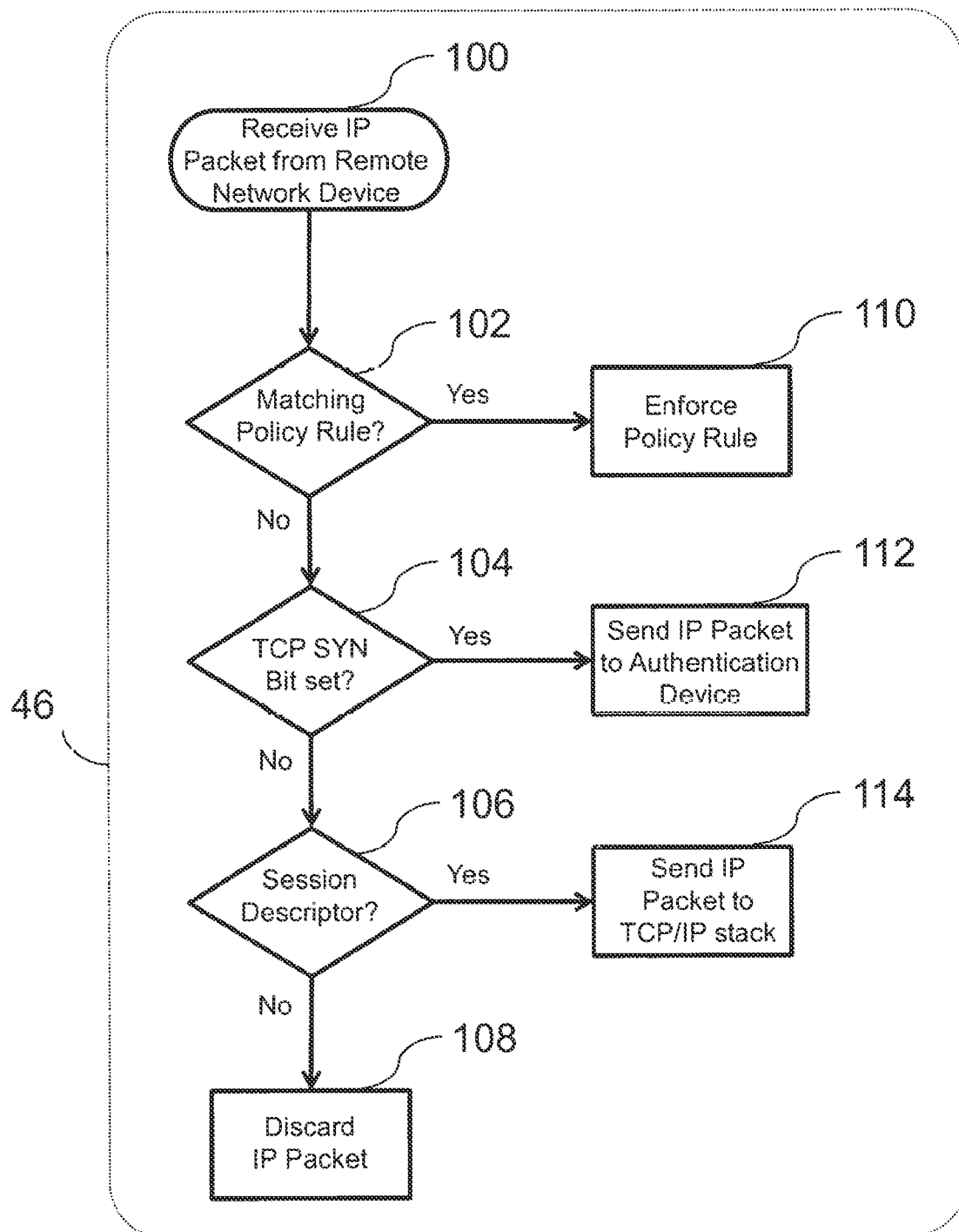
FIG. 10 depicts Flowchart 1 for one embodiment of the present disclosure, which describes the processing of an IP packet received from a remote network device.

FIG. 10 is a flowchart of one embodiment of the present disclosure which describes processing of an IP packet 12 by a peer authentication driver 46.

Figure 11:
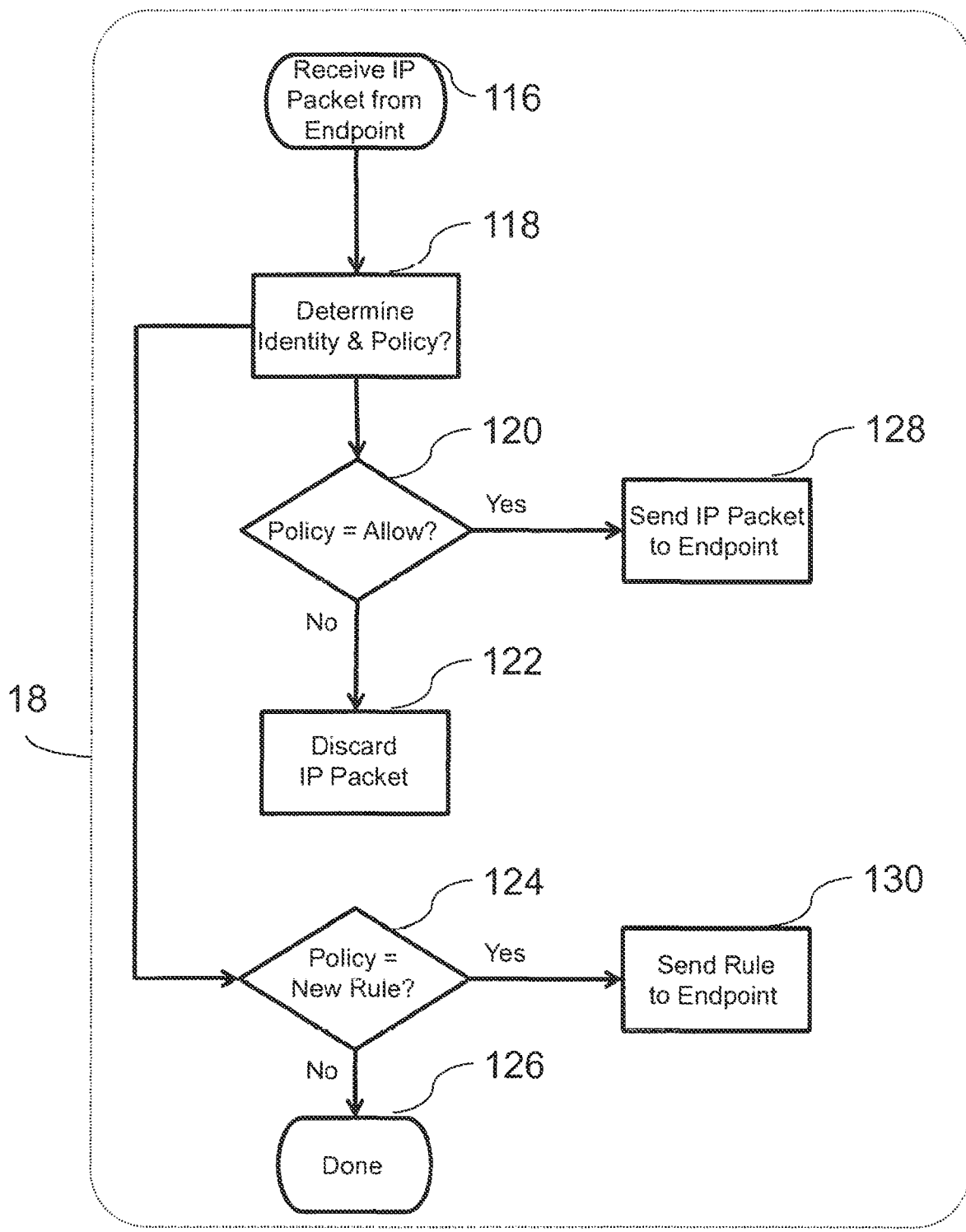
FIG. 11 depicts Flowchart 2 for one embodiment of the present disclosure, which describes the processing of an IP packet by an authentication device.
Figure 12:
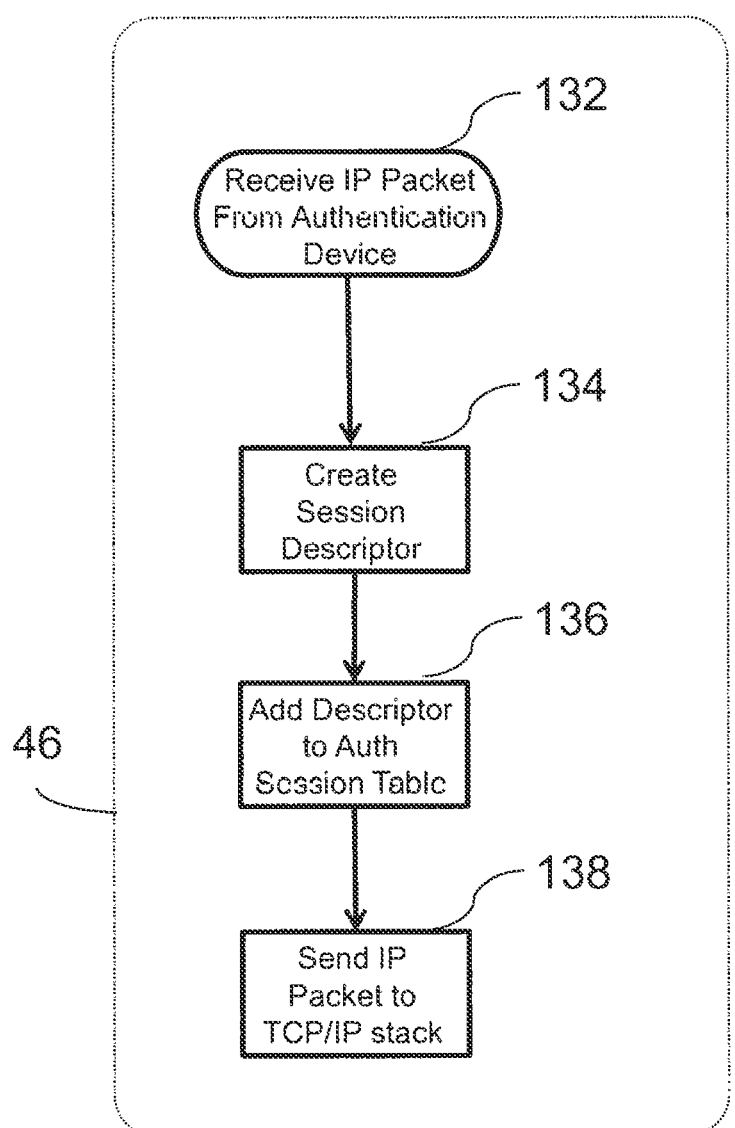
FIG. 12 depicts Flowchart 3 for one embodiment of the present disclosure, which describes the processing of an IP packet from an authentication device.

FIG. 11 is a flowchart of one embodiment of the present disclosure which describes processing of an IP packet 12 by an authentication device 18. FIG. 12 is a flowchart of one embodiment of the present disclosure which describes processing of an authenticated IP packet 12 containing TCP SYN bit 16 by a peer authentication driver 46.

Figure 13:
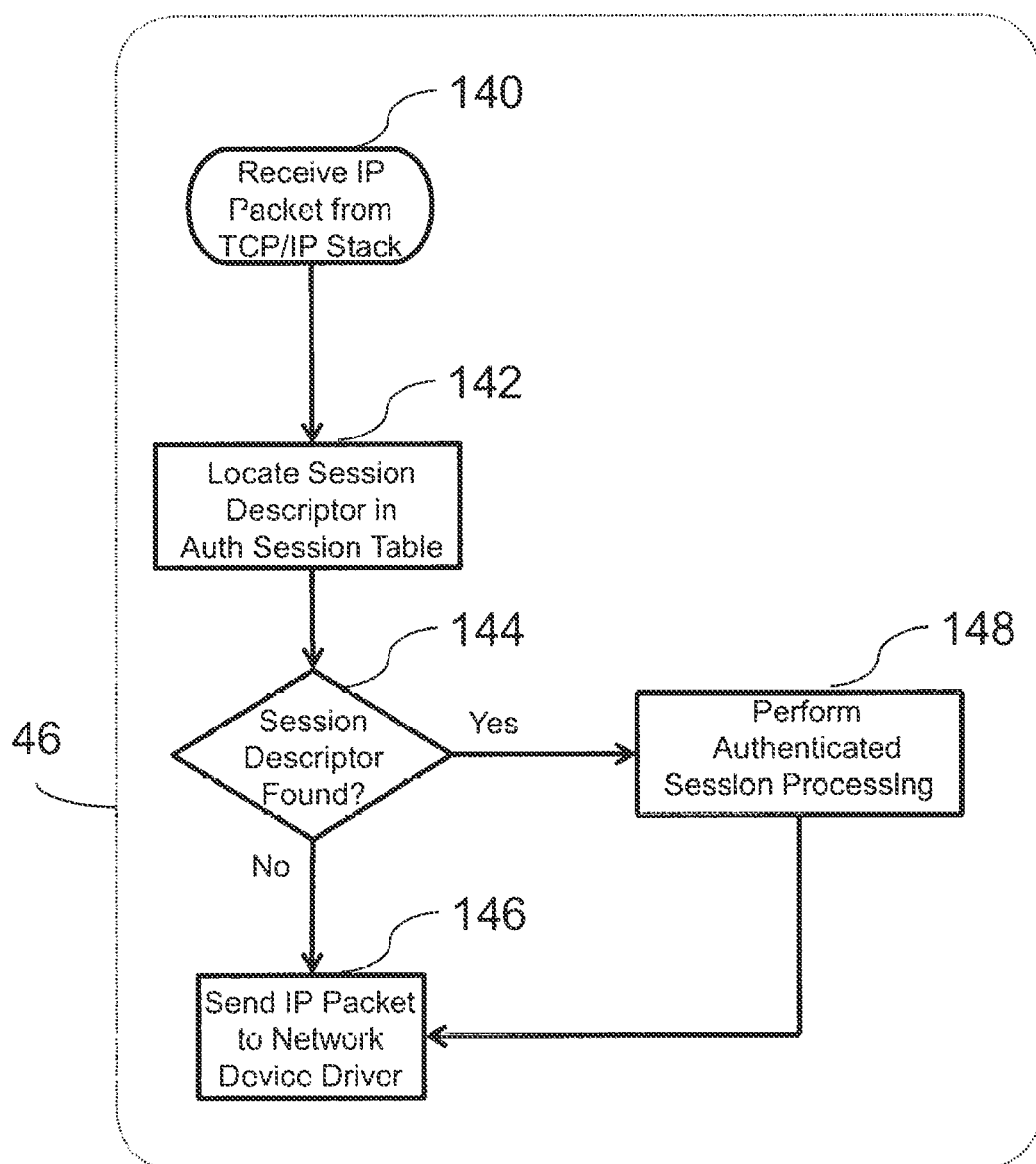
FIG. 13 depicts Flowchart 4 for one embodiment of the present disclosure, which describes the processing of an IP packet received from the network endpoint device's TCP/IP protocol stack.

FIG. 13 is a flowchart of one embodiment of the present disclosure which describes processing of an IP packet 12 received from a TCP/IP protocol stack 32 by a peer authentication driver 46.

Figure 14:
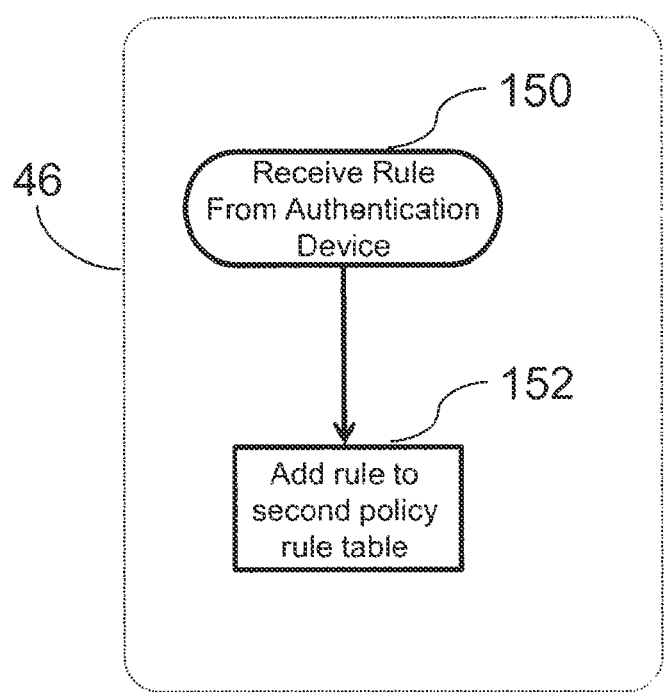
FIG. 14 depicts Flowchart 5 for one embodiment of the present disclosure, which describes the processing of a rule received from the authentication device.

FIG. 14 is a flowchart of one embodiment of the present disclosure which describes processing of a policy rule 26 received from an authentication device 18 by a peer authentication driver 46.

FIG. 15 is an architectural depiction of one embodiment of the present disclosure in an authentication device 18. A network interface conveys packets between a network (not shown in this figure) and the network device driver 48. The network device driver 48 processes packets and conveys packets and information between the network interface 49 and the TCP/IP protocol stack 32. The TCP/IP protocol stack 32 conveys the received information to a peering service 24. The peering service 24 includes an identity recognizer 25 and a first table of policy rules 27.

Figure 16:
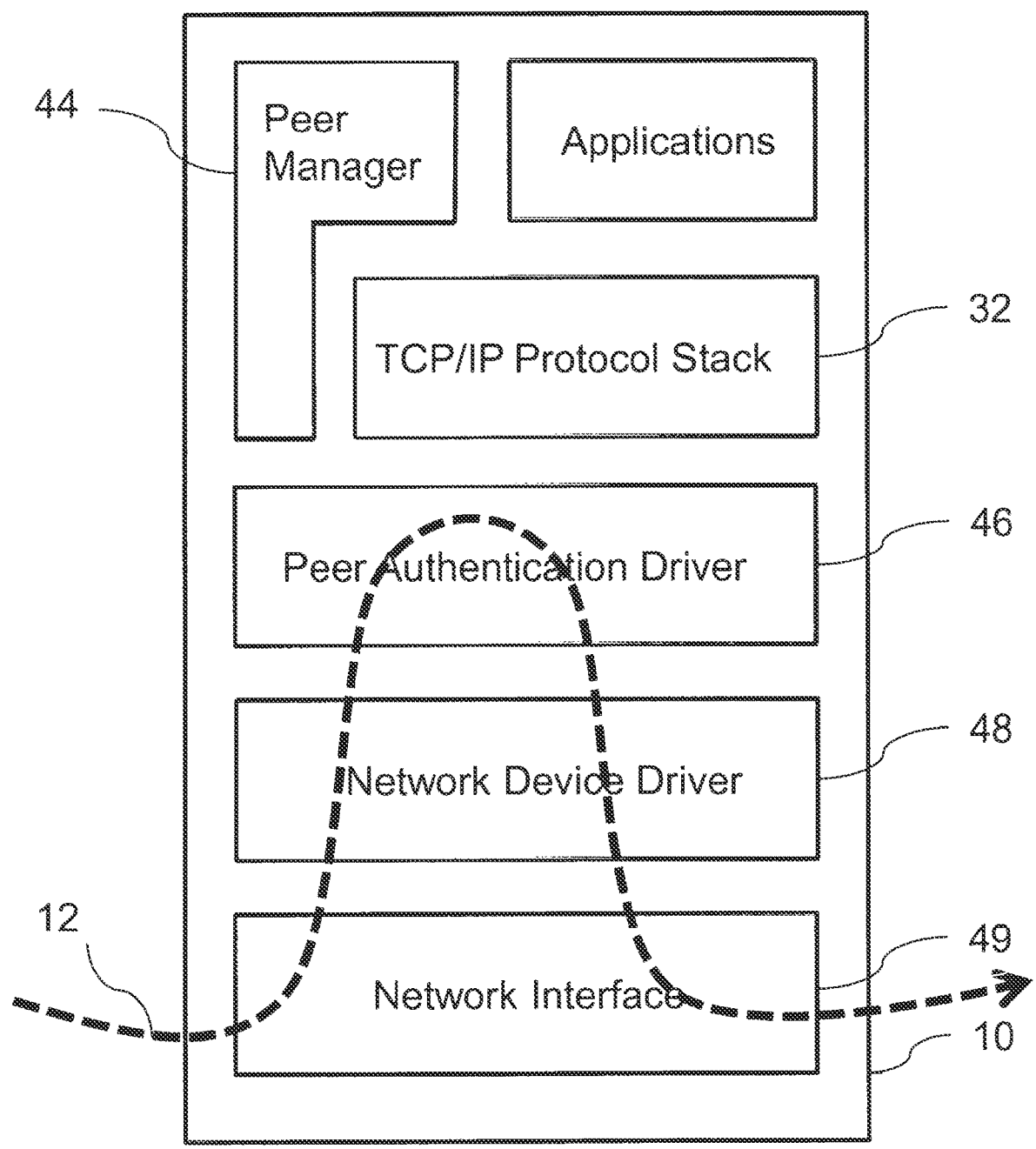
FIG. 16 is an architectural depiction of one embodiment of the present disclosure in a network endpoint device, showing the flow of an IP packet with a TCP header containing TCP SYN bit coming from a remote network device and being sent to an authentication device.

FIG. 16 is an architectural depiction of one embodiment of the present disclosure in a network endpoint device 10. A network interface 49 conveys packets between a network (not shown) and the network device driver 48. The network device driver 48 processes packets and conveys packets and information between the network interface 49 and the peer authentication driver 46. The peer authentication driver 46 performs authentication or causes authentication to be performed. The peer authentication driver 46 conveys packets and information between the network device driver 48, the TCP/IP protocol stack 32 and the Peer Authentication Management Application 44. The TCP/IP protocol stack 32 performs TCP/IP processing and conveys packets and information between the peer authentication driver 46, the Peer Authentication Management Application 44 and other applications. The Peer Authentication Management Application 44 provides management and communications services for the peer authentication driver 46. The Peer Authentication Management Application 44 conveys packets and information between the peer authentication driver 46 and the TCP/IP protocol stack 32.

The flow of an IP packet 12 is also depicted. The IP packet 12 with a TCP header 14 containing TCP SYN bit 16 being received by a network interface 49, being conveyed to a network device driver 48 and being subsequently conveyed to a peer authentication driver 46. The peer authentication driver 46 sends the IP packet 12 to an authentication device 18 (not shown) by conveying the IP packet 12 to the network device driver 48 which subsequently conveys the IP packet 12 to the network interface 49.

Figure 17:
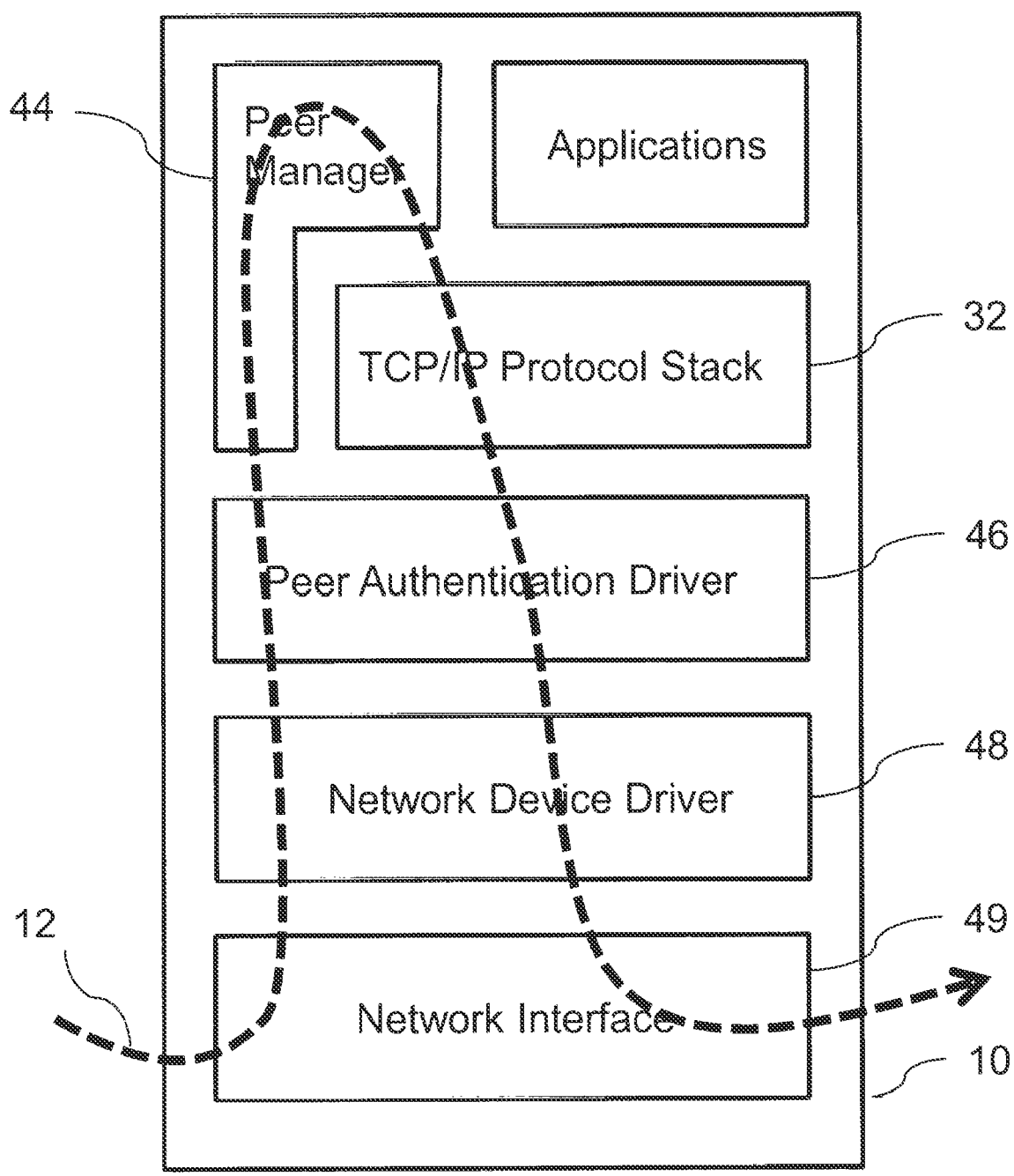
FIG. 17 is an architectural depiction of one embodiment of the present disclosure in a network endpoint device, showing an alternate flow of an IP packet with a TCP header containing TCP SYN bit coming from a remote network device and being sent to an authentication device.

FIG. 17 is an architectural depiction of one embodiment of the present disclosure in a network endpoint device 10, showing an alternate flow of an IP packet 12 with a TCP header 14 containing TCP SYN bit 16 being received by a network interface 49, being conveyed to a network device driver 48 and being subsequently conveyed to a peer authentication driver 46. The peer authentication driver 46 sends the IP packet 12 to an authentication device 18 (not shown) by conveying the IP packet 12 to a Peer Authentication Management Application 44 which subsequently conveys the IP packet 12 via an established TCP session to the TCP/IP protocol stack 32. The TCP/IP protocol stack conveys the IP packet 12 to the peer authentication driver 46 which subsequently conveys the IP packet 12 to the network device driver 48 which subsequently conveys the IP packet 12 to the network interface 49.

Figure 18:
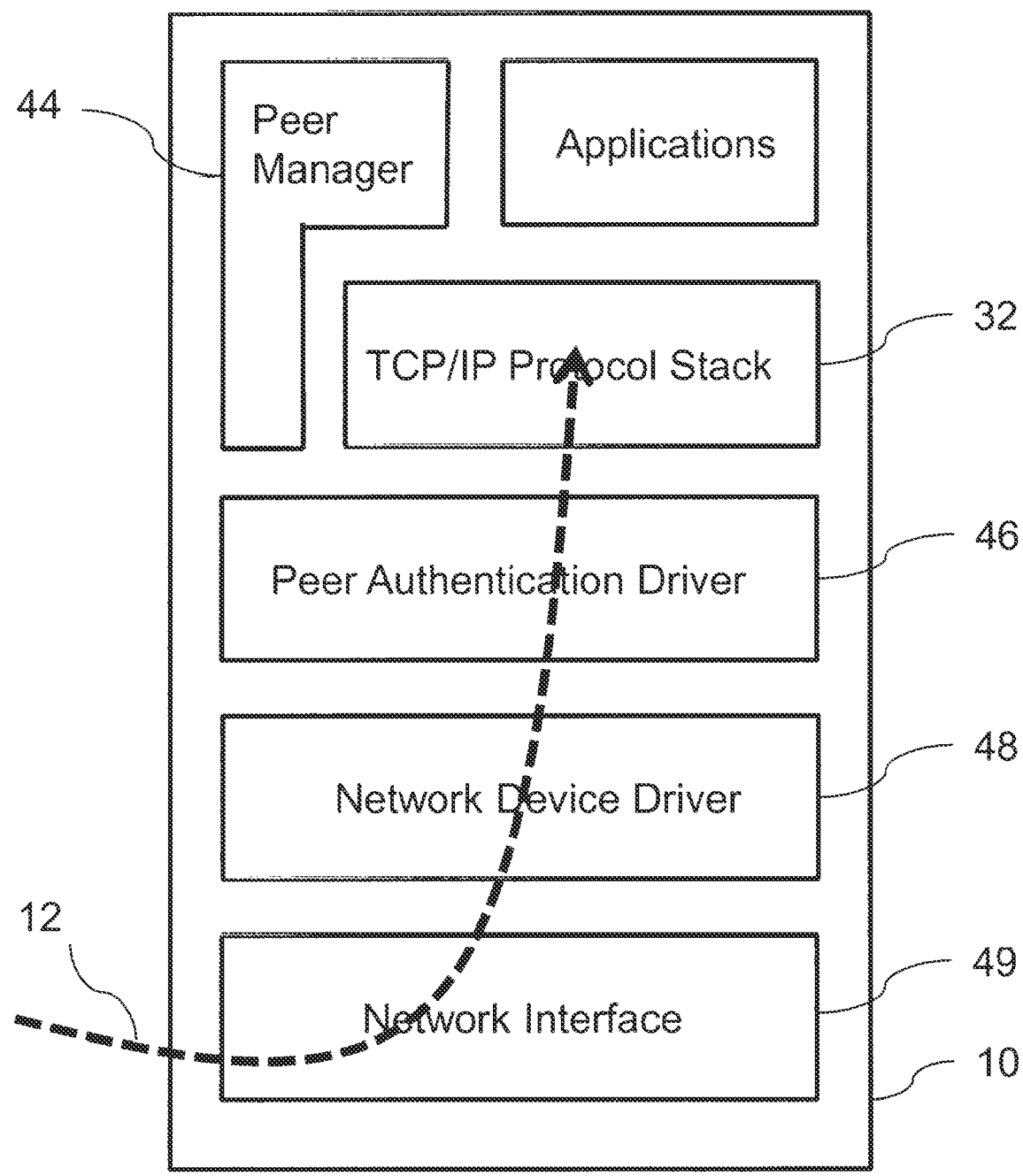
FIG. 18 is an architectural depiction of one embodiment of the present disclosure in a network endpoint device, showing the flow of an IP packet with a TCP header matching a session descriptor coming from a remote network device and being delivered to the TCP/IP protocol stack.

FIG. 18 is an architectural depiction of one embodiment of the present disclosure in a network endpoint device 10, showing the flow of an IP packet 12 with a TCP header 14 being received by a network interface 49, being conveyed to a network device driver 48 and being subsequently conveyed to a peer authentication driver 46. The peer authentication driver 46 upon locating a matching session descriptor 28 conveys the IP packet 12 to the TCP/IP protocol stack 32 for processing.

Figure 19:
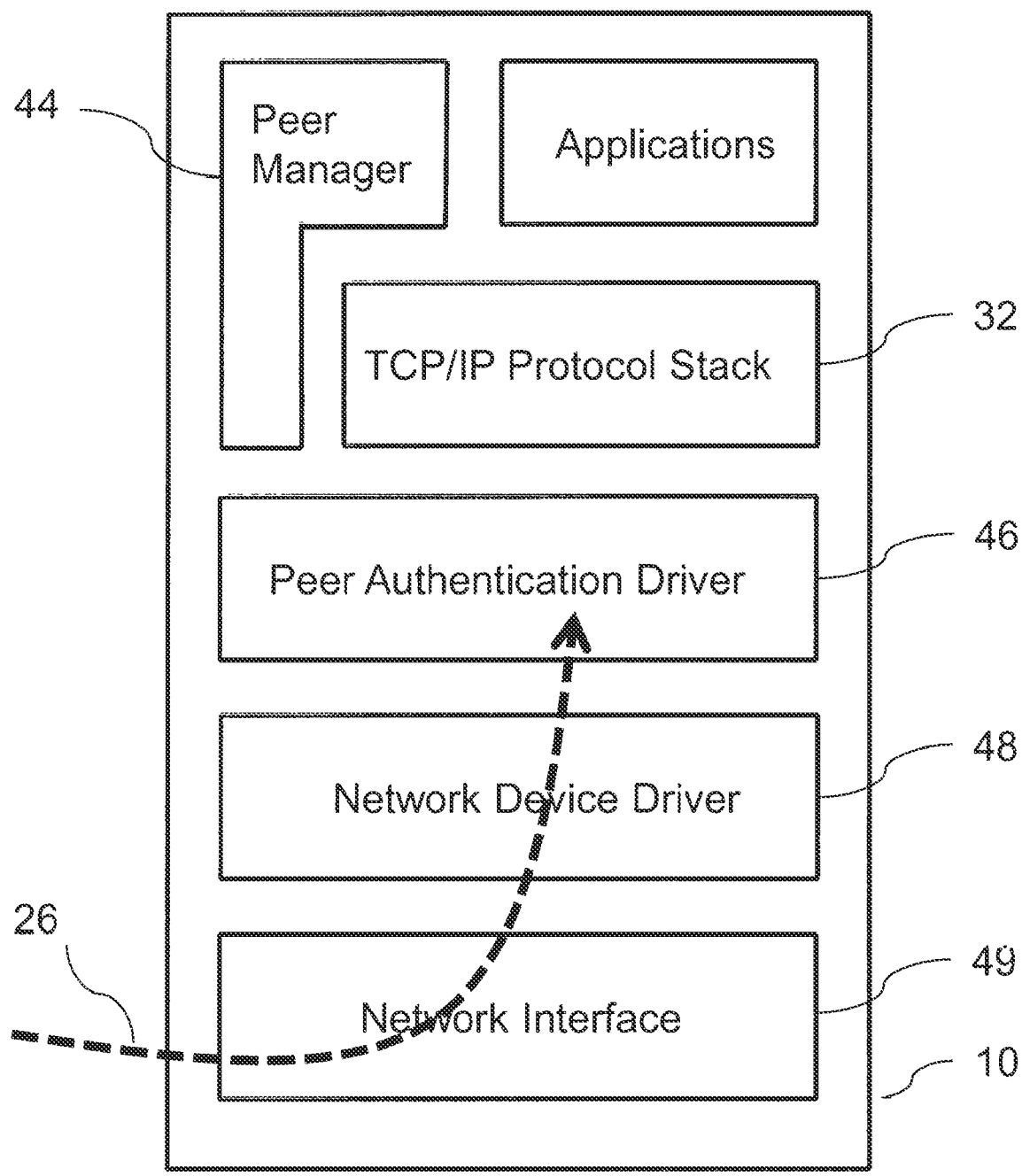
FIG. 19 is an architectural depiction of one embodiment of the present disclosure in a network endpoint device, showing the flow of a rule coming from an authentication device and being delivered to the peer authentication driver.

FIG. 19 is an architectural depiction of one embodiment of the present disclosure in a network endpoint device 10, showing the flow of a policy rule 26 being received by a network interface 49, being conveyed to a network device driver 48 and being subsequently conveyed to a peer authentication driver 46 for processing.

Figure 20:
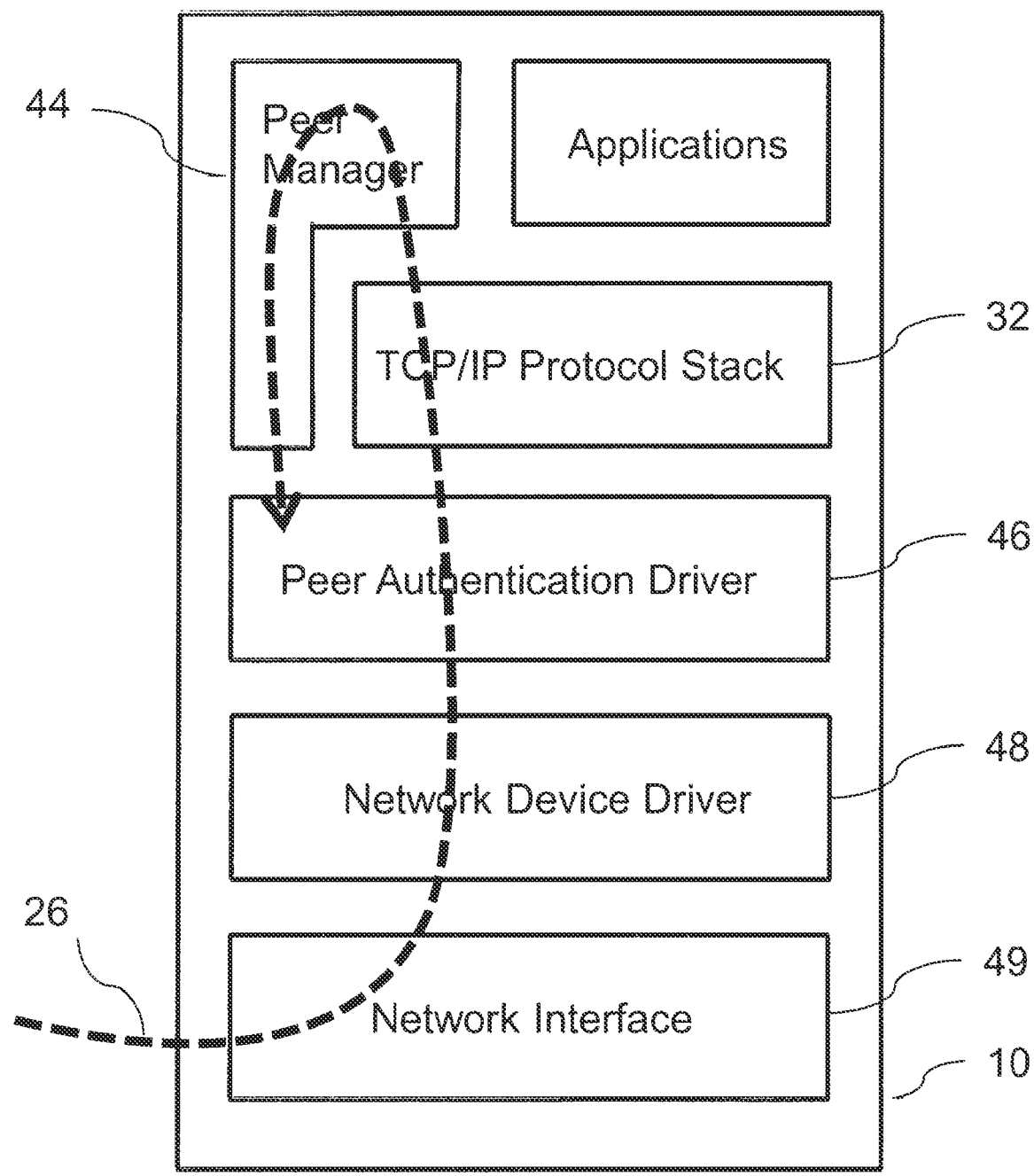
FIG. 20 is an architectural depiction of one embodiment of the present disclosure in a network endpoint device, showing an alternate flow of a rule coming from an authentication device and being delivered to the peer authentication driver.

FIG. 20 is an architectural depiction of one embodiment of the present disclosure in a network endpoint device 10, showing an alternate flow of a policy rule 26 being transported within a previously established TCP session. An IP packet 12 containing and TCP header 14 and the policy rule 26 is received by a network interface 49, being conveyed to a network device driver 48 and being subsequently conveyed to a peer authentication driver 46. The peer authentication driver 46 upon locating a matching session descriptor 28 conveys the IP packet 12 to the TCP/IP protocol stack 32 for processing. The TCP/IP protocol stack 32 performs the protocol processing and conveys the policy rule 26 to the Peer Authentication Management Application 44. The Peer Authentication Management Application 44 conveys the policy rule 26 to the peer authentication driver 46.

Figure 21:
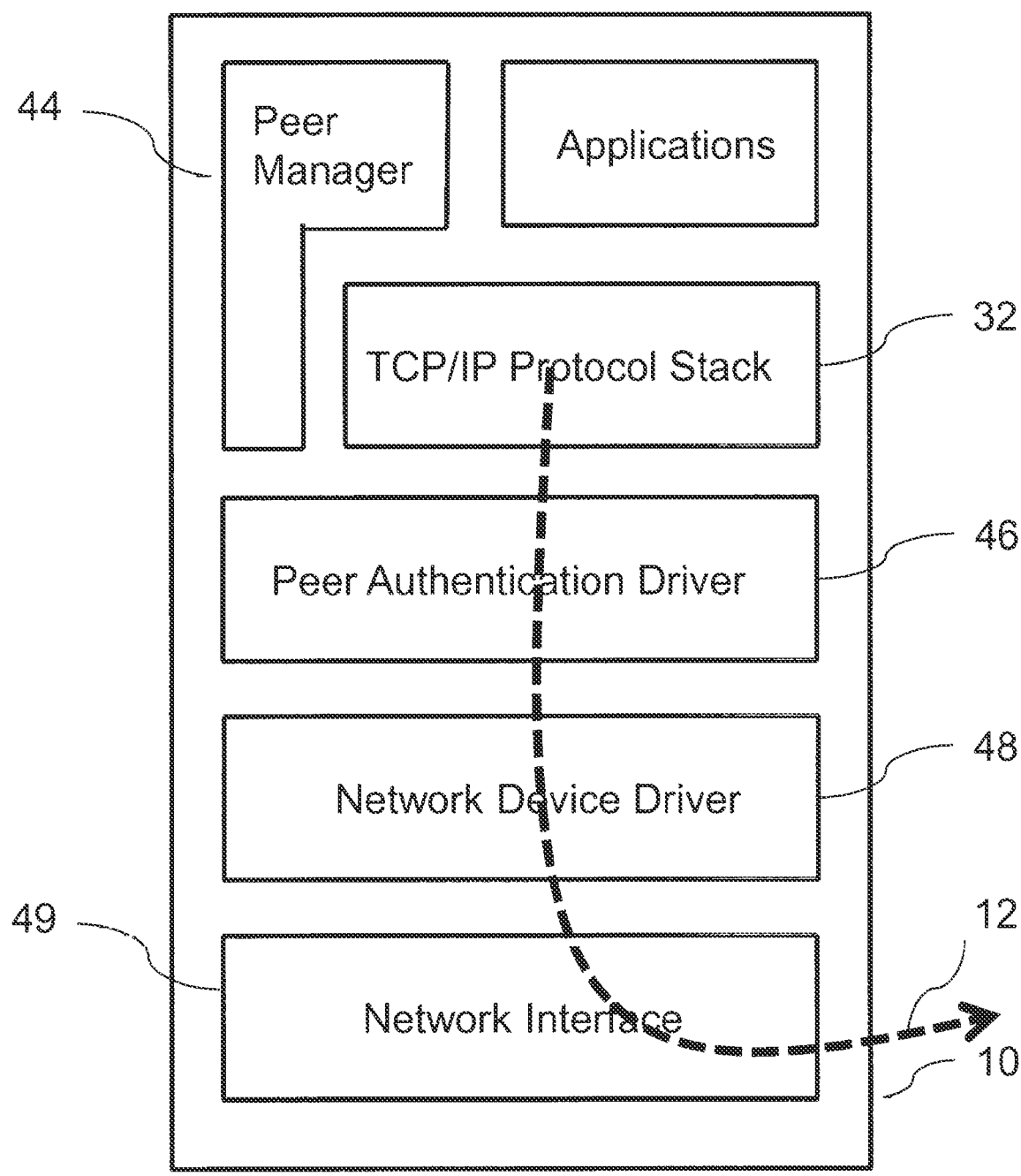
FIG. 21 is an architectural depiction of one embodiment of the present disclosure in a network endpoint device, showing the flow of an IP packet coming from the TCP/IP protocol stack and being sent to a remote network device.

FIG. 21 is an architectural depiction of one embodiment of the present disclosure in a network endpoint device 10, showing the flow of an IP packet 12 being generated from the TCP/IP protocol stack 32 and being conveyed to the peer authentication driver 46. The peer authentication driver 46 performs authentication processing and conveys the IP packet 12 to the network device driver 48 which subsequently conveys the IP packet 12 to the network interface 49 to send to its destination.

Figure 22:
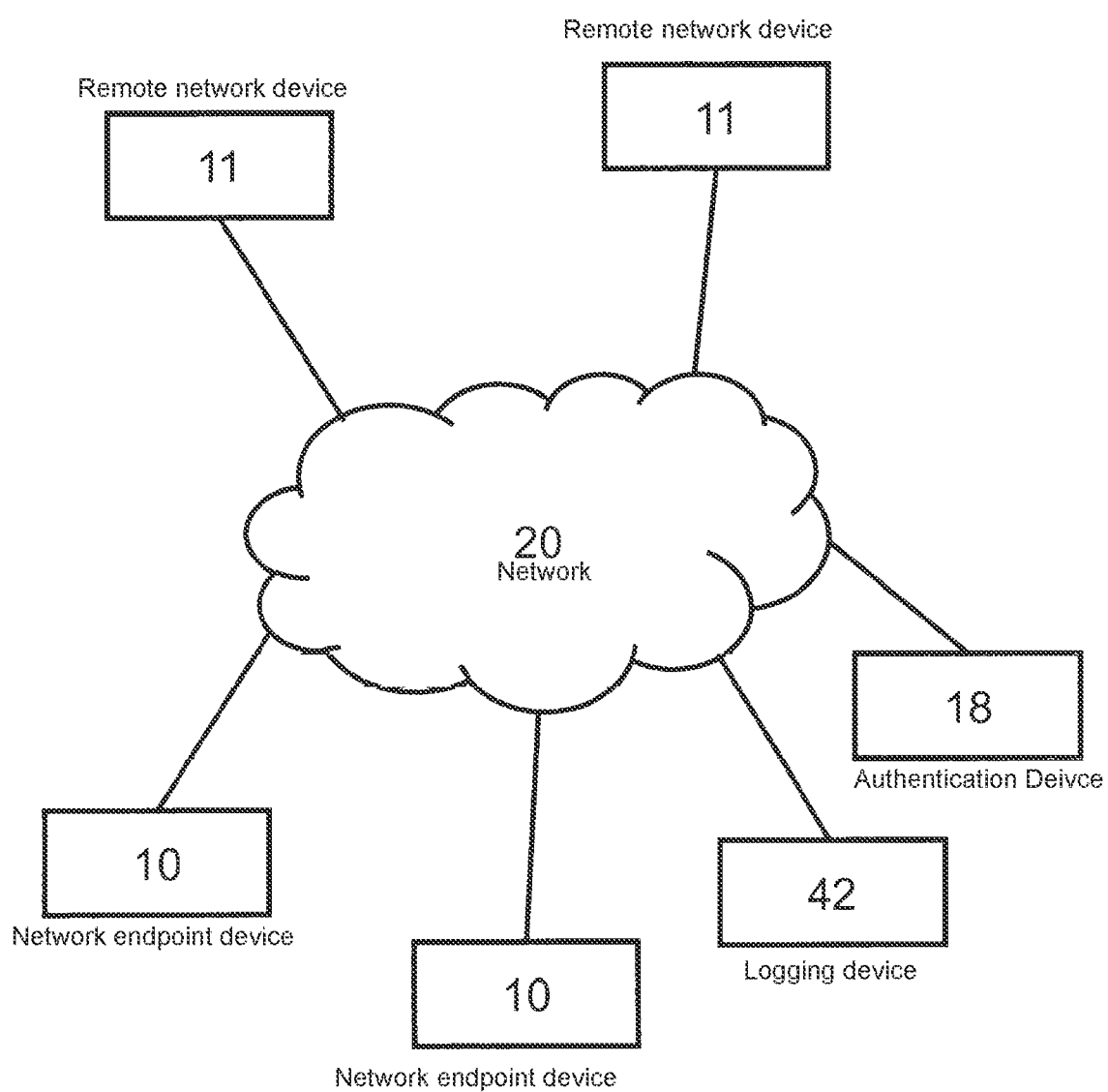
FIG. 22 is a topological depiction of one embodiment of the present disclosure in an operating context.
Figure 23:
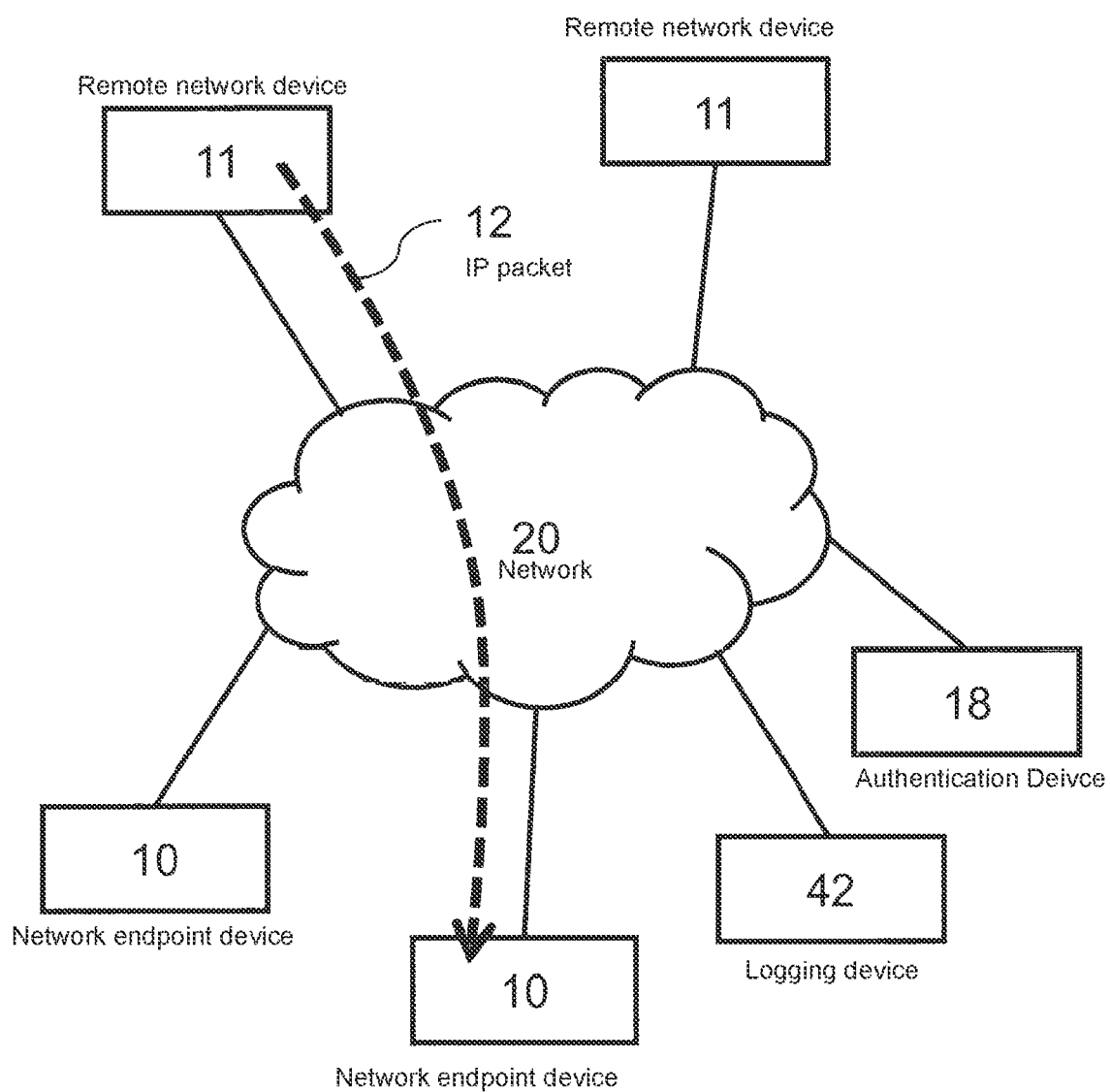
FIG. 23 is a topological depiction of one embodiment of the present disclosure in an operating context, showing the flow of an IP packet with a TCP header containing TCP SYN bit coming from a remote network device.

FIG. 22 is a topological depiction of one embodiment of the present disclosure in an operating context. Two remote network devices 11 are connected to a network 20. Also connected to the network 20 are two network endpoint devices 10, a logging device 42 and an authentication device 18. FIG. 23 is a topological depiction of one embodiment of the present disclosure in an operating context, showing a remote network device 11 conveying an IP packet 12 with a TCP header 14 containing TCP SYN bit 16 via a network 20 to a network endpoint device 10.

Figure 24:
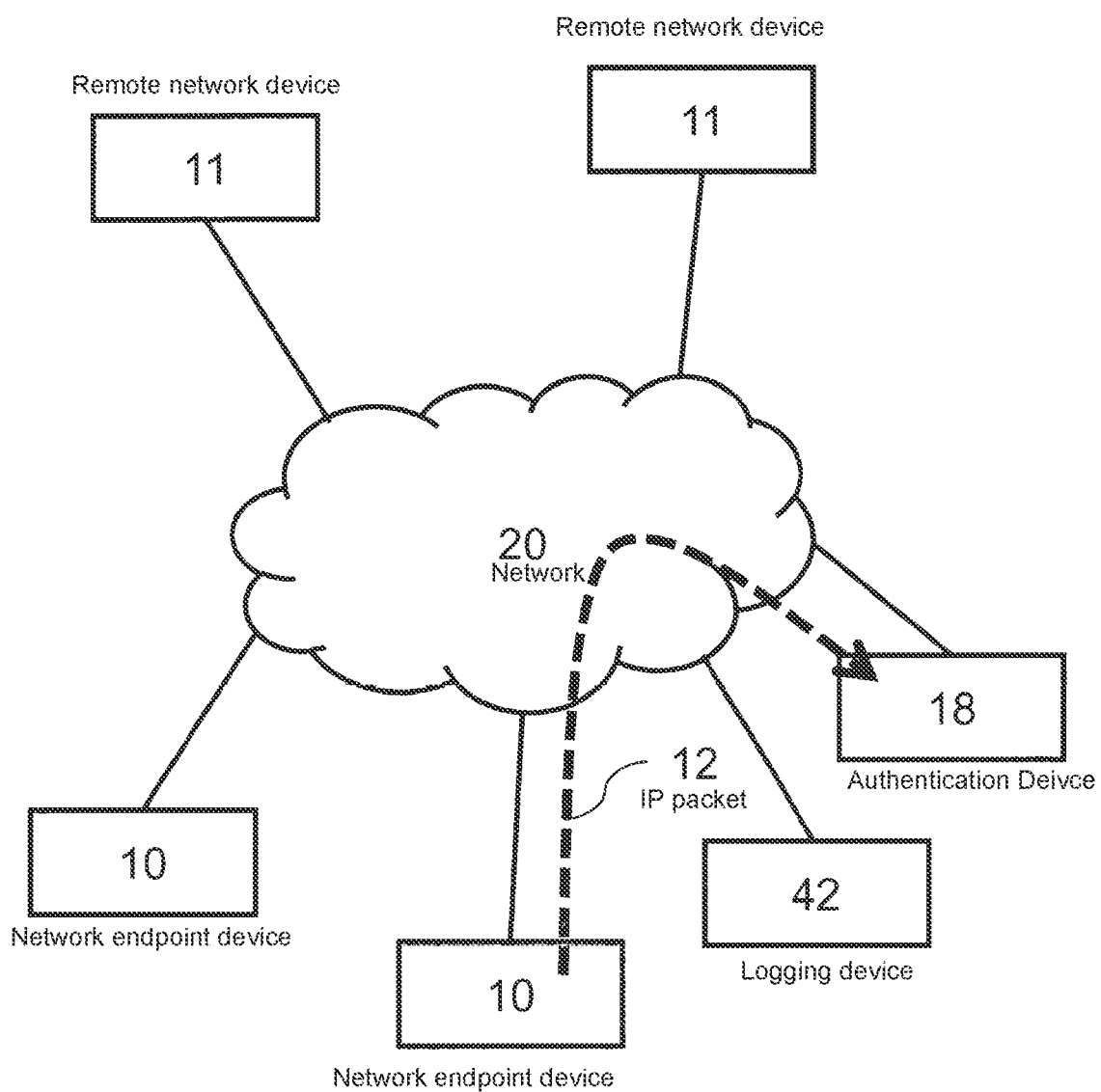
FIG. 24 is a topological depiction of one embodiment of the present disclosure in an operating context, showing the flow of an IP packet with a TCP header containing TCP SYN bit being sent from a network endpoint device to an authentication device.

FIG. 24 is a topological depiction of one embodiment of the present disclosure in an operating context, showing a network endpoint device 10 conveying an IP packet 12 with a TCP header 14 containing TCP SYN bit 16 via a network 20 to an authentication device 18 performing authentication.

Figure 25:
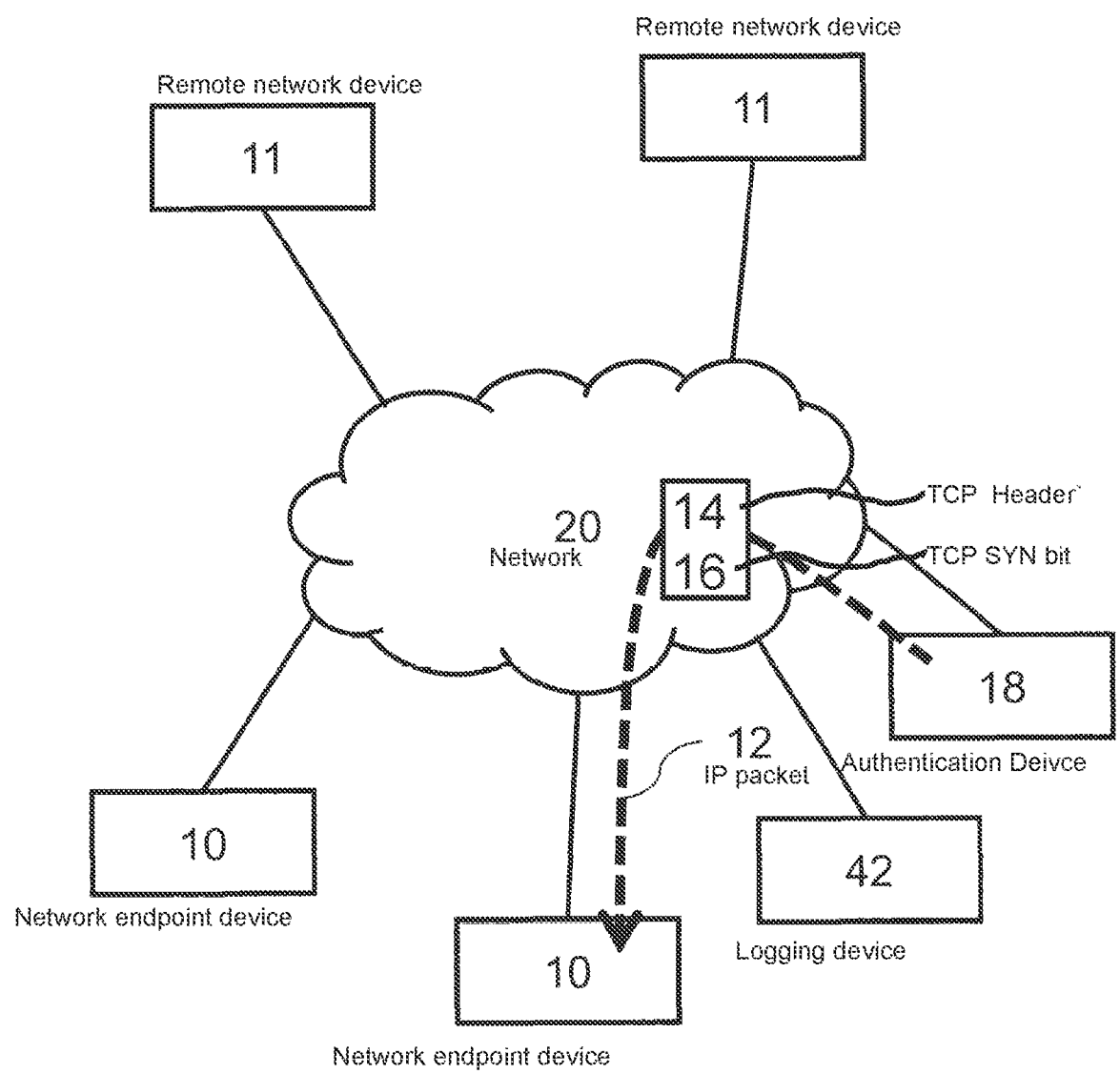
FIG. 25 is a topological depiction of one embodiment of the present disclosure in an operating context, showing the flow of an IP packet with a TCP header containing TCP SYN bit being sent from an authentication device back to a network endpoint device.
Figure 26:
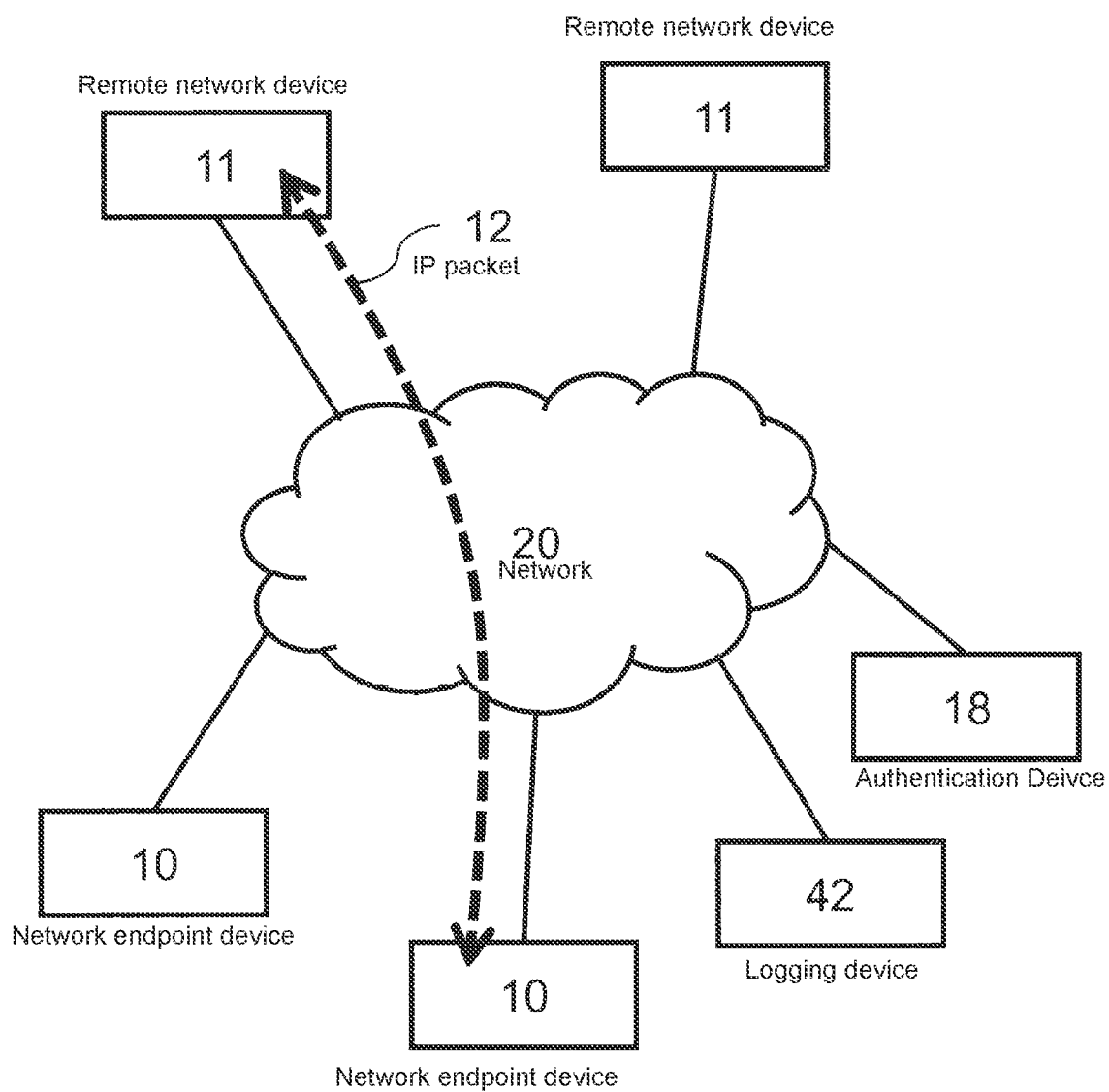
FIG. 26 is a topological depiction of one embodiment of the present disclosure in an operating context, showing the flow of IP packets with their TCP headers matching a session descriptor between a remote network device and the network endpoint device.

FIG. 25 is a topological depiction of one embodiment of the present disclosure in an operating context, showing an authentication device 18 conveying an IP packet with a TCP header 14 containing TCP SYN bit 16 after being authenticated to a network endpoint device 10 via a network 20. FIG. 26 is a topological depiction of one embodiment of the present disclosure in an operating context, showing the flow of IP packets 12 with TCP headers 14 not containing TCP SYN bit 16 and matching a session descriptor 28 between a remote network device 11 and the network endpoint device 10 via a network 20.

Figure 27:
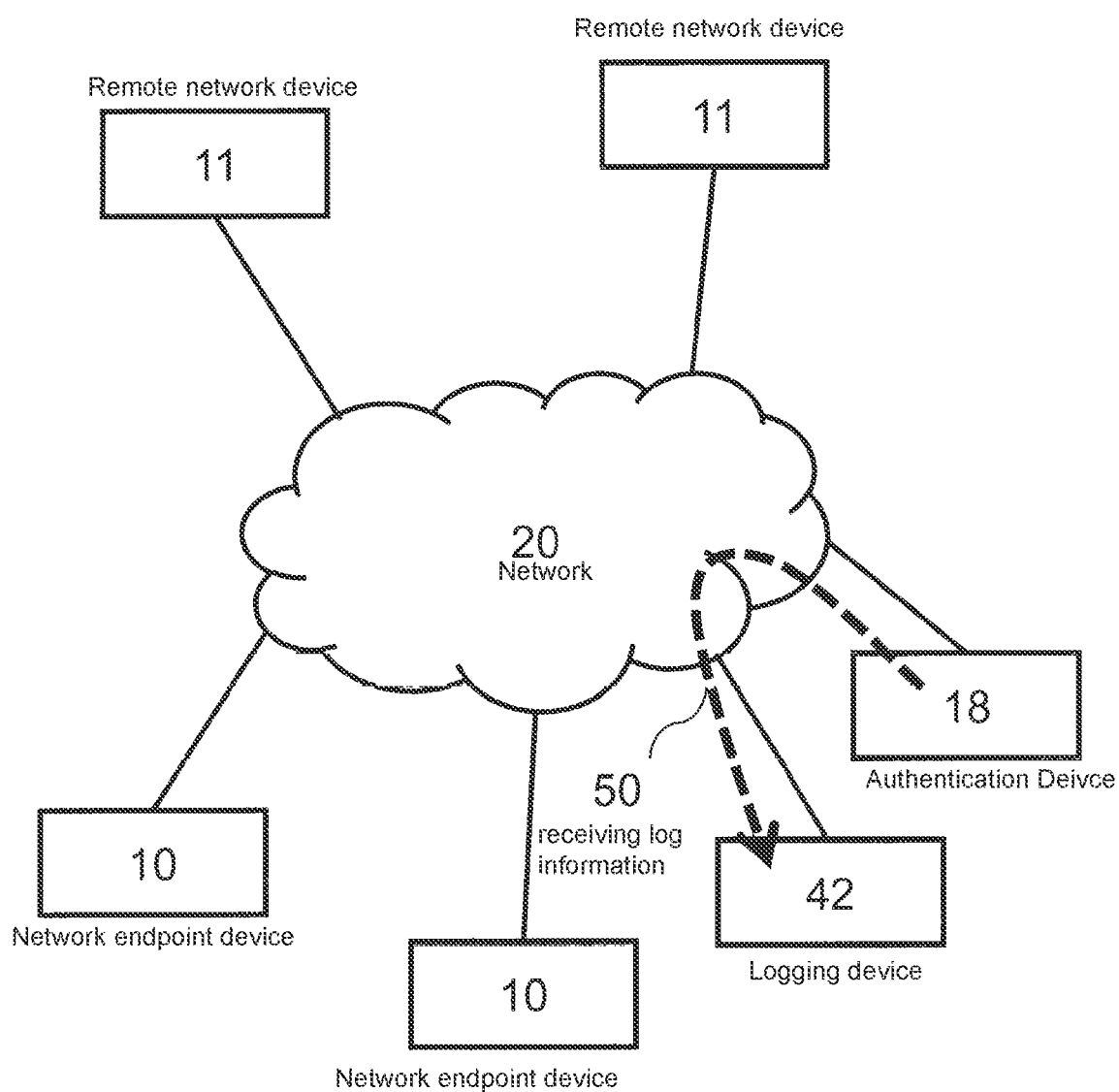
FIG. 27 is a topological depiction of one embodiment of the present disclosure in an operating context, showing the authentication device sending log information to a logging device.
Figure 30:
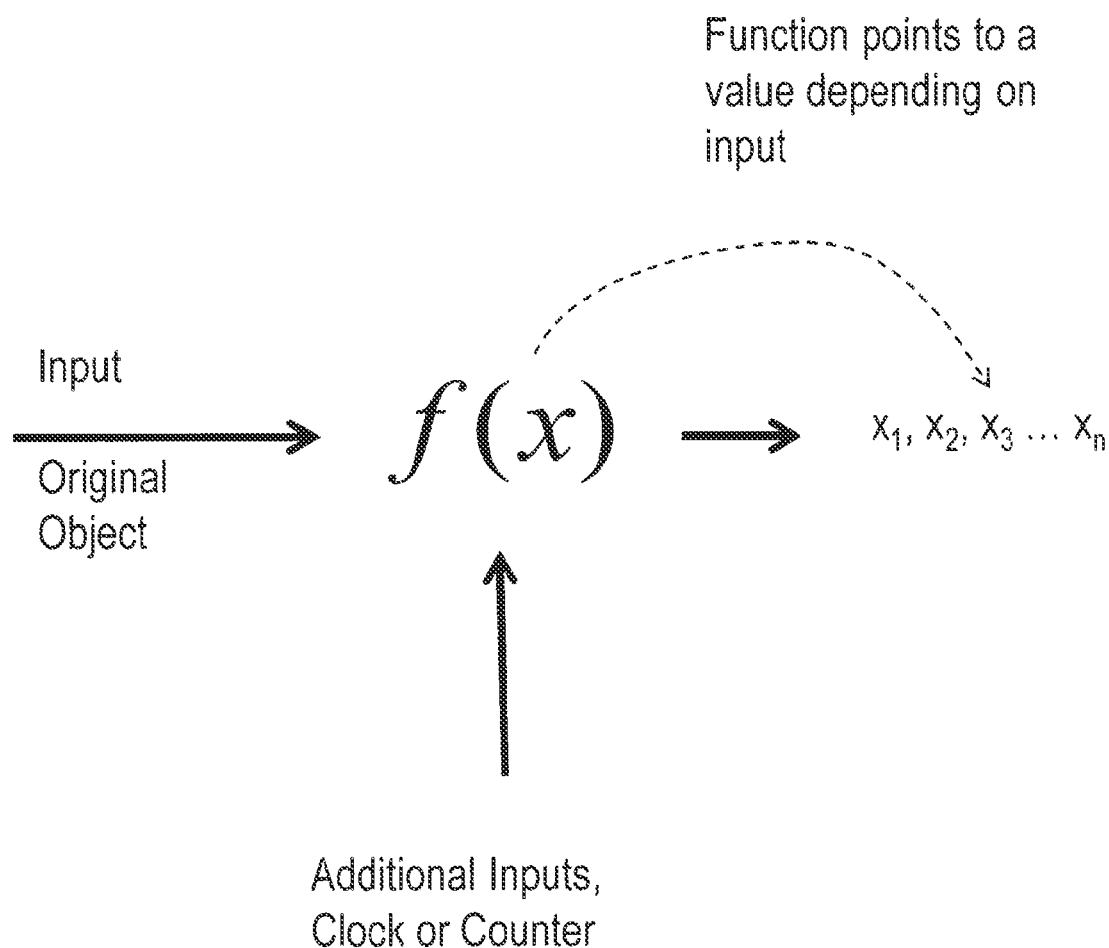
FIG. 30 illustrates the general operation of a hash function.
Figure 31:
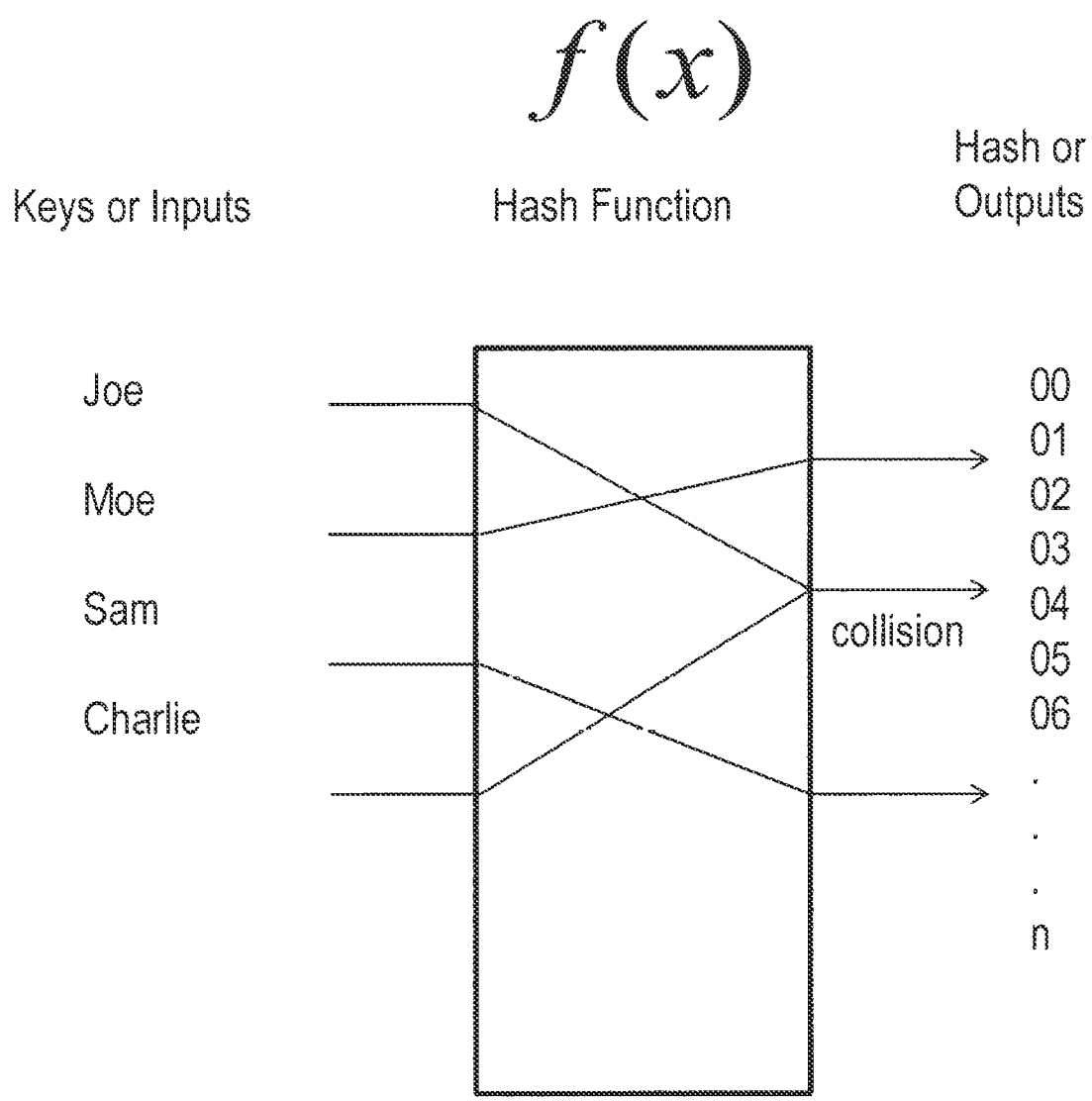
FIG. 31 shows how the hash function illustrated in FIG. 30 maps a set of inputs to a set of outputs.
Figure 32:
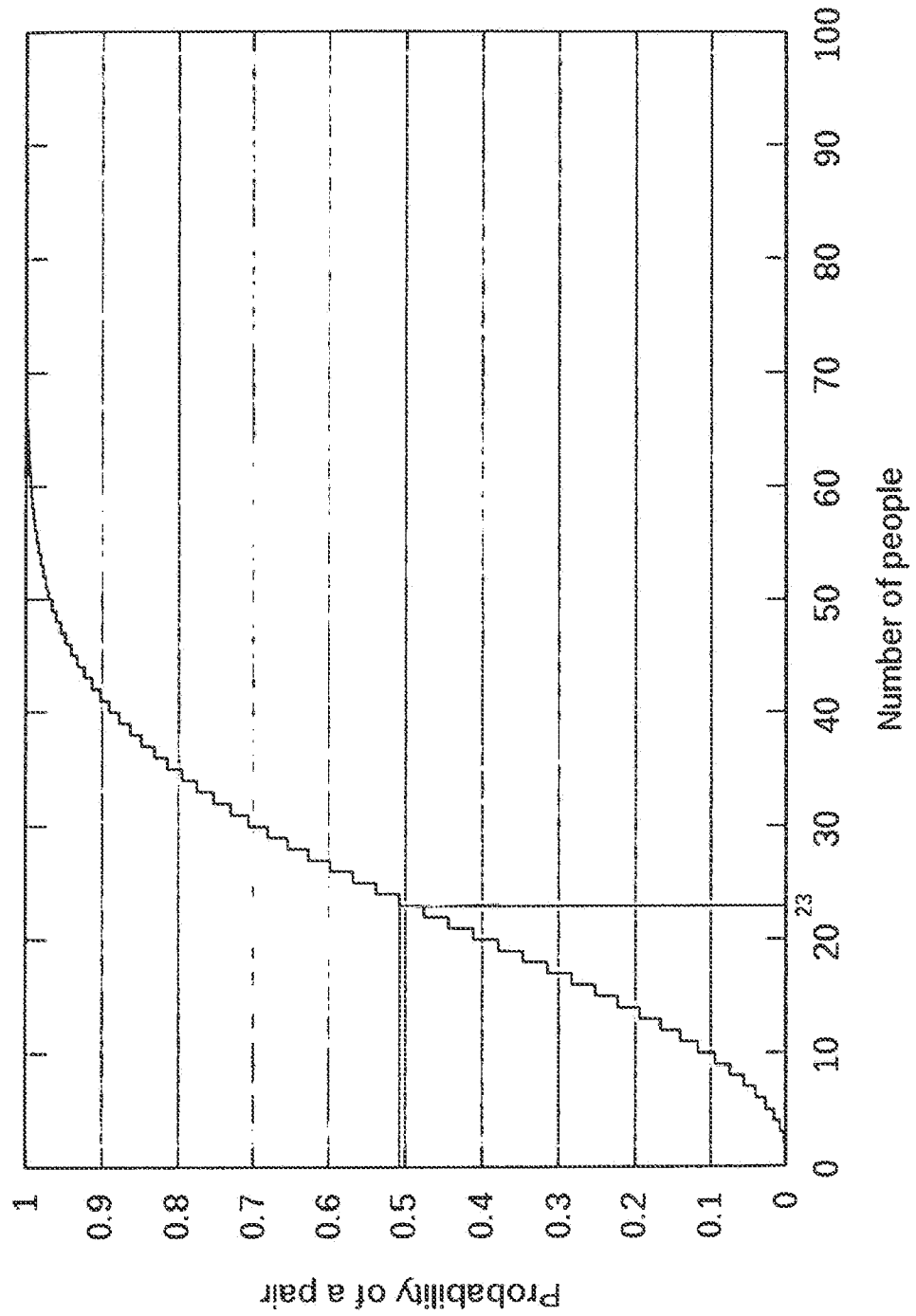
FIG. 32 is a graph that illustrates the birthday problem.

FIG. 27 is a topological depiction of one embodiment of the present disclosure in an operating context, showing the authentication device 18 sending log information 50 to a logging device 42 via a network 20.

FIG. 28 is a depiction of one embodiment of the present disclosure, showing a first table of policy rules 27 that is composed of one or more policy rules 26. Each policy rule 26 includes an identity 22 field, and may include a destination IP address field, a destination port field, a protocol field, a policy group field and a rule field.

FIG. 29 is a depiction of one embodiment of the present disclosure, showing an authenticated session table that is composed of one or more session descriptors 28. Each session descriptor 28 includes session field, and may include an identity 22 field, a network interface field, a context info field and an authentication processing field.

VI. Methods of Operation for Peer Authentication

The peer authentication driver, installed on a network endpoint device, provides network identity authentication by monitoring incoming IP packets for TCP SYN bit and securely sending those IP packets to an authentication device for authentication. The authentication device performs authentication and, if successfully authenticated, securely sends the IP packet and additional authentication information back to the peer authentication driver for delivery to the endpoint's TCP/IP stack.

One embodiment of the present disclosure provides endpoint security that utilizes a security appliance that does not require that the appliance to be in the network data path. In one embodiment of the present disclosure, the generalized security appliance is an authentication device 18. The network data path is a network. A peer authentication driver 46, which is installed at one end node of the network, receives and processes an IP packet 12. The IP packet 12, which contains a TCP header 14, is received by a network interface 49 which is located on the network. The IP packet 12 is conveyed to a network device driver 48, and then to a peer authentication driver 46. If the IP packet 12 is successfully authenticated, the peer authentication driver 46 sends the IP packet 12 to the TCP/IP stack at the destination which was requested by the initiator of the communication.

There are two components in endpoint peering; the peer authentication driver 46 and the authentication device 18. The peer authentication driver 46 is installed in a network endpoint device 10, logically inserted between the network device driver 48 and the TCP/IP protocol stack 32. When an IP packet 12 containing a TCP header 14 is received by a network interface 49 it is conveyed to a network device driver 48 which subsequently conveys it to the peer authentication driver 46. At 100, the IP packet 12 is received by the peer authentication driver 46. At 102 the IP packet 12 is compared against a second table of policy rules 36.

The second table of policy rules 36 allows the authentication device 18 to define policy rules that are implemented by the peering device driver 46. An example of a policy rule 26 in the second table of policy rules 36 is a source IP address that are being blocked and thus IP packets 12 matching the source IP address will be discarded. A second example of a policy rule 26 in the second table of policy rules 36 is a destination IP address for which Identity is not being authenticated and thus IP packets 12 matching the destination IP address will be forwarded without requiring authentication by the authentication device 18. A network interface 49 can also be specified in a policy rule 26. This allows different policies to be enforced depending upon which network interface 49 an IP packet 12 is received on. An example second table of policy rules 36 is shown below:

| Source IP Address | Source Port | Dest IP Address | Dest Port | Network Interface | Protocol | VLAN | Rule |
|---|---|---|---|---|---|---|---|
| 17.23.21.2 | any | any | any | any | any | any | drop |
| any | any | 21.44.2.11 | any | eth0 | TCP | any | allow |
| any | any | 21.44.2.45 | any | eth2 | TCP | 100 | redirect to 21.4.2.47 |
| 121.32.4.2 | any | any | any | any | any | any | drop |

After any policy rules have been enforced at 110, the TCP header 14 of the IP packet 12 is checked for TCP SYN bit 16 at 104. If TCP SYN bit 16 is set, then the IP packet 12 is sent to the authentication device 18 at 112 for authentication.

The IP packet 12 being sent to the authentication device 18 may be sent directly by the peer authentication driver 46, or in an alternate embodiment, the IP packet 12 may be sent to a peer authentication management application 44. The peer authentication management application 44 maintains pre-established TCP/IP sessions with one or more authentication devices 18. The TCP/IP sessions maintained by the peer authentication management application 44 should be protected by using the SSL, TLS or other cryptographic security protection to protect information conveyed between the peer authentication management application 44 and the authentication device 18.

At 112, in addition to sending the IP packet 12 to the authentication device 18, context information may be included with the IP packet 12. Context information is information describing the context of the connection request that is not contained within the included IP packet. For example, context information may include the VLAN id of connection request. The use of context information allows the peer authentication driver 46 to process the response from the authentication device 18 without requiring the peer authentication driver 46 to save any state or information regarding the IP packet 12. This context information will be returned by the authentication device 18 with the IP packet 12 once the IP packet 12 has been authenticated.

At 112, in addition to sending the IP packet 12 to the authentication device 18, information about the network interface 49 may be included with the IP packet 12.

At 104, if TCP SYN bit 16 is not set in the TCP header 14 of the IP packet 12, the IP packet 12 then compared against an authenticated session table 30 at 106. The authenticated session table 30 contains session descriptors 28. Each session descriptor 28 contains session information for each active TCP session. Each session descriptor 28 also contains the identity 22 that was authenticated to establish the TCP session. The session descriptor 28 also contains authentication processing information that enables the peer authentication driver 46 to properly respond to authenticated sessions. In one embodiment, the authentication processing information includes the TAC bidirectional identity token used to communicate bidirectional authentication. The TAC bidirectional identity token is provided to the peer authentication driver 46 by the authentication device 18.

If a session descriptor 28 matching the TCP session in the IP packet 12 is found, at 114, the IP packet is sent to the TCP/IP protocol stack 32.

If a session descriptor 28 matching the TCP session in the IP packet 12 is not found, at 108, the IP packet is discarded.

When an authentication device 18 receives an IP packet 12 from a peer authentication driver 46, at 116, it determines, at 118, the identity 22 of the sender of the IP packet 12. This determination is made using the identity recognizer 25. A preferred embodiment of determining the identity of the sender on the first packet of a TCP session is by using Transport Access Control (TAC). A second preferred embodiment of determining the identity of the sender on the first packet of a TCP session is by using statistical object identification (SOI). Once the identity 22 has been determined, a policy rule 26 in a first table of policy rules 27 is located that matches the identity 22.

The first table of policy rules 27 allows the authentication device 18 to define and maintain policy rules 26 based on identity 22. An example of a policy rule 26 in the first table of policy rules 27 is an identity 22 that is allowed to access a specified destination IP address. A second example of a policy rule 26 in the first table of policy rules 27 is a, identity 22 matching a specified destination IP address that will be redirected to an alternate IP address. A third example of a policy rule 26 in the first table of policy rules 27 is a wildcard rule that matches any identity 22 and instructs that an IP packet 12 will be discarded. An example first table of policy rules 27 is shown below:

| Identity | Dest IP Address | Dest Port | Protocol | Group | Rule |
|---|---|---|---|---|---|
| John | 121.34.22.15 | any | any | eng | allow |
| Mark | 121.34.21.100 | any | any | corp | redirect to 121.34.21.200 |
| any | 121.34.22.120 | any | any | any | drop |
| none | any | any | any | none | drop |

Once the identity 22 and the matched policy rule 26 has been determined, the policy rule 26, at 120 is enforced. For example, if the policy rule 26 is "Allow", then the IP packet 12, at 128, is sent back to the peer authentication driver 46.

In addition to sending back the IP packet 12 to the peer authentication driver 46, if context information was received with the IP packet 12, then context information should be returned with the IP packet 12. Additionally, if the peer authentication driver 46 requires additional information to complete the authentication processing, then authentication processing information should also be sent to the peer authentication driver 46.

Within the authentication device 18, the process of recognizing identity by the identity recognizer 25, performing authentication a matched policy rule 26 from a first table of policy rules 26 is generally performed by a peering service 24.

This enables the peering service 24 to be developed independently of the network interfaces 49, the network device drivers 48 and the TCP/IP protocol stack 32.

Within the authentication device 18, the process of recognizing identity by the identity recognizer 25 requires that information used in the process of identity recognition be temporarily stored in computer memory or computer processor registers. Both computer memory and computer processor registers are specialized electronic circuits that allow information to be written and at a later time read. The writing of either a computer memory or a computer processor register causes a transformation to the underlaying circuit apparatus.

At 120, if the policy is "Discard", then the IP packet 12 is discarded, at 122. The identity 22, the lack of identity and the associated policy may also be recorded in log information 50 that is sent to a logging device 42.

A logging device 42 can be any device used for the purpose of collecting, aggregating, processing, analyzing and storing log records. Commonly a logging device 42 is a network connected device with a large storage capacity and the ability to perform advanced analytics, such as a HADOOP cluster. Less sophisticated logging devices 42 can simply aggregate and store logs set to them across the network. Splunk is a common software package that runs on a logging devices 42.

At 118, as part of determining identity 22, the receipt of the IP packet 12 in conjunction with the identity determination process may produce policy rules 26 that must be communicated to the peer authentication driver 46. For example, if during SOI processing, an attack threshold is reached, the authentication device 18 may want to block all IP packets 12 originating from a certain source IP address for a period of time. Sending a policy rule 26 to the peer authentication driver 46, at 130, allows this to happen without requiring that the authentication device 18 discard all of the corresponding IP packets 12 directly. The policy rule 26 should include an expiration so that it will expire automatically and not require additional coordination or management from the authentication device 18. If no new rules are generated, then no additional processing occurs at 126.

When the peer authentication driver 46 receives an authenticated IP packet 12 from the authentication device 18 at 132, it creates a session descriptor 28 at 134. A session descriptor 28 contains session information from the TCP header 14 in the IP packet 12. A session descriptor 28 also contains the identity 22 that was authenticated. The session descriptor 28 also contains authentication processing information that enables the peer authentication driver 46 to properly respond to authenticated sessions. The session descriptor 28 may also contain context information and information about the network interface 49 on which the IP packet 12 was originally received.

At 136, the peer authentication driver adds the session descriptor 28 to an authenticated session table 30 and then sends the IP packet 12 to the TCP/IP protocol stack 32 at 138. An example authenticated session table 30 containing session descriptors 28 is shown below:

| Source | Destination | Protocol | Network Interface | Identity | Context Info | Auth Processing Info |
|---|---|---|---|---|---|---|
| 17.20.3.22: 34566 | 46.18.2.201: 443 | TCP | eth0 | Mike | 0x1243 | bi-token = 0xd54a2113 |
| 11.17.2.34: 16775 | 46.18.2.201: 443 | TCP | eth1 | John | 0xcd1a | bi-token = 0x5bc32a14 |
| 17.20.3.22: 34576 | 46.18.2.220: 80 | TCP | eth0 | Mike | 0xdc32 | bi-token = 0x12cba435 |
| 11.17.2.66: 23241 | 46.18.2.100: 443 | TCP | eth0 | Dave | 0xbba3 | bi-token = 0xcb34ad56 |

When the TCP/IP protocol stack 32 sends an IP packet 12, it is received by the peer authentication driver 46 at 140. At 142, the IP packet 12 is compared against an authenticated session table 30. The authenticated session table 30 must be both readable at step 142 and writable at step 136.

A preferred embodiment of the authenticated session table 30 is computer memory. Computer memory is a specialized electronic circuit that allow information to be written and at a later time read. This enables the authenticated session table 30 to be written at step 136 and read at step 142. The writing causes a transformation to the underlaying memory circuit apparatus.

If a session descriptor 28 matching the TCP session in the IP packet 12 is found, at 144, authenticated session processing is performed at 148. Authenticated session processing uses authentication processing information in the session descriptor 28 to properly respond to authenticated sessions. In one embodiment, the authentication processing information includes the TAC bidirectional identity token used to communicate bidirectional authentication. The TAC bidirectional identity token is provided to the peer authentication driver 46 by the authentication device 18. After authenticated session processing has been performed, the IP packet 12 is sent to the network device driver 48 at 146.

If a session descriptor 28 matching the TCP session in the IP packet 12 is not found, at 144, the IP packet 12 is sent to the network device driver 48 at 146.

When an authentication device 18 sends a policy rule 26 to the peer authentication driver 46, it is received by the peer authentication driver 46 at 150. The peer authentication driver 46 then inserts the policy rule 26 into the second table of policy rules 36 at 152.

VII. Apparatus for Peer Authentication

The apparatus that performs peer authentication is varied and diverse. The peer authentication driver 46 is usually implemented as a software module that is loaded or linked into an operating system. The peer authentication driver 46 may be created using software or firmware and may also be offloaded to a separate processing module where the functionality is provided by software, firmware, hardware or a combination of these. The peer authentication driver 46 may also reside within a hypervisor, providing authentication services to multiple operating system instances. The hypervisor functionality may also be implemented as software or firmware and may also be implemented as a separate processing module where the functionality of the hyper visor and the peer authentication driver 46 is provided by software, firmware, hardware or a combination of these.

The authentication device 18 is a network connected device that may be created as a physically separate physical appliance. The authentication device 18 may also be created as a virtual appliance that operates within a hypervisor environment. Both the physical appliance and the virtual appliance may be constructed using software, firmware or hardware or a combination of these. In the case of a virtual appliance and hardware offload, some functions provided by the authentication appliance 18 may be offloaded to hardware offload devices available within the virtual environment.

The apparatus that performs peer authentication may be used in communications devices, security devices, network routing devices, application routing devices, service delivery devices and other devices that are enabled by the addition of the efficient authentication of identity 22 and the application of network policy based on that identity 22.

VIII. Alternative Apparatus for Peer Authentication

One embodiment of the disclosure includes a network endpoint device, a remote network device and an authentication device. In one embodiment, the network endpoint device is a management computer used to control an electrical power substation. This management computer has been provisioned with an identity that can be authenticated. The remote network device is a controller in an electrical power substation. This controller switches power between various operating units of the substation. The management computer and the controller are connected by a network that is an insecure communications system. In one embodiment, the insecure communication system is the Internet.

The Internet is considered an insecure communication system because computers can access the computer network and attempt to connect to other computers, even when the connections are unauthorized; the requesting computer does not possess the authority to connect. Stated plainly, the Internet is insecure because it allows computers to connect to other computers which for which connections are not allowed. Traditional logon mechanisms using user names and passwords can often be monitored, allowing password theft. Identity provides a mechanism to securely communicate and authenticate an identity credential, even when communicated over an insecure communications system. Most identity credentials are provided using an identity certificate.

The process of authenticating an identity certificate require an interactive communication between the computer requesting access and the computer performing identity authentication. Interactive communications are required due to the design of the authentication process for identity certificates. One of the drawbacks of using interactive authentication is that the authentication process must, by definition engage in communications with the requesting entity in order to perform the interactive authentication. In computer systems when interaction is required, responding to the requesting entity occurs before the authentication process has completed. This creates an attack surface for an attacker. Non-interactive authentication does not require communication from the computer performing identity authentication and the computer requesting access. In non-interactive authentication, the authentication process is completed before any response is made to the computer or device requesting access. Statistical Object Identification (SOI) is one embodiment of a non-interactive authentication process. In SOI, a statistical object is an identity representation. SOI operates by using an identity certificate as an original object and using a sender to communicate a stream of statistical objects, based on the original object, to a communications receiver. The communications receiver aggregates the received statistical objects until an original object is unambiguously determined and the calculated probability satisfies a trusted probability threshold. The statistical objects being communicated are cryptographically secured. Each statistical object is generated using a cryptographic key associated with the original object, the identity certificate. This cryptographic key must be available to the device performing authentication. The statistical object, as an identity representation, is cryptographically secured to enable the authentication of the identity representation and to prevent the counterfeiting or spoofing of identity representation by an attacker.

The authentication device communicates with the controller via a secure communications system. A secure communications system is only authorized computers and devices are allowed to communicate and the communications are protected from eavesdropping and modification.

When the management computer, the first device, needs to communicate with the substation controller, the second device, it will establish a TCP session over the unsecured network, the Internet. In doing this, the management computer sends a TCP/IP packet requesting that a TCP session be established to the substation controller. The management computer, as described above, has been provisioned with an identity that can be authenticated. Using SOI, the management computer generates a statistical object and communicates it as an identity representation in the TCP/IP request to the substation controller.

The substation controller receives the TCP/IP session request, and determining that it is a TCP/IP session request, communicates the request to the authentication device. This communication with the authentication device, is made via a secure communications system. In one embodiment, the TCP/IP session request is communicated over a previously established encrypted to the authentication device. The authentication controller has a cryptographic keys that enables it to authenticate and determine the identity from a received identity representation. Using the authentication device does not require that the substation controller has any cryptographic keys used to authenticate or determine the identity from a received identity representation.

When the authentication device receives the TCP/IP session request, it authenticates and determines the identity from the identity representation. Once the identity has been determined, the authentication device determines if the identity has the authority to access the substation controller. Within the authentication device, there is a table of policy rules that has been pre-configured. Within the table of policy rules are policy rule entries, with each entry containing an identity and one or more devices that the identity is authorized to access. The identity from the TCP/IP connection request is compared against the table of policy rules. If the identity is not found in the table of policy rules, the TCP/IP connection request is discarded and no response is made to the substation controller. If the identity is found in the table of policy rules, but the address of the substation controller is not listed as one of the devices that the identity is authorized to access, the TCP/IP connection request is discarded and no response is made to the substation controller. If the identity is found in the table of policy rules, and the address of the substation controller is listed as one of the devices that the identity is authorized to access, the authentication device responds to the substation controller. In the response to the substation controller, the authentication device includes the original TCP/IP session request.

When the substation controller receives the response from the authentication device, including the original TCP/IP session request, the substation controller has an authenticated session table. Within the authenticated session table are entries called session descriptors. The substation controller takes the original TCP/IP session request and uses the information contained within it to create a session descriptor. The session descriptor described the specific TCP/IP session that has been authenticated by the authentication device. Once the session descriptor has been created in the authenticated session table, the original TCP/IP session request is passed to the TCP/IP stack on the substation controller. This establishes an authenticated communications session from a management computer to the substation controller across an insecure communications system. The authentication of the identity representation was performed using non-interactive authentication.

IX. Statistical Object Identification Overview

One embodiment of the present disclosure provides a method for authenticating a communication. In an example contained in Section VI, a communication between a user (Ben) and a remote system is described. Communications received by the remote system must be authenticated before they are allowed. In this Specification, and in the Claims that follow, the terms authenticate and authentication are intended to mean that the identity of a communicator or an initiator of a communication has been verified, and that a particular communication is permitted, allowed or otherwise approved to proceed into the remote system.

One limitation of current information networks is that it is difficult to verify or approve a communication before the communication has been allowed to penetrate a network. One reason for this difficulty is that the means of verification, which is called a "certificate," is too large to send to the network in the initial set of digital information which initiates the communication, and which ultimately leads to an authentication.

One embodiment of the present disclosure solves this problem by reducing the information in the certificate which is used to authenticate the communication before it is allowed to proceed by converting the certificate to a much smaller "statistical object." The method allows the network to determine the identity of the initiator of the communication before the communication is given access to the network. This method provides a security feature that substantially eliminates potentially detrimental and malicious attacks that could be perpetrated on the network using conventional technology.

X. Statistical Object Identification Preferred and Alternative Embodiments

Figure 33:
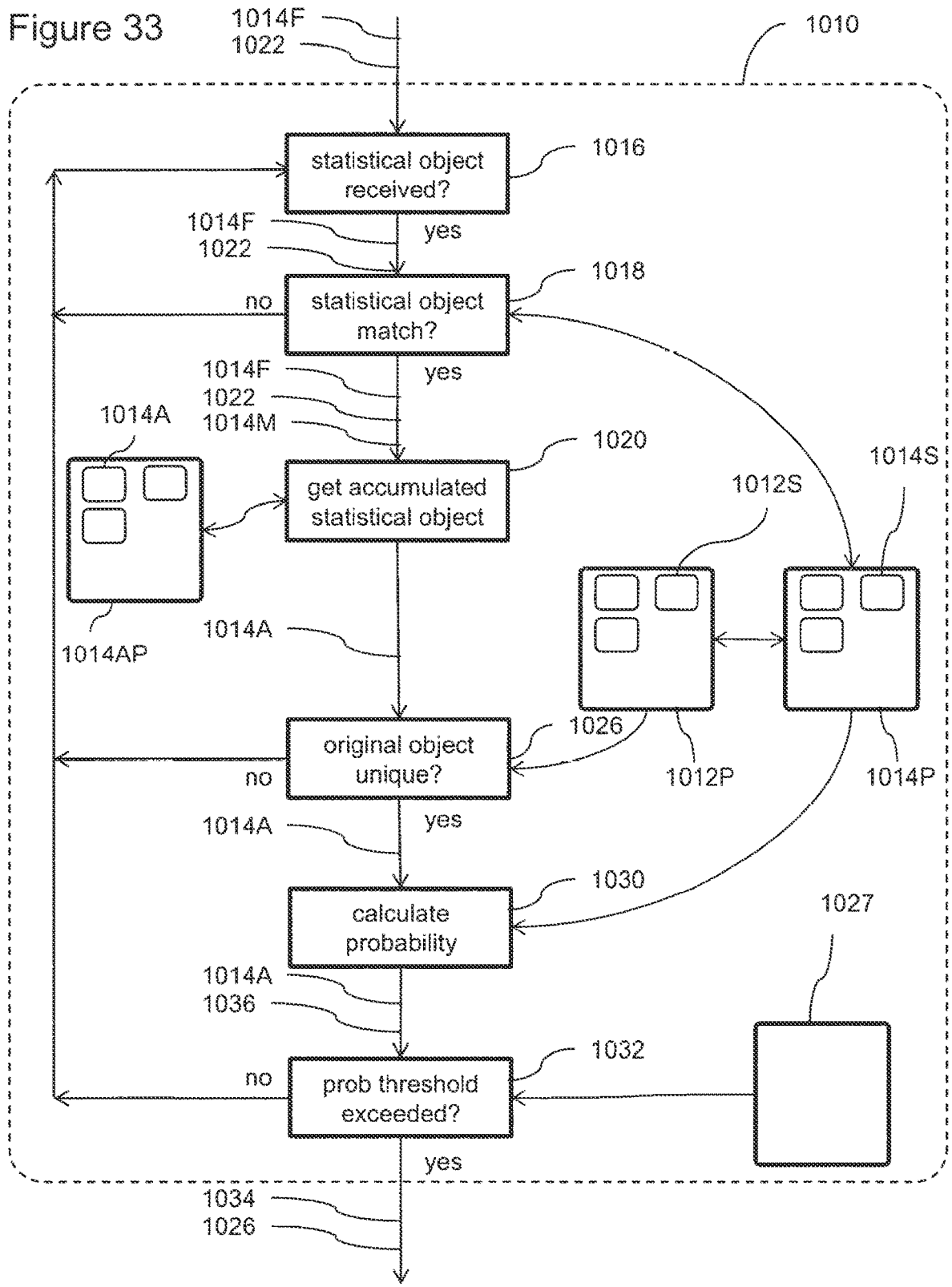
FIG. 33 is an illustration which shows an embodiment of SOI.

FIG. 33 is an illustration which shows one particular embodiment of the present disclosure, which includes a device 1010. A device 1010 stores and/or processes at least one original object 1012S and at least one statistical object 1014S. In another embodiment, the device 1010 includes a plurality of original objects 1012P and a plurality of statistical objects 1014P. In this Specification, and in the Claims that follow, a single original object is identified as 1012S (S for singular), while a plurality of original objects is accompanied by 1012P (P for plurality). In this Specification, and in the Claims that follow, a single statistical object is identified as 1014S (S for singular), while a plurality of statistical objects is accompanied by 1014P (P for plurality). The term "device" is intended to encompass any suitable means for conveying and/or storing information or data. In the example described in Section VI, the device 1010 is a remote system. In the embodiments described below, device 1010 includes all the other components subsequently described in the Specification.

In one embodiment, the device 1010 includes a communications receiver 1016 which is connected to an external network and to a statistical object matcher 1018. The statistical matcher 1018 is connected to an accumulated statistical object selector 1020, and has access to the plurality of statistical objects 1014P stored in the device 1010. The accumulated statistical object selector 1020 is connected to an original object identifier 1026 and has access to a plurality of accumulated statistical objects 1014AP. The original object identifier 1026 is connected to a probability calculator 1030 and has access to the plurality of original objects 1012P. The probability calculator 1030 is connected to the threshold comparator 1032 and has access to the plurality of statistical objects 1014P. The probability comparator 1032 is connected to the output of the device 1010, and has access to a probability threshold value 1027.

Figure 34:
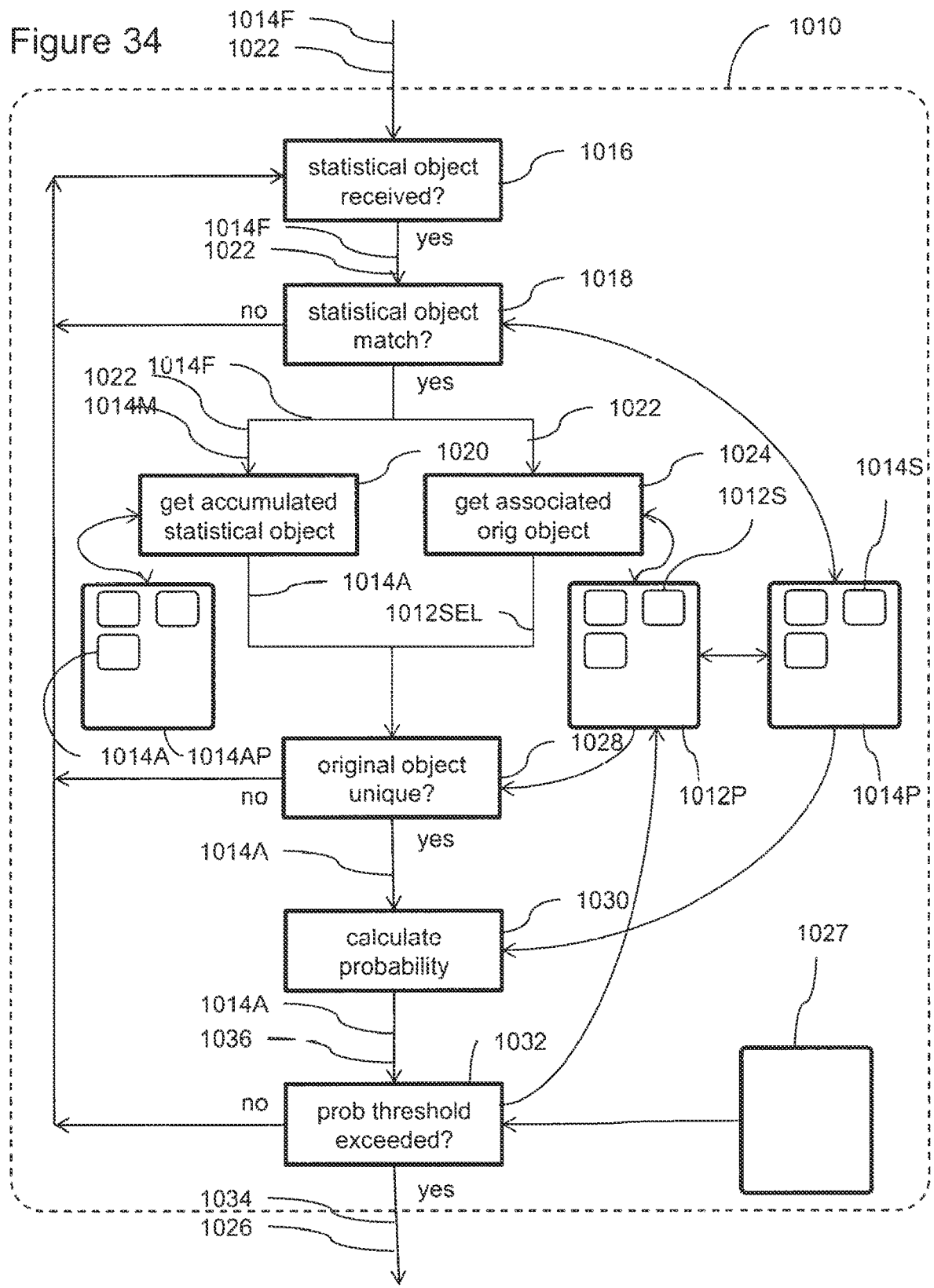
FIG. 34 is an illustration which shows an alternate embodiment of SOI.
Figure 35:
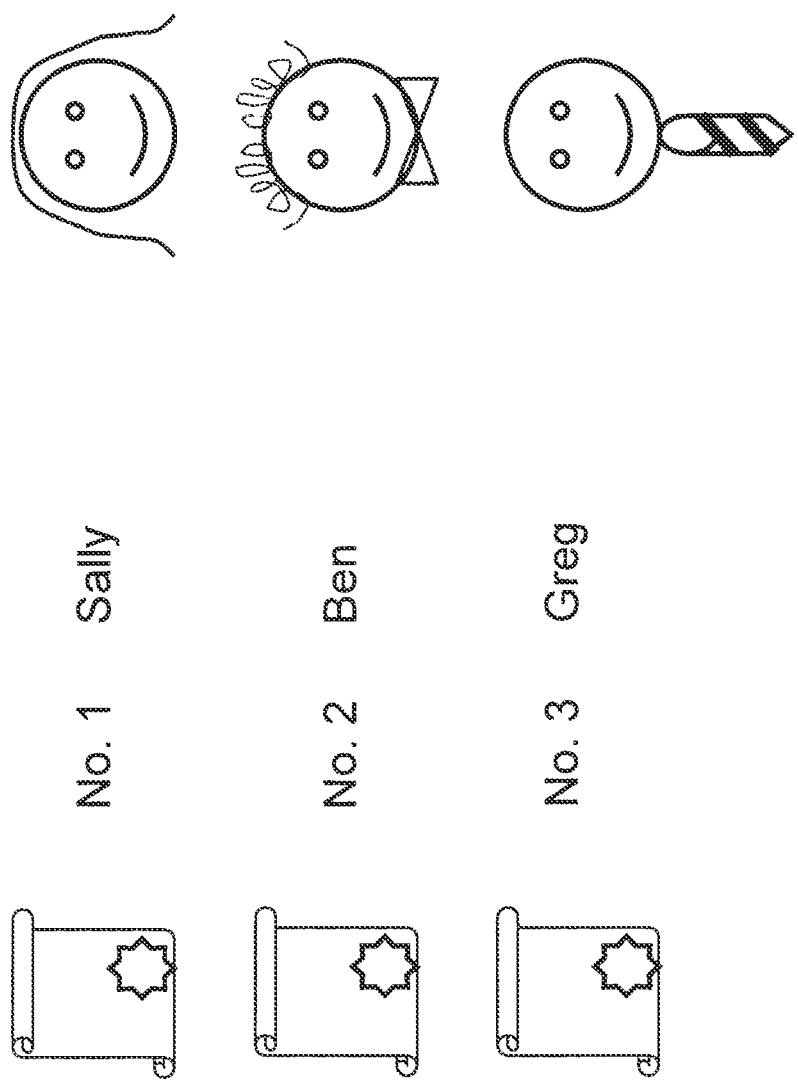
FIG. 35 illustrates certificates that are used to authenticate a communication.
Figure 36:
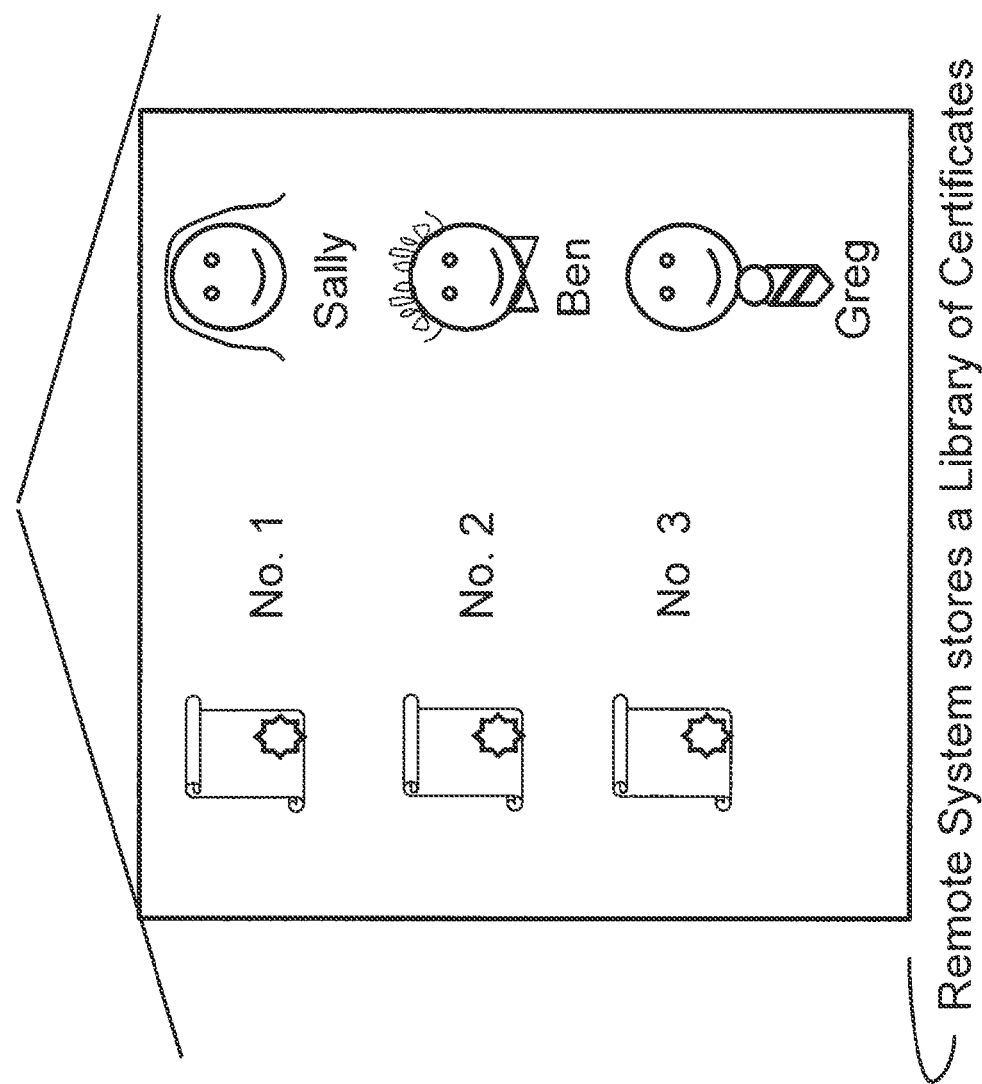
FIG. 36 shows certificates stored in a remote system.
Figure 37:
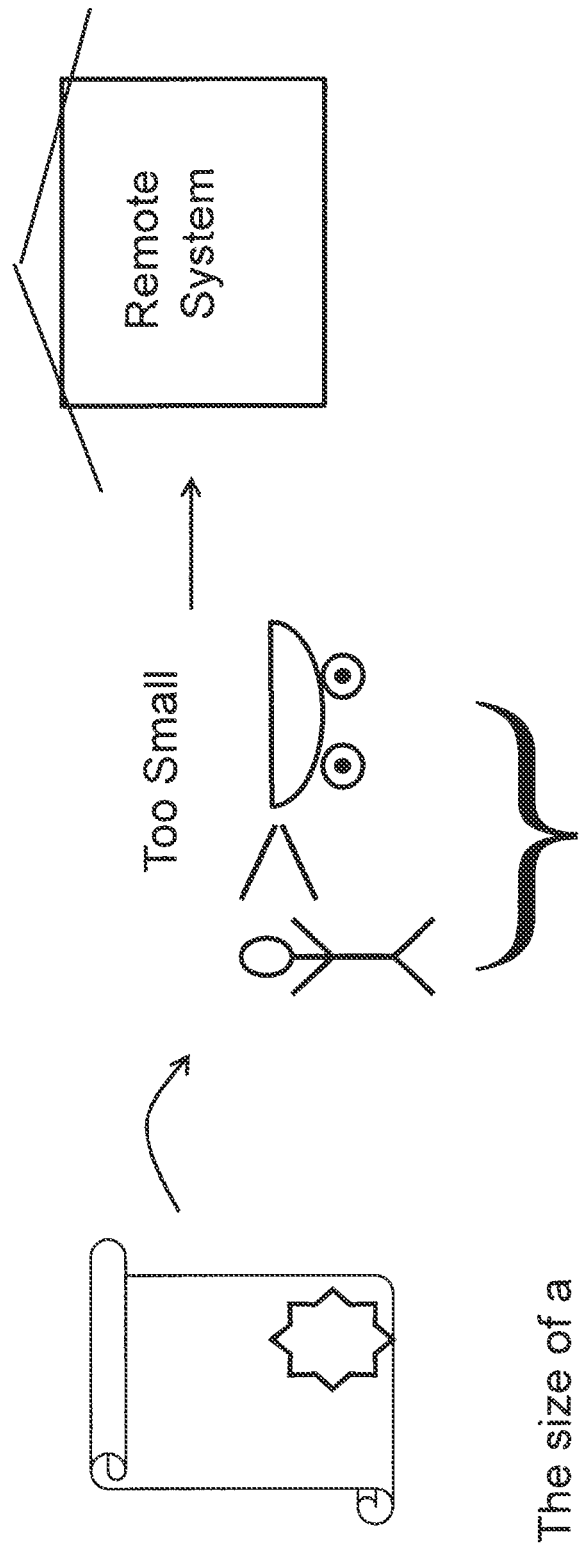
FIG. 37 shows that certificates are too large to send to the remote system in their original form.
Figure 38:
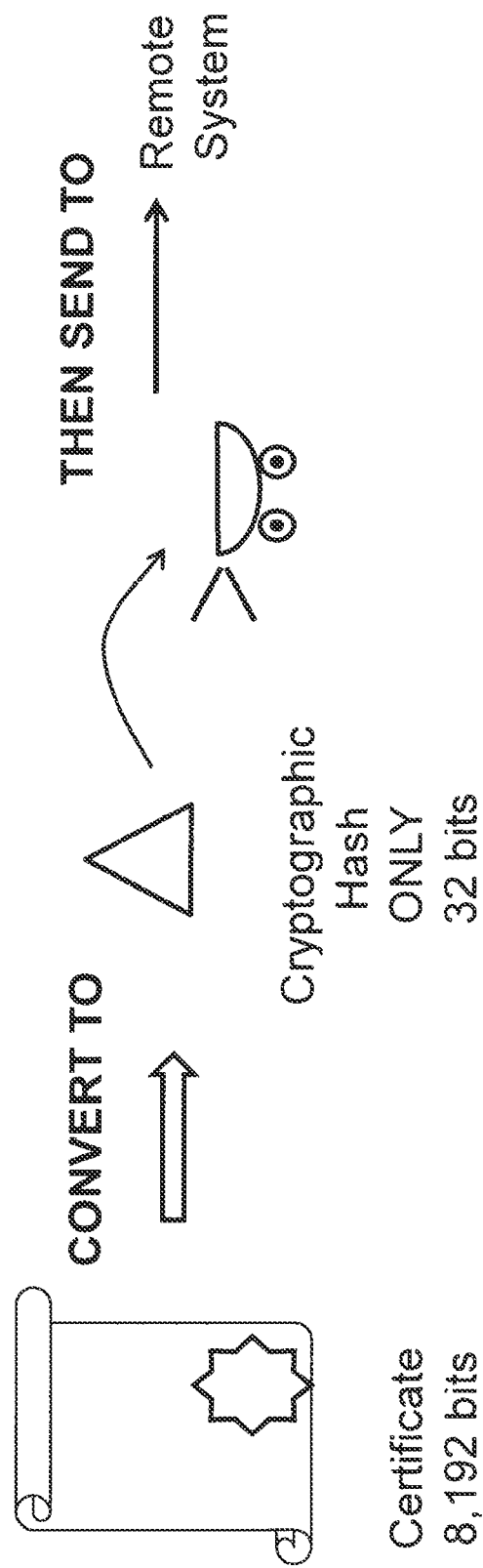
FIG. 38 depicts a solution: converting the certificates, which are original objects, to cryptographic hashes, or statistical objects.
Figure 39:
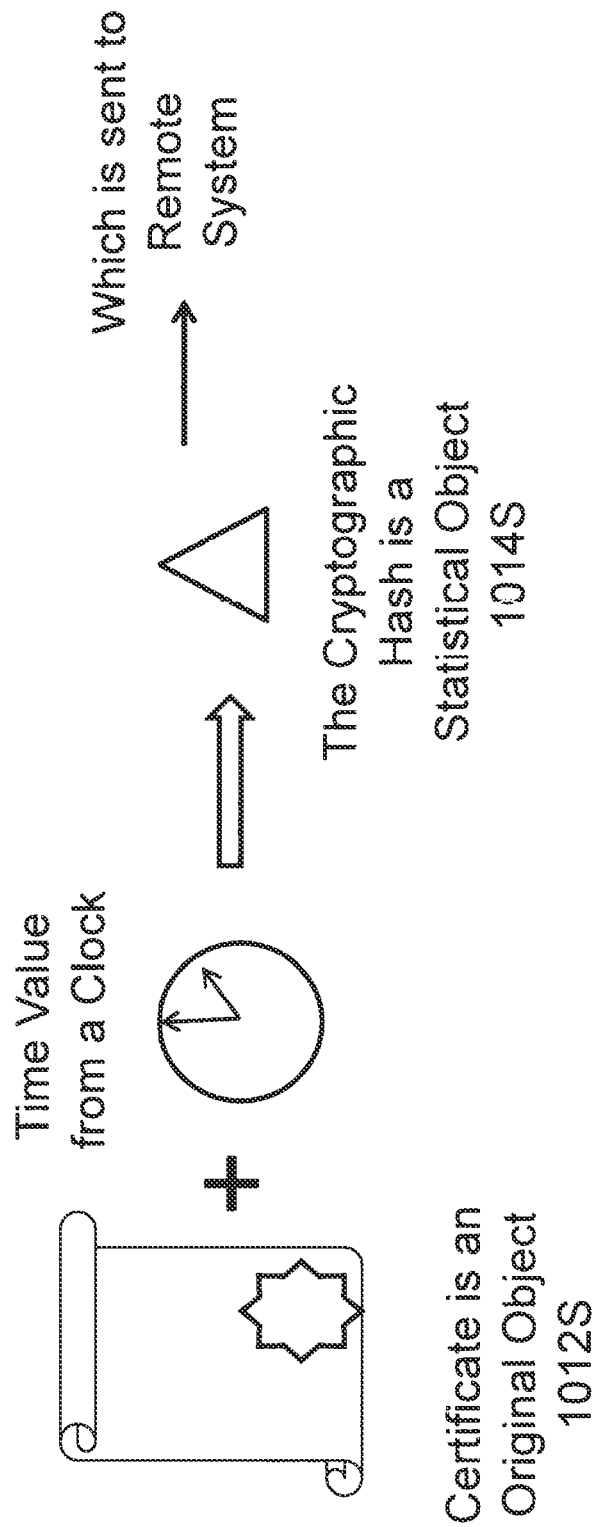
FIG. 39 shows how statistical objects and a time value from a clock are sent to the remote system.
Figure 40:
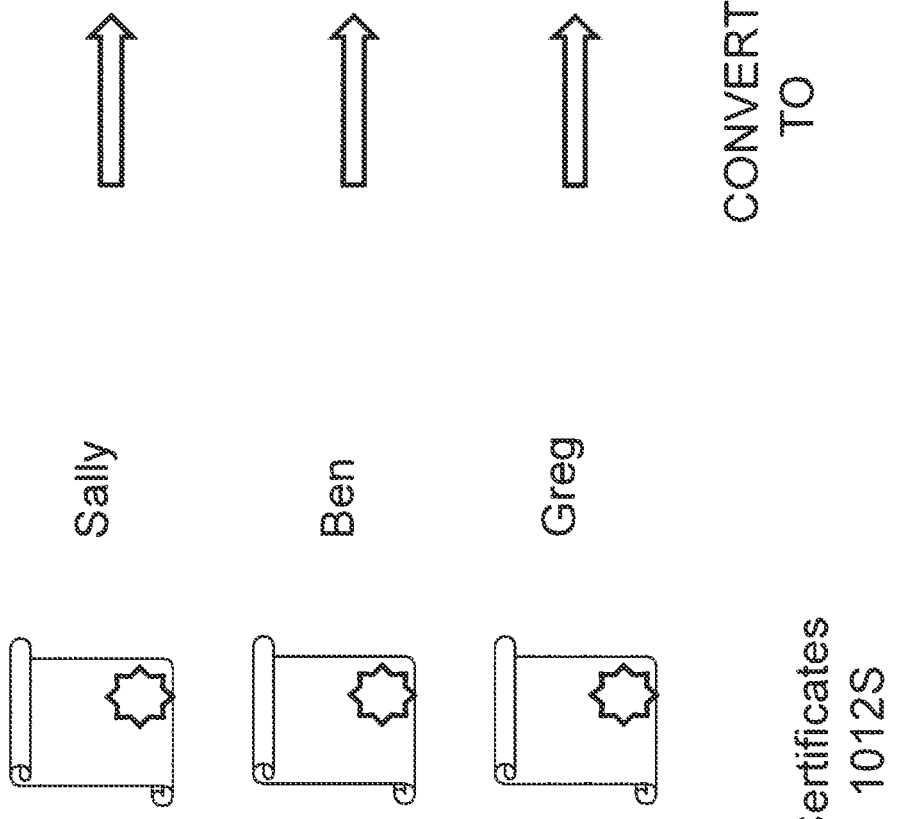
FIG. 40 illustrates the result of the conversion of three original objects to three statistical objects.
Figure 41:
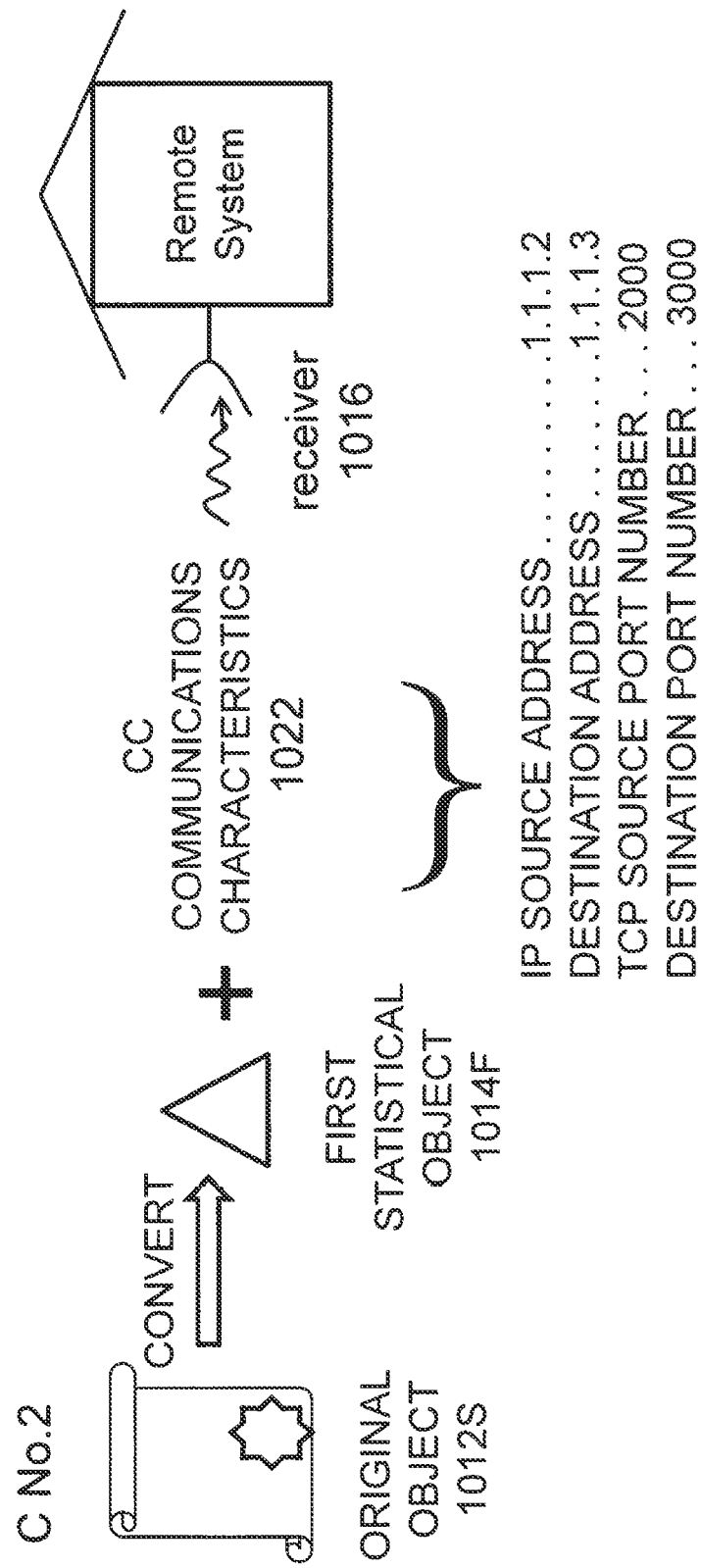
FIG. 41 furnishes a view of Ben's first communication with the remote system.
Figure 42:
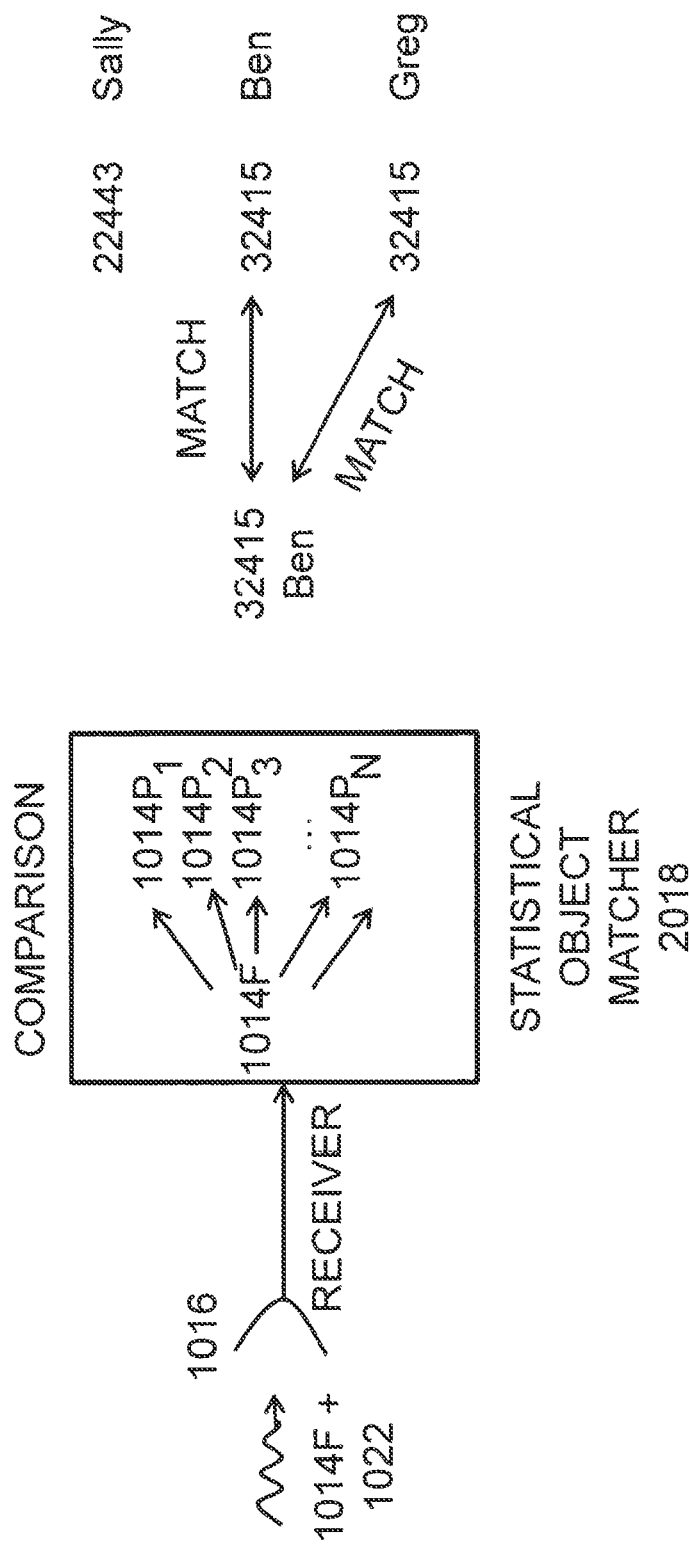
FIG. 42 depicts the comparison process that occurs within a statistical object matcher.
Figure 43:
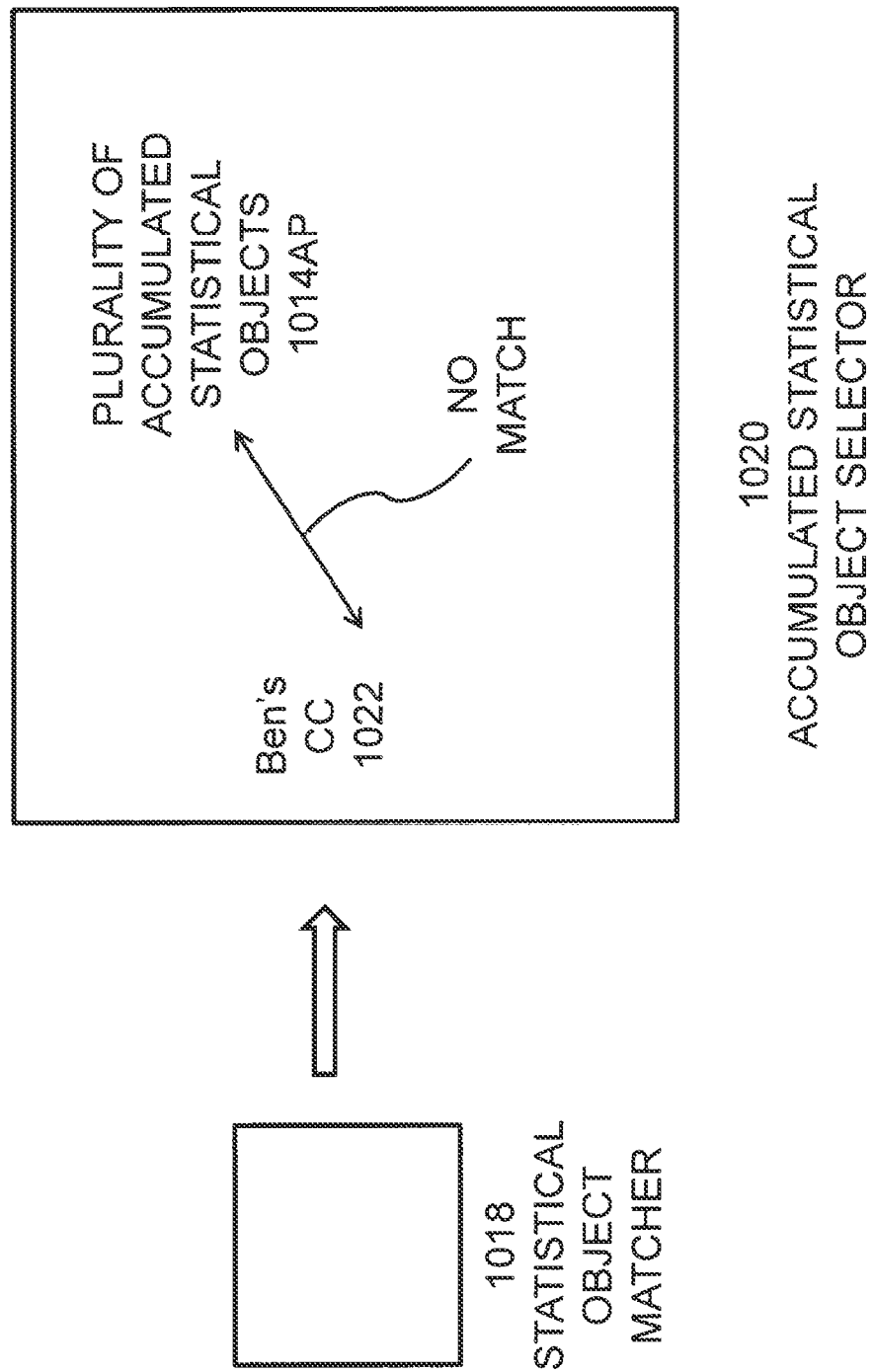
FIG. 43 illustrates the role of an accumulated statistical object selector.
Figure 44:
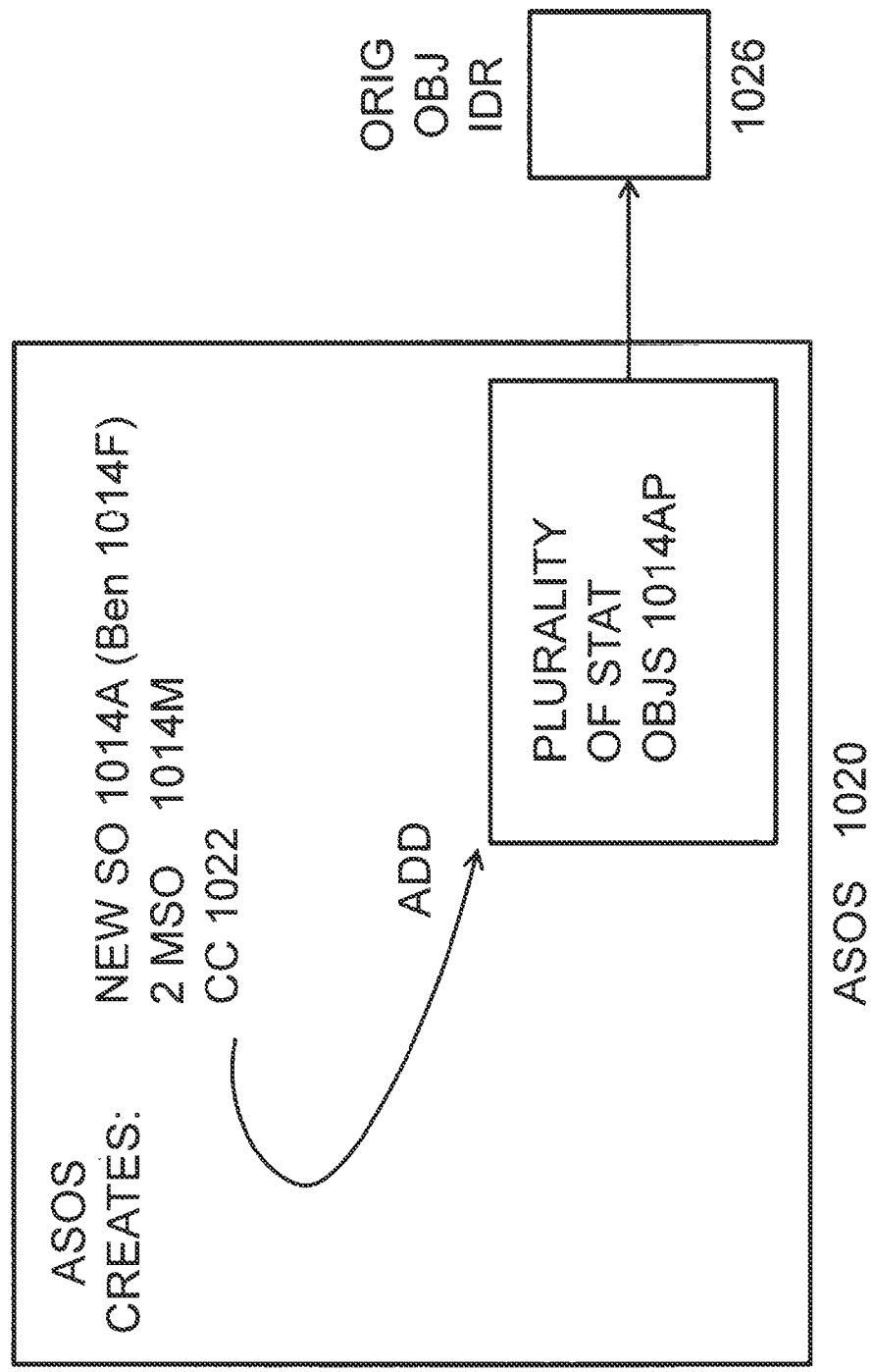
FIG. 44 illustrates the function of an accumulated statistical object selector.
Figure 45:
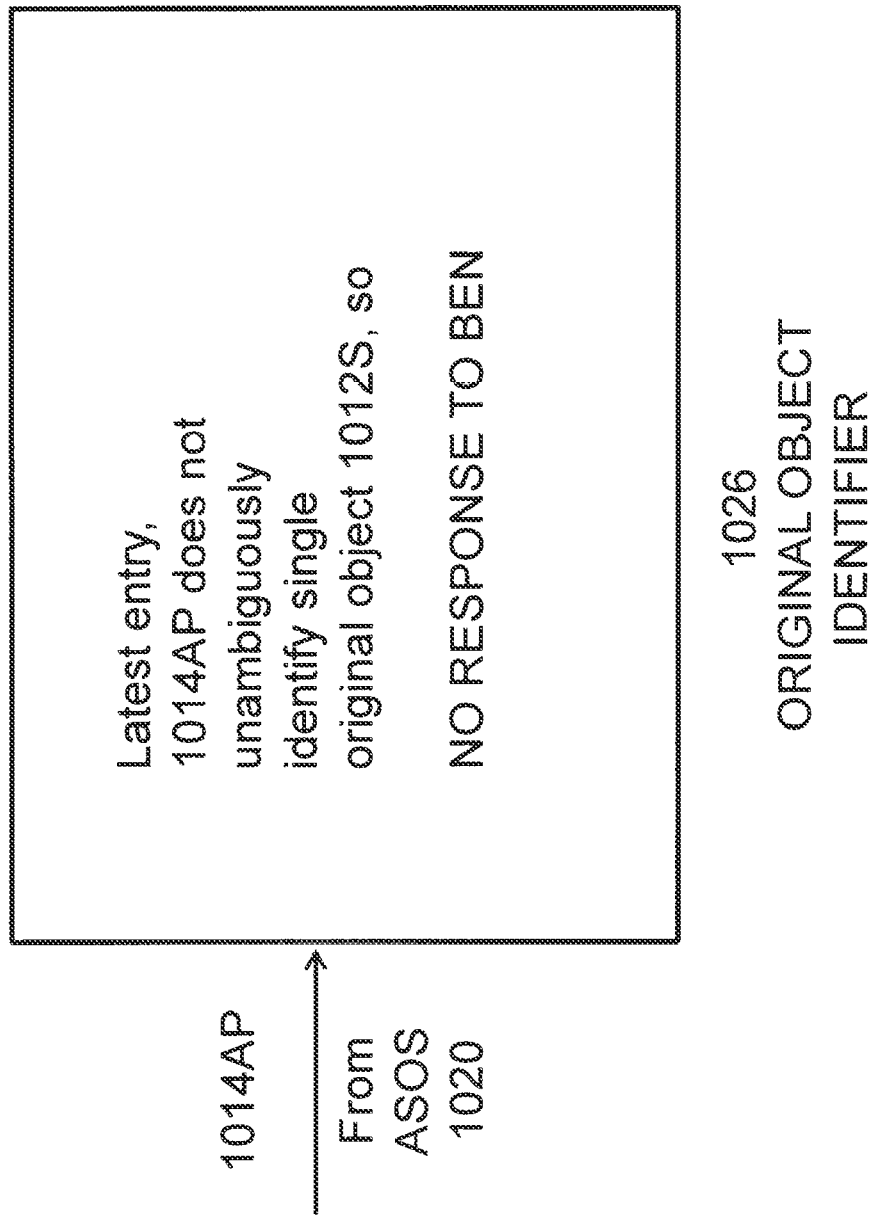
FIG. 45 illustrates the task of an original object identifier.
Figure 47:
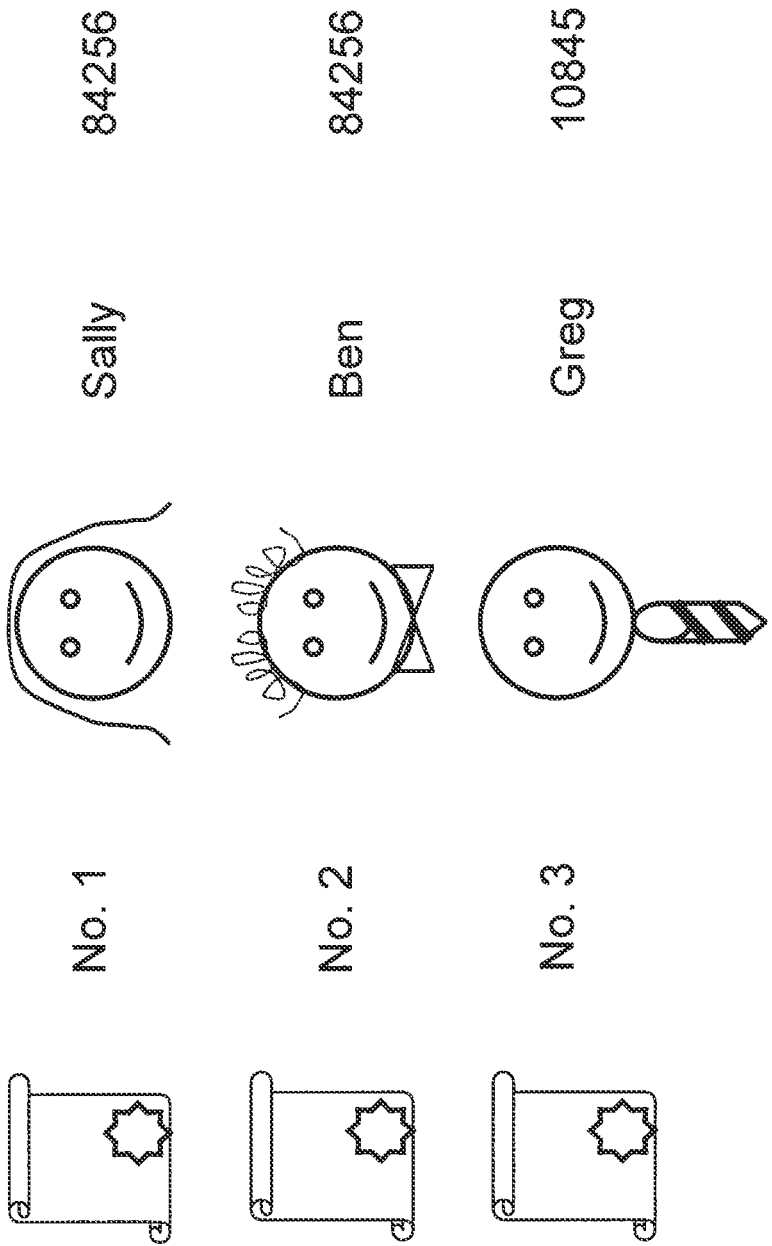
FIG. 47 supplies a schematic view of Ben's second attempt to communicate with the remote system.
Figure 48:
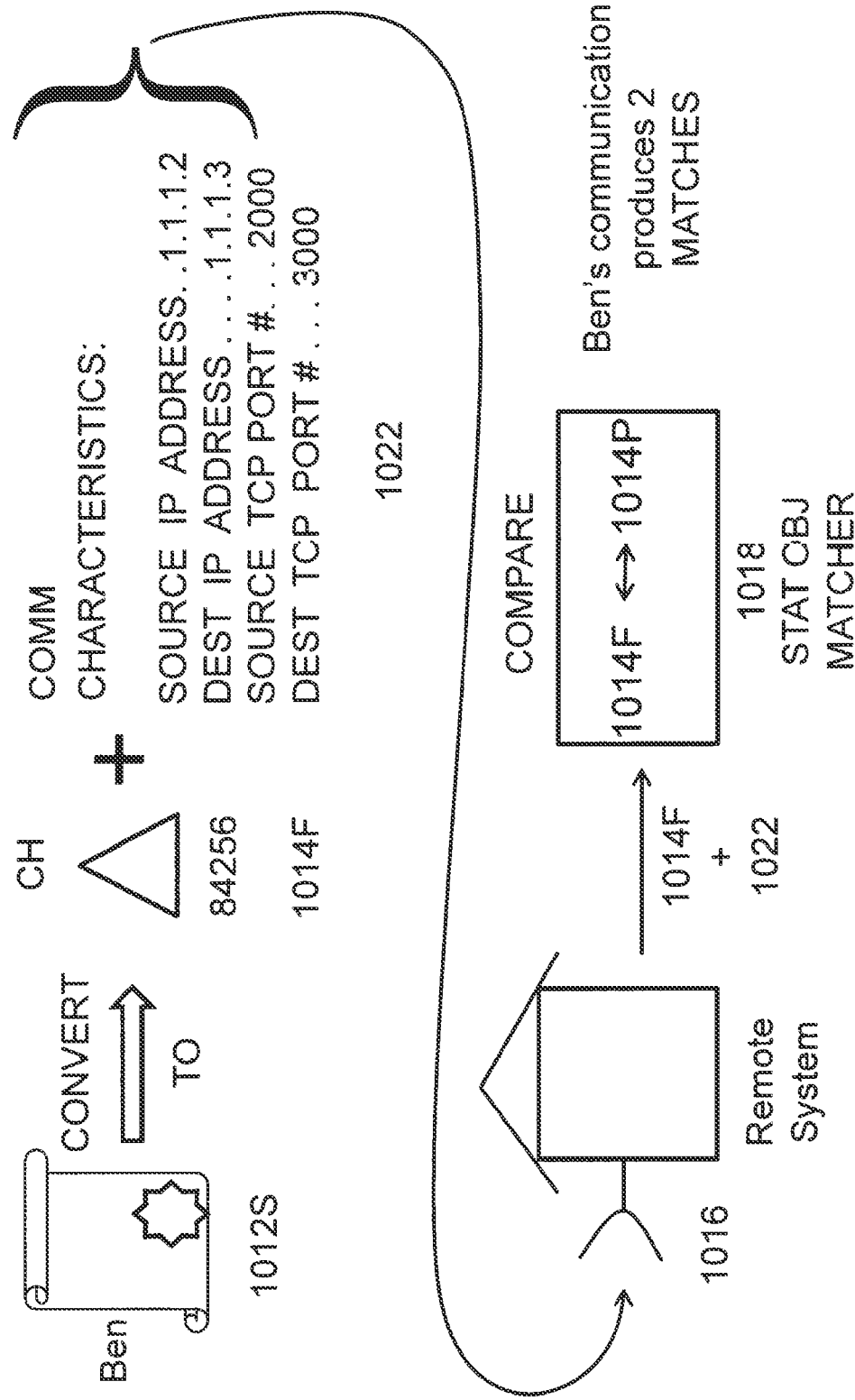
FIG. 48 depicts the second communication, and the resulting match that is produced in the statistical object matcher.
Figure 49:
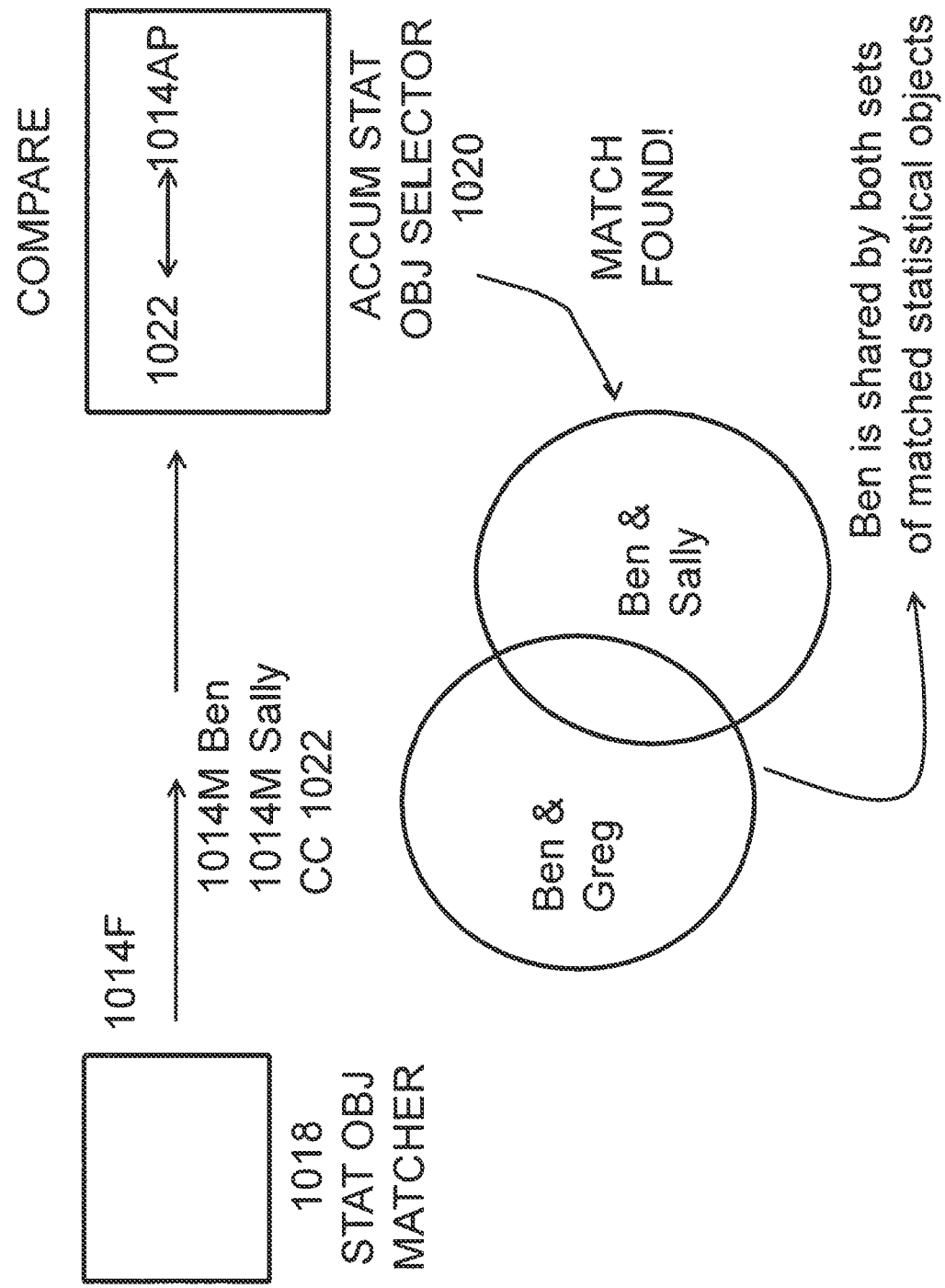
FIG. 49 illustrates the process of finding a match.
Figure 50:
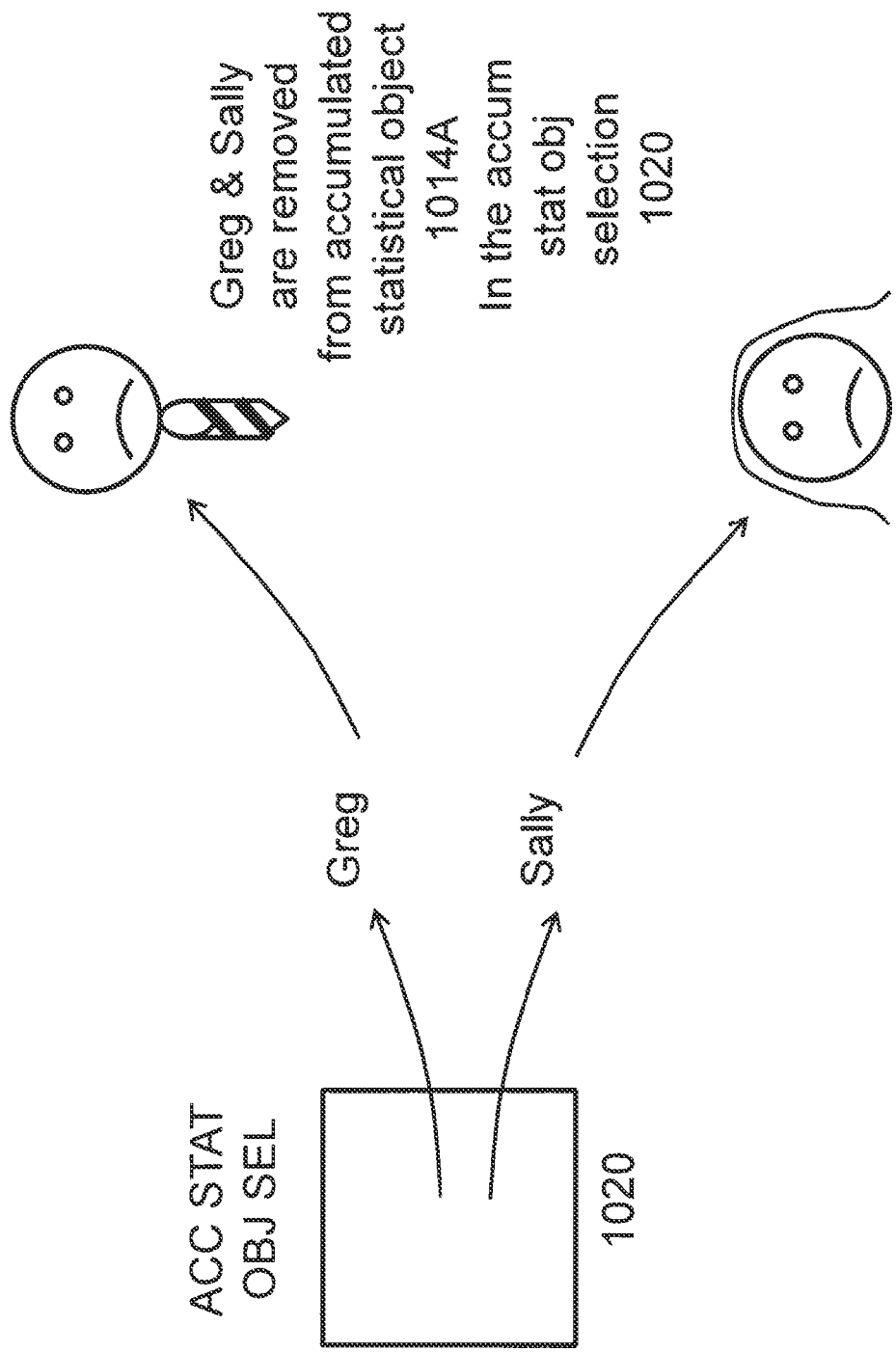
FIG. 50 shows how the accumulated statistical object selector discards statistical objects that do not lead to an authenticating match.
Figure 51:
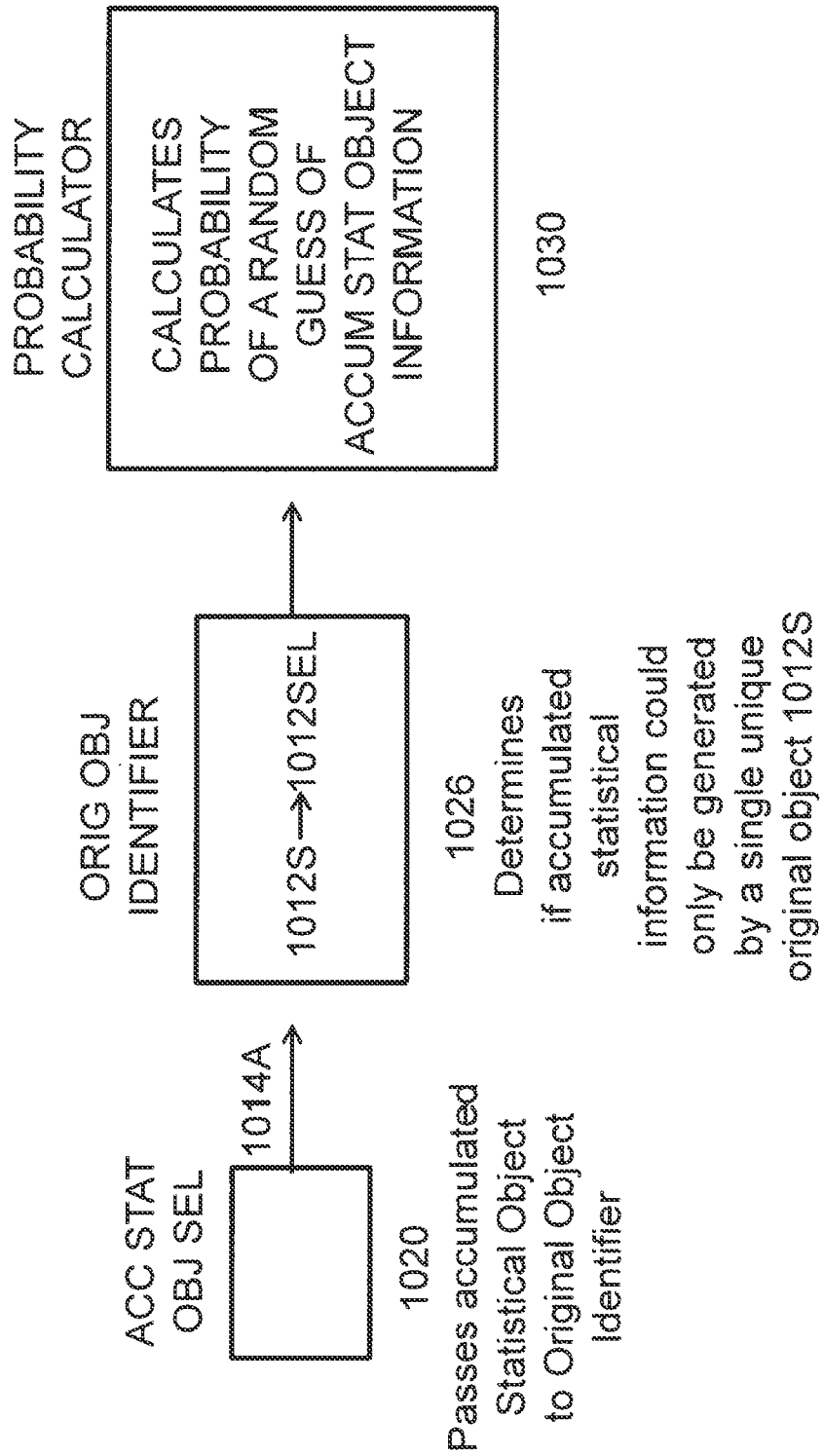
FIG. 51 furnishes a view of a probability calculator, which computes the probability of a successful guess of accumulated statistical object information.
Figure 52:
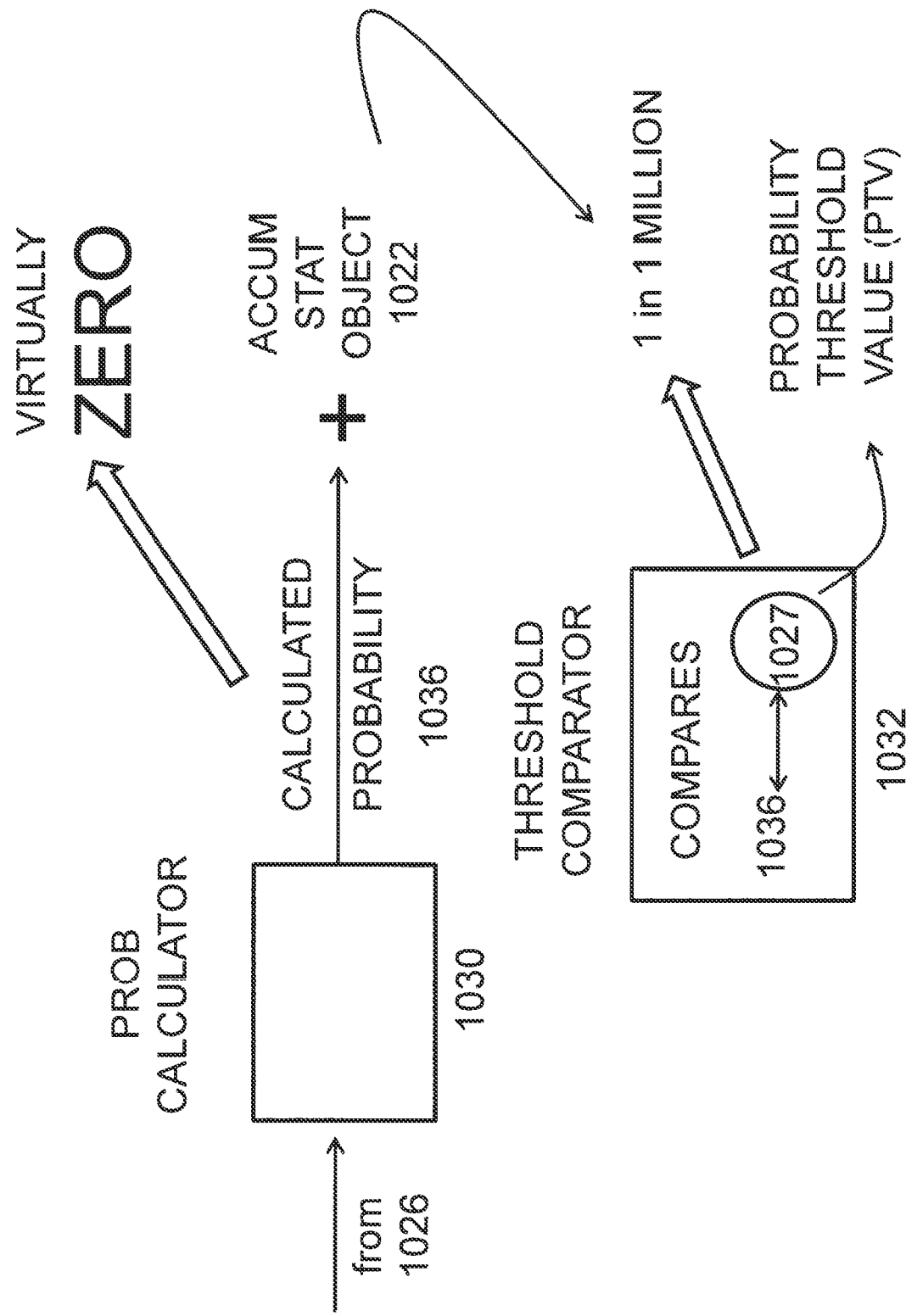
FIG. 52 reveals the function of a threshold comparator, which compares the calculated probability to a probability threshold value.
Figure 53:
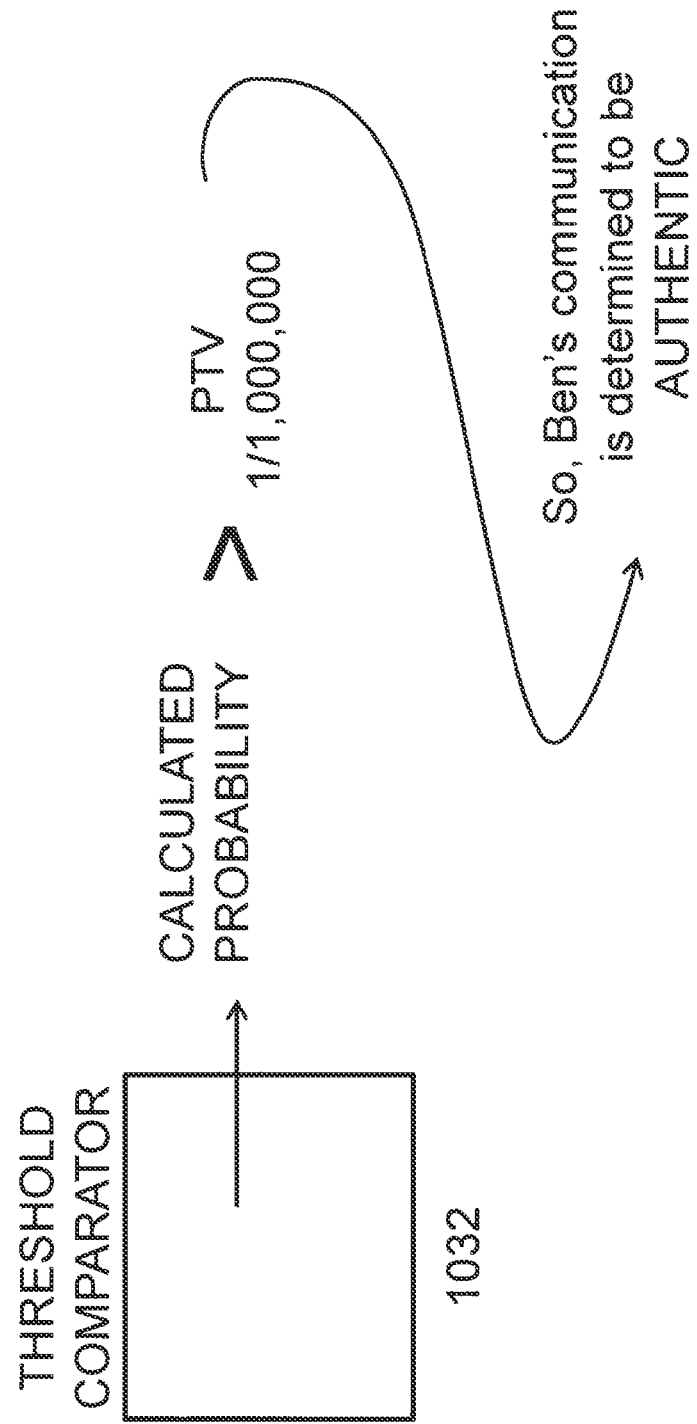
FIG. 53 exhibits the final result, the authentication of Ben's second communication.

FIG. 34 is an illustration which shows an alternate embodiment of the present disclosure. Within a device 1010, a plurality of original objects 1012P is used to generate a plurality of statistical objects 1014P. A communications receiver 1016 is located within device 1010, and is connected to the output of device 1010 and to a statistical matcher 1018. The statistical object matcher 1018 is connected to an accumulated statistical object selector 1020 and an associated original object selector 1020 and has access to the plurality of statistical objects 1014P. The accumulated statistical object selector 1020 is connected to an associated original object identifier 1028 and has access to a plurality of accumulated statistical objects 1042. The associated original object selector 1046 is connected to an associated original object identifier 1028 and has access to a plurality of original objects 1012P. The associated original object identifier 1028 is connected to the probability calculator 1030 and has access to the plurality of statistical objects 1014P. The probability calculator 1030 is connected to the threshold comparator 1032 and has access to the plurality of statistical objects 1014P. The probability calculator has access to a threshold probability value 1027 and the plurality of original objects 1012P.

IX. Methods of Operation for Statistical Object Identification

In a preferred embodiment of the disclosure, a device 1010 contains a plurality of original objects 1012P. For each original object 1012S, at least one statistical object 1014S is generated. Multiple statistical objects 1014P may be generated from a single original object 1014S and each statistical object 1014S has a name, pointer or other indication of the original object 1012S from which it was created. Since multiple statistical objects 1014P may be created from a single original object 1012S, multiple pointers or other indicators of additional inputs to the statistical object generator may also be provided. These additional inputs may include clock information, keying information, state information, and other relevant and useful information. The plurality of statistical objects 1014P generated from the plurality of original objects 1012P is maintained and is available within the device 1010. The plurality of statistical objects 1014P may be individually or as a group, periodically removed, added to, invalidated or otherwise refreshed. Likewise, the plurality of original objects 1012P may be individually or as a group removed, added to, invalidated or otherwise refreshed.

When a first statistical object 1014F is received by a communications receiver 1016, it is received within the context of a communication and has communications characteristics 1022 associated with it. These communications characteristics 1022 may include the network address of the sender of the communication, the physical interface or port upon which the communication was received, the logical interface upon which the communication was received. For network communications, the communications characteristics 1022 may include the IPv4 or IPv6 address of the sender, session information including local and remote addresses and local and remote port numbers, VLAN identifiers and other network, protocol stack and application information. Communications characteristics 1022 may also include security association information. Physical characteristics of the communications characteristics 1022 may include the frequency or frequencies at which the communication was received. Physical characteristics of communications characteristics 1022 may also include phase information, time information and amplitude information.

After a first statistical object 1014F has been received, using a statistical matcher 1018, the first statistical object 1014F is compared against the plurality of statistical objects 1014P. If a matching statistical object 1014M is not found, the first statistical object 1014F is not identified and no further statistical object resolution activity occurs on this reception of a statistical object. If there is at least one statistical object 1014S in the plurality of statistical objects 1014P that matches the first statistical object 1014F, then the first statistical object 1014F, all matching statistical objects 1014M and indicators of their respective original objects 1012P and the communications characteristics 1022 are passed to an accumulated statistical object selector 1020.

The accumulated statistical object selector 1020 takes the input communications characteristics 1022 and looks for an accumulated statistical object 1014A within the plurality of accumulated statistical objects 1014AP that has matching communication characteristics 1022. If a matching accumulated statistical object 1014MA is found, the first statistical object 1014F and the list of all original objects 1012P associated with the matched statistical objects 1014M are added to the matched accumulated statistical object 1014MA. This increases the amount of statistical object information. If a matching accumulated statistical object 1014MA is not found, a new accumulated statistical object 1014NA is created and added to the plurality of accumulated statistical objects 1014AP. The communications characteristics of the accumulated statistical object is copied from the communications characteristics 1022, the first statistical object 1014F and the list of all original objects 1012P associated with the matched statistical objects 1014M are added to the accumulated statistical object 1014A. In both cases, the resulting accumulated statistical object 1014A is passed to the original object identifier 1026.

If an accumulated statistical object 1014A is inactive for a period of time, the accumulated statistical object 1014A may be removed from the plurality of accumulated statistical objects 1014AP. An accumulated statistical object 1014A may be considered inactive if it has not unambiguously selected a unique original object 1012S and first statistical objects 1014FP with matching communications characteristics 1022 have not been received for a period of time. An accumulated statistical object 1014A may also be considered inactive if it has selected a unique original object 1012S, but the accumulated statistical object exceeds the probability threshold value 1027 and first statistical objects with matching communications characteristics 1022 have not been received for a period of time.

The original object identifier I 026 takes the given accumulated statistical object 1014A and determines if the accumulated statistical information within the accumulated statistical object could only be generated by a single, unique original object 1012S. This determination is made by successively pruning associated original objects that, as additional statistical object information is added, fail to be able to generate the stream of statistical objects that matches the received statistical objects until only a single original object remains. If a unique original object 1012S is not determined, the accumulated statistical object 1014A is updated with the pruned list of associated original objects 1012P, and no further statistical object resolution activity occurs on this reception of a statistical object. If a unique original object 1012S is determined, the selected original object 1012SEL is indicated in the accumulated statistical object 1014A and the accumulated statistical object 1014A is sent to a probability calculator 1030. The probability calculator 1030 takes the given accumulated statistical object 1022 and based on the number of bits of statistical object information that has been accumulated in the accumulated statistical object 1022 and the number of statistical objects in the plurality of statistical objects 1014P calculates the probability of guessing the accumulated statistical object information. The calculated probability 1036 is sent to the threshold comparator 1032. The threshold comparator 1032 takes the given calculated probability 1036 and compares that value with the threshold value 1028. The threshold value may be taken from an original object 1012S, may be a configurable value for the plurality of original objects 1012P within device 1010, or may be controlled by an outside entity. The threshold value may be associated with the device 1010. If the threshold comparator 1032 determines that the calculated probability 1036 exceeds the probability threshold value 1027, no further statistical object resolution activity occurs on this reception of a statistical object 1014S. If the threshold comparator 1032 determines that the calculated probability 1036 is less than the probability threshold value 1 027, an indication 1034 is produced that includes the selected original object 1026SEL. The indication 1030 may also include the communications characteristics 1022 and any other available information required by the receiver of the indication 1034. The indication may also contain additional inputs to the statistical object generator, which may be provided by a pointer from a statistical object 1014S. These additional inputs may include clock information, keying information, state information, and other relevant and useful information.

By utilizing a probability threshold value 1027, a threshold comparator 1032 and calculating, in real time, the present probability of guessing an accumulated statistical object 1022 based on the number of statistical objects present in the plurality of statistical objects 1014P, the probability of guessing an accumulated statistical object is held constant while the number of statistical objects present in the plurality of statistical objects 1014P can vary. Likewise, the probability of guessing a first statistical object 1014F is also held constant. It must also be noted that the probability threshold value 1027 can be changed at any time. The change in probability threshold value 1027 does not require the communication or coordination with the generator of the first statistical object 1018. Because of this, the probability threshold value 1027 can be adjusted, and the system for statistical object identification will not provide any response until the threshold value has been met. This effectively allows the statistical object identification system to silently increase or decrease the probability threshold value 1027 without providing any detectable indication of the change in the probability threshold value 1027.

In an alternate embodiment of the disclosure, a device 1010 contains a plurality of original objects 1012P. For each original object 1012S, at least one statistical object 1014 is generated. Multiple statistical objects 1014 may be generated from a single original object 1012S and each statistical object 1014 contains a name, pointer or other indication of the original object 1016 from which it was created. The plurality of statistical objects 1014P generated from the plurality of original objects 1014P is maintained and is available within the device 1010. The plurality of statistical objects 1014P may be individually or as a group periodically removed, added to, invalidated or otherwise refreshed. Likewise, the plurality of original objects 1012P may be individually or as a group removed, added to, invalidated or otherwise refreshed.

When a first statistical object 1014S is received by a communications receiver 1016, it is received within the context of a communication and has communications characteristics 1022 associated with it. After a first statistical object 1014F has been received, using a statistical matcher 1018, the first statistical object 1014F is compared against the plurality of statistical objects 1014P. If a matching statistical object 1014M is not found, the first statistical object 1014F is not identified and no further statistical object resolution activity occurs on this reception of a statistical object. If there is at least one statistical object 1014S in the plurality of statistical objects 1014P that matches the first statistical object 1014F, all matching statistical objects 1014P and indicators of their respective original objects 1012P and the communications characteristics 1022 are passed to an accumulated statistical object selector 1020. The communications characteristics 1022 are also passed to an associated original object selector 1024.

The accumulated statistical object selector 1020 takes the input communications characteristics 1022 and looks for an accumulated statistical object 1014A within the plurality of accumulated statistical objects 1014AP that has matching communication characteristics 1022. If a matching accumulated statistical object 1014A is found, the first statistical object 1014F and the list of all original objects 1012P associated with the matched statistical objects 1014M are added to the matched accumulated statistical object 1014MA. This increases the amount of statistical object information. If a matching accumulated statistical object 1014MA is not found, a new accumulated statistical object 1014NA is created and added to the plurality of accumulated statistical objects 1014PA. The communications characteristics 1022 of the accumulated statistical object 1014A are copied from the communications characteristics 1022, the first statistical object 1014F and the list of all original objects 1012P associated with the matched statistical objects 1014M are added to the accumulated statistical object 1014A. In both cases, the resulting accumulated statistical object 1014A is passed to the original object identifier 1026.

The associated original object selector 1024 takes the input communications characteristics 1022 and looks for an original object 1012S within the plurality of original objects 1012P that has matching communications characteristics. If a matching original object 1012M is found, that original object is selected, becoming a selected original object 1012S and is passed to the associated original object identifier 1026. If there is no matching original object 1012M, then nothing is passed to the associated original object identifier 1028. If an original object 1016 is inactive for a period of time, the association with communications characteristics 1022 may be removed from the original object 1016. An original object 1016 may be considered inactive if first statistical object 1014F with matching communications characteristics 1022 have not been received for a period of time. An original object 1016 may also be considered inactive if first statistical objects 1014F produced by the associated original object 1016 have not been received for a period of time.

The associated original object identifier 1028 takes the given accumulated statistical object 1022 and the selected original object 1026 and determines if the accumulated statistical information within the accumulated statistical object 1022 could have been produced by the selected original object 1026. If the information contained within the accumulated statistical object 1014A could have been generated by the selected original object 1012SEL, the selected original object 1012SEL is indicated in the accumulated statistical object 1022 and the accumulated statistical object 1022 is sent to the probability calculator 1030. If the information contained within the accumulated statistical object 1022 could not have been produced by the selected original object 1012SEL, the selected original object 1012SEL is discarded and the following processing occurs.

The associated original object identifier 1028 takes the given accumulated statistical object 1022 and determines if the accumulated statistical information within the accumulated statistical object could only be generated by a single, unique original object 1012S. This determination is made by successively pruning associated original objects that, as additional statistical object information is added, fail to be able to generate the stream of statistical objects that matches the received statistical objects until only a single original object remains. If a unique original object 1012S is not determined, the accumulated statistical object 1014A is updated with the pruned list of associated original objects 1012P and no further statistical object resolution activity occurs on this reception of a statistical object. If a unique original object 1012S is determined, the selected original object 1012SEL is indicated in the accumulated statistical object 1014A and the accumulated statistical object 1014A is sent to the probability calculator 1030. The probability calculator I 030 takes the given accumulated statistical object 1014A and based on the number of bits of statistical object information that has been accumulated in the accumulated statistical object 1014A and the number of statistical objects 1014 in the plurality of statistical objects 1012P that have matching communications characteristics 1022, calculates the probability of guessing the accumulated statistical object information. The calculated probability 1036 is sent to the threshold comparator 1032. The threshold comparator 1032 takes the given calculated probability 1036 and compares that value with the probability threshold value 1027. The threshold value may be taken from an original object 1012S, may be a configurable value for the plurality of original objects 1012P within device 1010 or may be controlled by an outside entity. If the threshold comparator 1032 determines that the calculated probability 1036 is greater than the probability threshold value 1027, no further statistical object resolution activity occurs on this reception of a statistical object. If the threshold comparator 1032 determines that the calculated probability 1036 is less than the probability threshold value 1027, an indication 1030 is produced that includes the selected original object 1012SEL and an association is made within the plurality of original objects 1012P between the selected original object 1012SEL and the communications characteristics 1022. The indication 1030 may also include the communications characteristics 1022 and any other available information required by the receiver of the indication 1030. The association between an original object 1012S and communications characteristics 1022 can also be created prior to receiving a first statistical object 1014F. This allows the system to be pre-populated with associations that should accelerate the selection of original objects and make staying beneath the probability threshold value 1027 easier.

In addition to the preferred and alternate embodiments described above, there are a number of additional processes that assist the process. As the primary mechanism for accumulating information between related statistical objects is driven by the reception of those statistical objects, it is therefore necessary to consider how to handle a partially identified statistical object which is then orphaned. An orphaned partially identified statistical object is an aggregate statistical object that has not been fully identified or has exceeded the probability threshold when the reception of matching communications characteristics ceases, thereby preventing further progress. For this case, each accumulated statistical object 1014A should have a timestamp or similar aging construct that will enable the system to periodically age out idle, orphaned and otherwise unused objects. This includes the removal of communication characteristics 1022 that have been associated with original objects 1012P after matching communications have been idle for a period of time.

As the communications of statistical objects is usually performed when the secured transport of an original object cannot be accomplished, it is therefore important that the security and integrity be taken into account in any implementation. To ensure that a statistical object cannot be intercepted during transmission and used by the interceptor, once a statistical object 1014S matched from the plurality of statistical objects 1014P, then that statistical object 1014S should be invalidated and the device 1010 should generate a new, different statistical object 1014S from the same original object 1012S. To further protect against attack, each statistical object 1014S should also expire after a period of time if that statistical object 1014S has not been matched and invalidated.

The association of communications characteristics 1022 is usually performed after the successful identification of an original object 1012S and after the calculated probability 1036 is determined to be less than the probability threshold value 1027. It is also possible to pre-assign communications characteristics 1022 to original objects 1012P. This will decrease the amount of statistical object information necessary to identify the associated original object. Unlike dynamically associated communication characteristics, pre-assigned associations should not expire after periods of inactivity.

This method of statistical object identity allows the system to maintain a constant probability threshold, regardless of the number of statistical objects that are contained within the plurality of statistical objects. This is accomplished by always calculating the probability of guessing the information contained in the accumulated statistical object with respect to both the number of statistical objects that are contained within the plurality of statistical objects and the accumulated statistical object information. As the number of statistical objects in the plurality of statistical objects increases, the probability of guessing increases as the amount of statistical object information accumulates, the probability of guessing decreases. By comparing the result of the probability calculation against the probability threshold after each reception of a statistical object that results in an identified original object, adherence to the probability threshold is enforced.

This method of statistical object identity is designed to specifically enable the changing of the probability threshold and not require that the changed probability threshold he coordinated or otherwise communicated with the entities that are generating and sending the statistical objects. By not requiring any coordination or communication when changing the probability threshold, the device can change the probability threshold in response to other external factors such as the threat or presence of attack or other security or integrity event.

XII. Apparatus for Statistical Object Identification

The apparatus that performs statistical object identification is varied and diverse. It ranges from a simple, single function device that receives statistical objects via a network or other communications medium, and identifies the original object. Once the identification is made, the communication may be forwarded to its intended destination. Before identification is made, no communications are allowed to pass across the device. It is expected that in many cases, the apparatus will be a module or subsystem within a larger system. This module may take the form of a state machine in an application specific integrated circuit (ASIC) or other form of integrated circuit or semiconductor implementation. This module may also take the form of logic coding provided to a programmable logic device such as a field programmable gate array (FPGA), programmable array logic (PAL) and other forms of programmable logic. This module may also take the form of instructions for a microprocessor. This module may also take the form of instructions to a synthetic or virtual processor or machine.

The apparatus that performs statistical object identification may be used in communications devices, security devices, network routing devices, application routing devices, service delivery devices and other devices that are enabled by the addition of the efficient communication of an original object through the reception of a statistical object which is identified as being generated from an original object.

XIII. Examples of Statistical Object Identification

One specific, simplified example of the present disclosure is disclosed in this Section of the Specification. The following example offers a description of:
1. an original object 1012S;
2. how that original object 1012S is transformed into a statistical object 1014S; and
3. how that statistical object 1014S is identified as having been generated by the original object 1012S.

The numbering convention that is used in this Specification, the Drawings, and the Claims to identify original and statistical objects is presented in Table One:

TABLE ONE

| | |
|---|---|
| 1010 | Device (In this example, the Remote System) |
| 1012M | Matched Original Object |
| 1012P | Plurality of Original Objects Original Object |
| 1012SEL | Selected Original Object Accumulated |
| 1014A | Statistical Object |
| 1014AP | Plurality of Accumulated Statistical Objects |
| 1014F | First Statistical Object |
| 1014NA | New Accumulated Statistical |
| 1014S | Object Statistical Object |

The letter "S" is used to signify a single object, while the letter "P" is used to signify a plurality. The reference character that refers to an original object always includes the numeral "1012", while the numeral "1014" is always used to refer to a statistical object.

For these examples, we will consider that an original object 1012S is an X.509 certificate. An X.509 certificate is used to provide identity, and is digitally signed to prove its authenticity. For this example, the X.509 certificates are 1 KB in size (1024 bytes, 8192 bits). We need to communicate that we are using a specific X.509 certificate to a remote system that has a copy of each X.509 certificate that is expected to be used. Unfortunately, the system was designed before there was a requirement to communicate the X.509 certificates, and there is only enough space to communicate 32 bits worth of information, certainly not enough to send an entire X.509 certificate which is 256 times larger. But still needing to communicate the X.509 certificate, a cryptographic hash, 32 bits in length, is generated for each X.509 certificate and a common clock. The cryptographic hash is a statistical object 14S generated from an original object 1012S. Now let us assume that we have 100 of these X.509 certificates, that is 100 original objects 1012S. And let us assume that for each original object 1012S, we generate a cryptographic hash of each X.509 certificate and a common clock to produce 100 statistical objects 1014S each 32 bits in length. For descriptive purposes, three of these X.509 certificates and their corresponding statistical objects will be described. X.509 certificate #1 identifies Sally, and generates a statistical object 1014S of value 22443. X.509 certificate #2 identifies Ben, and generates a statistical object 1014S of value 32415. X.509 certificate #3 identifies Greg, and also generates a statistical object 1014S of value 32415. The device 1010 has generated the plurality of statistical objects 1014P corresponding to the plurality of original objects 1012P.

Now Ben needs to send a communication containing Ben's statistical object to device 1010. Device 1010 receives Ben's communication using a communications receiver 1016. Although we, the narrator, know that it was Ben that sent the communication to device 1010, device 1010 does not know this. Ben's communication includes Ben's statistical object (first statistical object 1014F) and communications characteristics 1022. In this case, the communications occurred over a TCP/IP network and the IP source and destination addresses and the TCP source and destination port numbers are used as communications characteristics 1022. The source IP address is 1.1.1.2 and the destination IP address is 1.1.1.3. The source TCP port number is 2000 and the destination TCP port number is 3000. The communications receiver 1016 sends the received communications characteristics 1022 and Ben's statistical object 1014F to the statistical object matcher 1018. The statistical object matcher 1018 compares Ben's statistical object 1014F with the plurality of statistical objects 1014P, and determines that there it matches two statistical objects, Ben's and Greg's. The statistical object matcher 1018 sends Ben's statistical object 1014F, the two matched statistical objects 1014M (Ben's and Greg's) and the communications characteristics 1022 to the accumulated statistical object selector 1020. The accumulated statistical object selector 1020 compares Ben's communications characteristics 1022 with the plurality of accumulated statistical objects 1014AP and finds no matches. Because no matches were found, the accumulated statistical object selector 1020 creates a new accumulated statistical object 1014A including Ben's statistical object 1014F, the two matched statistical objects 1014M and the communications characteristics 1022. The new accumulated statistical object 1014A is added to the plurality of accumulated statistical objects 1014AP. The accumulated statistical object information is set to 32 bits to reflect the information contained in statistical object 1014F. The accumulated statistical object 1014AP is passed to the original object identifier 1026. The original object identifier 1026 determines that the accumulated statistical object 1014AP does not unambiguously identify a single original object 1012S. This concludes the operation of the device 1010 for the reception of Ben's statistical object. The device 1010 does not respond to Ben's communication because it cannot unambiguously determine who sent the communication.

Now Ben, who sent the original communication, did not receive a response, so he sends another communication. Since time has passed since the first communication attempt, the clock value used to generate the statistical objects has changed. The new statistical objects and their corresponding X.509 certificates are: X.509 certificate #1 identifies Sally and generates a statistical object 1014S of value 84256. X.509 certificate #2 identifies Ben and also generates a statistical object 1014S of value 84256. X.509 certificate #3 identifies Greg and generates a statistical object 1014S of value 10845. Due to time passing, device 1010 regenerates the plurality of statistical objects 1014P corresponding to the plurality of original objects 1012P which match Sally, Ben and Greg. Now Ben sends a second communication containing Ben's current statistical object to device 1010. Device 1010 receives Ben's communication using a communications receiver 1016. Ben's communication includes Ben's statistical object 1014F and communications characteristics 1022. Again, the communications characteristic 1022 is source IP address of 1.1.1.2, destination IP address of 1.1.1.3, source TCP port number of 2000 and destination TCP port number of 3000. The communications receiver 1016 sends the received communications characteristics 1022 and Ben's statistical object 1014F to the statistical object matcher 1018. The statistical object matcher 1018 compares Ben's statistical object 1014F with the plurality of statistical objects 1014P and determines that there it matches two statistical objects, Ben's and Sally's. The statistical object matcher 1018 sends Ben's statistical object 1014F, the two matched statistical objects 1014M (Ben's and Sally's) and the communications characteristics 1022 to the accumulated statistical object selector 1020. The accumulated statistical object selector 1020 compares Ben's communications characteristics 1022 with the plurality of accumulated statistical objects 1014AP, and finds a match with Ben's previous communication. The matched accumulated statistical object 1014A includes the previous matched statistical object 1014M containing Ben's and Greg's statistical objects and is compared against the two matched statistical objects 1014M matching Ben's statistical object 1014F containing Ben's and Sally's statistical objects. The intersection of both matched statistical sets is Ben. Greg and Sally are removed from the accumulated statistical object 1014A. The accumulated statistical object information increases from 32 bits to 64 bits with the addition of statistical object 1014F. The accumulated statistical object 1014A is passed to the original object identifier 1026. The original object identifier 1026 takes the given accumulated statistical object 1014A and determines if the accumulated statistical information within the accumulated statistical object could only be generated by a single, unique original object 1012S. Original object 1012S is Ben's X.509 certificate. Original object 1012S is now indicated as selected original object 1012SEL, and is passed to the probability calculator 1030. The probability calculator 1030 takes the given accumulated statistical object 1014A, and, based on the number of bits of statistical object information that has been accumulated in the accumulated statistical object 1014A and the number of statistical objects in the plurality of statistical objects 1014P, calculates the probability of guessing the accumulated statistical object information.

In this example, we have 100 statistical objects and have received 64 bits of statistical object information (32 bits×2). The probability of guessing is calculated by using the formula:

$$p(n;d) \approx 1 - e^{-n^2/(2 \times d)}$$

where n is the number of statistical objects in the table of valid statistical objects; d is the total number of unique statistical objects available; and dis $d = 2^6$ where b is the number of bits of statistical object information received.

Therefore: $d = 2^{64}$, $n = 100$ resulting in $$p(100, 2^{64}) \approx 1 - e^{-100^2/(2 \times 2^{64})}, p(100, 2^{64}) \approx 0$$

In this case, with only a few original objects (e.g., one hundred) and a relatively large amount of accumulated statistical object information, the probability of guessing those 64 bits of accumulated statistical object information is vanishingly small, approaching zero. This calculated probability 1036 and the accumulated statistical object 1022 are passed to the threshold comparator 1032. The threshold comparator 1032 takes the calculated probability 1036 and compares it with the probability threshold value 1027. In our example, the probability threshold value 1027 is 1 in a million. The threshold comparator 1032 determines that our calculated probability 1027 of zero is less than the probability threshold value of 1 in a million. Having not exceeded our probability threshold value 1027, the threshold comparator 1032 makes an indication 1030 that includes the selected original object 1012SEL Ben. This indication 1030 communicates to other functions within the device 1010 that the communication was sent by Ben and has not exceeded the probability threshold value 1027, and that the device 1010 should now respond to Ben's communication.

In a second example, we continue with the first example but change the number of original objects 1012S from 100 to 100,000,000 (one hundred million). The calculated probability 1036 of guessing the accumulated statistical object 1014A with 64 bits of information is 2.674%, greater than the probability threshold value of 1 in a million. Since this is greater than the threshold, this concludes the operation of the device 1010 for the reception of Ben's statistical object. The device 1010 does not respond to Ben's communication because it has exceeded the probability threshold value 1027. Now Ben, who sent the original communications again did not receive a response, so he sends another communication. Device 1010 receives Ben's communication using a communications receiver 1016. Ben's communication includes Ben's statistical object 1014F and communications characteristics 1022. Again, the communications characteristic 1022 is source IP address of 1.1.1.2, destination IP address of 1.1.1.3, source TCP port number of 2000 and destination TCP port number of 3000. The communications receiver 1016 sends the received communications characteristics 1022 and Ben's statistical object 1014F to the statistical object matcher 1018. The statistical object matcher 1018 compares Ben's statistical object 1014F with the plurality of statistical objects 1014P and determines that there it matches only a single statistical object, Ben's. The statistical object matcher 1018 sends Ben's statistical object 1014F, the matched statistical object 1014M (Ben's) and the communications characteristics 1022 to the accumulated statistical object selector 1020. The accumulated statistical object selector 1020 compares Ben's communications characteristics 1022 with the plurality of accumulated statistical objects 1014AP, and finds a match with Ben's previous communication. The matched accumulated statistical object 1014A includes the previous matched statistical object 1014M containing only Ben and is compared against the matched statistical object 1014M matching Ben's statistical object 1014F containing Ben. The intersection of both matched statistical sets is Ben. The accumulated statistical object information increases from 64 bits to 96 bits with the addition of statistical object 1014F. The accumulated statistical object 1014A is passed to the original object identifier 1026. The original object identifier 1026 takes the given accumulated statistical object 1014A and determines if the accumulated statistical information within the accumulated statistical object could only be generated by a single, unique original object 1012S. Original object 1012S is Ben's X.509 certificate. Original object 1012S is now indicated as selected original object 1012SEL, and is passed to the probability calculator 1030. The probability calculator 1030 takes the given accumulated statistical object 1022, and, based on the number of bits of statistical object information that has been accumulated in the accumulated statistical object 1022 and the number of statistical objects in the plurality of statistical objects 1014P, calculates the probability of guessing the accumulated statistical object information. In a second example, we continue with the first example but change the number of original objects 1012S from 100 to 100,000,000 (one hundred million). The calculated probability 1036 of guessing the accumulated statistical object 1014A with 96 bits of information is again vanishingly small, approaching zero. This calculated probability 1036 and the accumulated statistical object 1022 are passed to the threshold comparator 1032. The threshold comparator 1032 takes the calculated probability 1036 and compares it with the probability threshold value 1027. The threshold comparator 1032 determines that our calculated probability 1027 of 0 is less than the probability threshold value of 1 in a million. Having not exceeded our probability threshold value 1027, the threshold comparator 1032 makes an indication 1030 that includes the selected original object 1012SEL Ben. This indication 1030 communicates to other functions within the device 1010 that the communication was send by Ben and has not exceeded the probability threshold value 1027 and that the device 1010 should now respond to Ben's communication.

In a third example, we continue with the second example and add an association of the selected original object 1012SEL (Ben) and the communications characteristics 1022. This allows for the optimization of subsequent communication requests from Ben.

Continuing with the third example, Ben makes another communication to device 1010 during which within device 1010 an association exists between Ben's original object and the communications characteristics 1022 of Ben's previous communication. Device 1010 receives Ben's communication using a communications receiver 1016. Ben's communication includes Ben's statistical object (first statistical object 1014F) and communications characteristics 1022. This time, the communications characteristics 1022 is source IP address of 1.1.1.2, destination IP address of 1.1.1.3, source TCP port number of 5000 and destination TCP port number of 7000. The source IP address is the same source IP address that was used in the prior, accepted communications. The statistical object matcher 1018 compares Ben's statistical object 1014F with the plurality of statistical objects 1014P, and determines that there it matches two statistical objects, Ben's and Greg's. The statistical object matcher 1018 sends Ben's statistical object 1014F, the two matched statistical objects 1014M (Ben's and Greg's) and the communications characteristics 1022 to the accumulated statistical object selector 1020 and sends the communications characteristics 1022 to the associated original object selector 1024. The accumulated statistical object selector 1020 compares Ben's communications characteristics 1022 with the plurality of accumulated statistical objects 1014AP and finds no matches. Because no matches were found, the accumulated statistical object selector 1020 creates a new accumulated statistical object 1014A including Ben's statistical object 1014F, the two matched statistical objects 1014M and the communications characteristics 1022. The new accumulated statistical object 1014A is added to the plurality of accumulated statistical objects 1014AP. The accumulated statistical object information is set to 32 bits to reflect the information contained in statistical object 1014F. The accumulated statistical object selector 1020 sends the accumulated statistical object 1014A to the associated original object identifier 1028.

The associated original object selector 1024 receives the communications characteristics 1022 and compares them with the communications characteristics 1022 associated with the plurality of original objects 1012P. Because an association exists between Ben's original object and Ben's communications characteristics 1022, the associated original object selector 1024 selects Ben's original object, indicated as 1012SEL and passes the selected original object 1012SEL to the associated original object identifier 1028.

The associated original object identifier 1028 takes the accumulated statistical object 1014A and the selected original object 1012SEL (Ben) and insures that the accumulated statistical object 1014A could have been generated from the selected original object 1012SEL. Upon determining that the accumulated statistical object 1014A was producible by the selected original object 1012SEL, the intersection of the original objects 1014 is calculated using the original objects associated with the matched statistical objects 1014M (Ben and Greg) and the selected original object 1012SEL (Ben) resulting in Ben. This intersection is indicated in the accumulated statistical object 1014A. Since there is exactly one original object now contained in the accumulated statistical object 1014A, the accumulated statistical object 1014A is sent to the probability calculator 1030.

The probability calculator 1030 takes the given accumulated statistical object 1014A, and, based on the number of bits of statistical object information that has been accumulated in the accumulated statistical object 1014A and the number of statistical objects in the plurality of statistical objects 1014P, calculates the probability of guessing the accumulated statistical object information.

In this example, we have 100,000,000 statistical objects and have received 32 bits of statistical object information, but we have only a single statistical object that is associated with the Ben's communications characteristics 1022. Therefore, instead of using 100,000,000 as the number of statistical objects, the number of statistical objects is 1, resulting in a calculated probability 36 of $p=\frac{1}{2}^{32}$. This calculated probability 1036 and the accumulated statistical object 1022 are passed to the threshold comparator 1032. The threshold comparator 1032 takes the calculated probability 1036 and compares it with the probability threshold value 1027. The threshold comparator 1032 determines that our calculated probability 1027 of $p=\frac{1}{2}^{32}$ is less than the probability threshold value of 1 in a million. Having not exceeded our probability threshold value 1027, the threshold comparator 1032 makes an indication 1030 that includes the selected original object 1012SEL Ben. This indication 1030 communicates to other functions within the device 1010 that the communication was sent by Ben and has exceeded the probability threshold value 1027 and that the device 1010 should now respond to Ben's communication. It should be noted that in this third example, because we are using the communications characteristics 1022 associated with the original object 1012, we can arrive at a selected original object 1012SEL and not exceed the probability threshold value 1027 while receiving fewer bits of information from the received statistical object 1014F.

XIV. Objects, Binding, Metadata and Communications

The present disclosure describes original objects 1012S and statistical objects 1014S. In its simplest form, an original object 1012S is a string of bits. For example, the string "Hello, my name is John" is an original object 1012S. An original object 1012S could be signed by a third party to insure its authenticity. When an original object 1012S is signed, a digital signature is bound to the original object 1012S. The resulting signed original object 1012S is itself another original object 1012S. A digital signature is generated by a trusted third party and is bound to the original object 1012S with metadata. This metadata usually is related to or derived from the original object 1012S, but may also be unrelated to the original object such as geographic, biometric, physical, logical, temporal, dimensional and virtual data. An original object 1012S may also be associated with a cryptographic key or set of keys. An original object associated with a set of cryptographic keys is called a keyed original object. A keyed original object is itself an original object 1012S. The present disclosure can use any of these original object forms.

A statistical object or an original object can be communicated through a wide variety of mechanisms. When statistical or original objects are communicated, the easiest way is to have the communications mechanism designed to support the required information requirements of the original or statistical objects. When a communications system is being retrofitted to communicate original or statistical objects, there are several approaches that can be used. In a preferred embodiment, an original or statistical object can replace other information in the original message. Generally, this approach only works when the original or statistical object fits within an unused field or a field that can be regenerated to make up for the information lost during the replacement. An example of this is Transport Access Control (TAC). When this approach is not feasible, there are other methods that can be used, including tunneling, packet encapsulation and establishing a secondary communications channel. In tunneling, a network session is created. The messages are communicated within this tunnel. Original or statistical objects can be communicated during session establishment or during tunnel operation. An example of this is IPsec in tunnel mode. Packet encapsulation wraps each message with another encapsulating message. Original or statistical objects can be communicated in the encapsulating message. Examples of encapsulation include VLAN tagging and MPLS tagging. If neither of these mechanisms is suitable, a parallel communications channel can be created and the original or statistical objects can be communicated by the parallel channel. An example of a parallel channel is Internet Key Exchange (IKE) where an original object is communicated by the IKE protocol and the resulting security association is used by the IPsec protocol.

XV. Statistical Object Identification System Architecture

Figure 54:
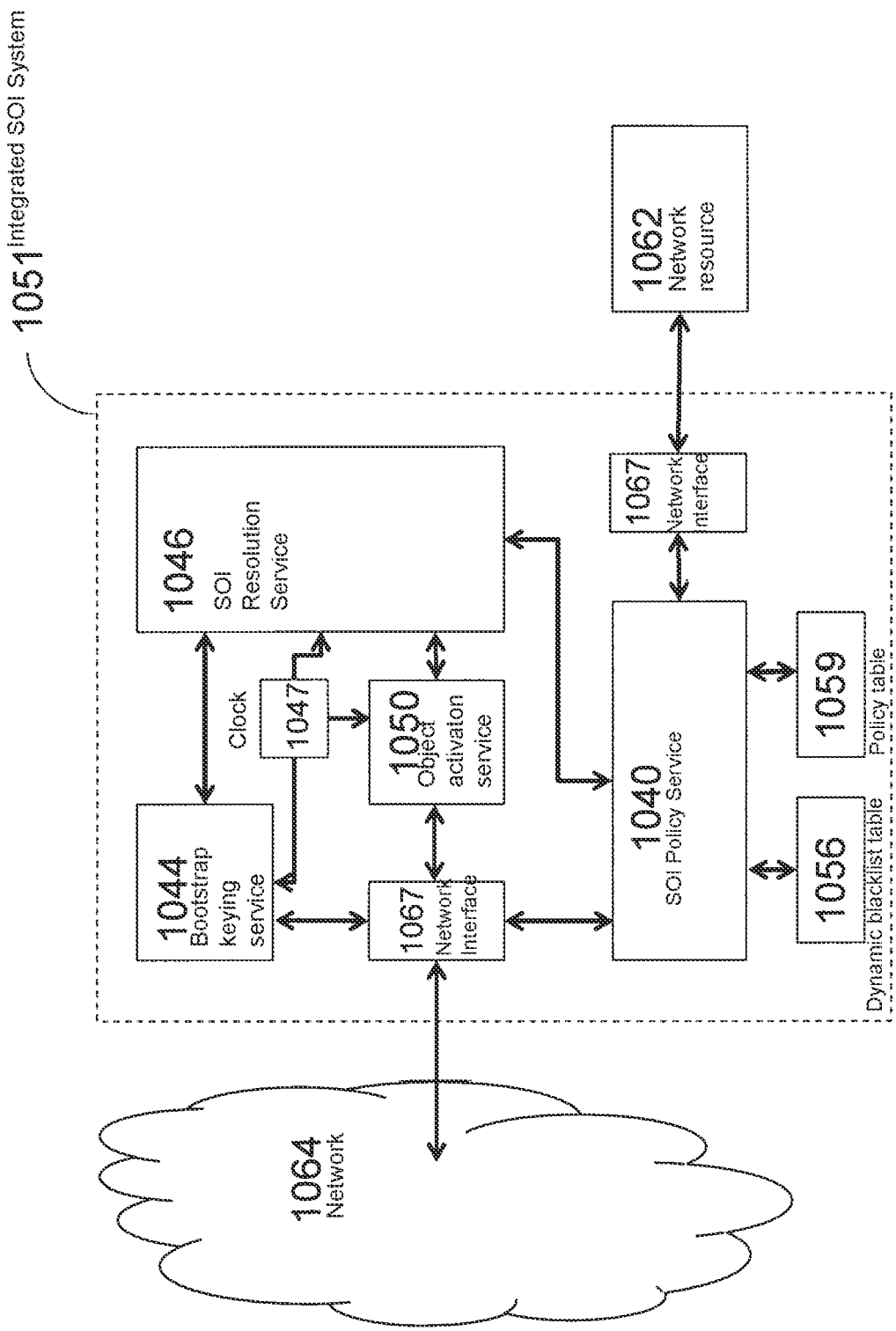
FIG. 54 is an illustration which shows an embodiment of an integrated SOI system.

FIG. 54 is an illustration which shows one particular embodiment of the present disclosure, which includes an integrated SOI system 1051. The integrated SOI system 1051 receives messages through two network interfaces 1067. In this embodiment, one of the network interfaces 1067 is connected to a network 1064 and the other network interface 1067 is connected to a network resource 1062. All traffic that is communicated between the network interfaces 1067 must traverse the SOI policy service 1040. The SOI policy service 1040 is aided by an SOI resolution service 1046. The SOI resolution service 1046 is internally aided by a bootstrap keying service 1044, a clock 1047 and an object activation service 1050. The SOI policy service 1040 also has access to a dynamic blacklist table 1056 and a policy table 1059.

Alternate embodiments of an integrated SOI system 1051 may choose not to include a bootstrap keying service 1044, or an object activation service 1050.

Figure 55:
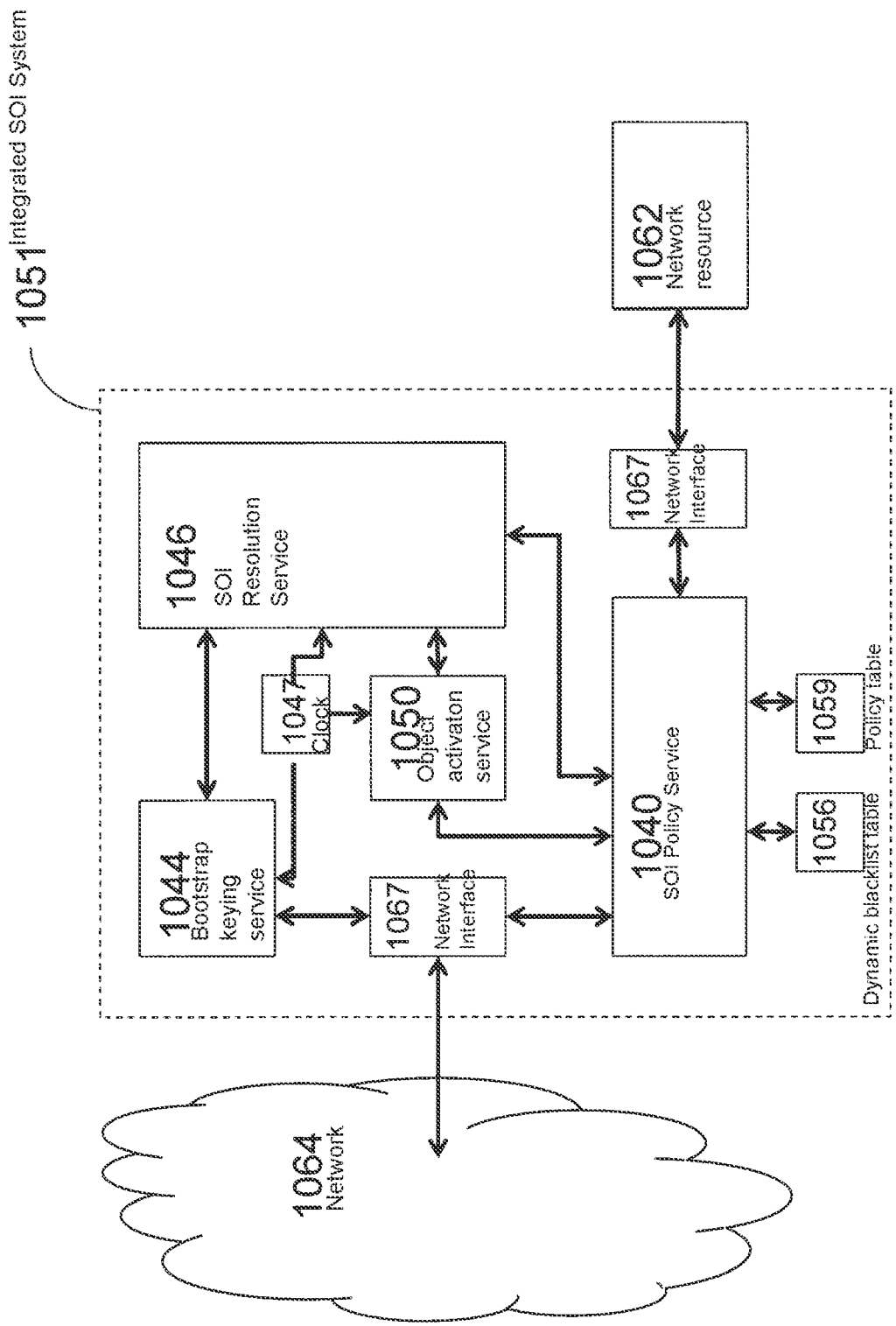
FIG. 55 is an illustration which shows an alternate embodiment of an integrated SOI system.

FIG. 55 is an illustration which shows an alternate embodiment of the present disclosure, which includes an integrated SOI system 1051. In this alternate embodiment, the SOI policy service 1040 is also aided directly by an object activation service 1050.

Figure 56:
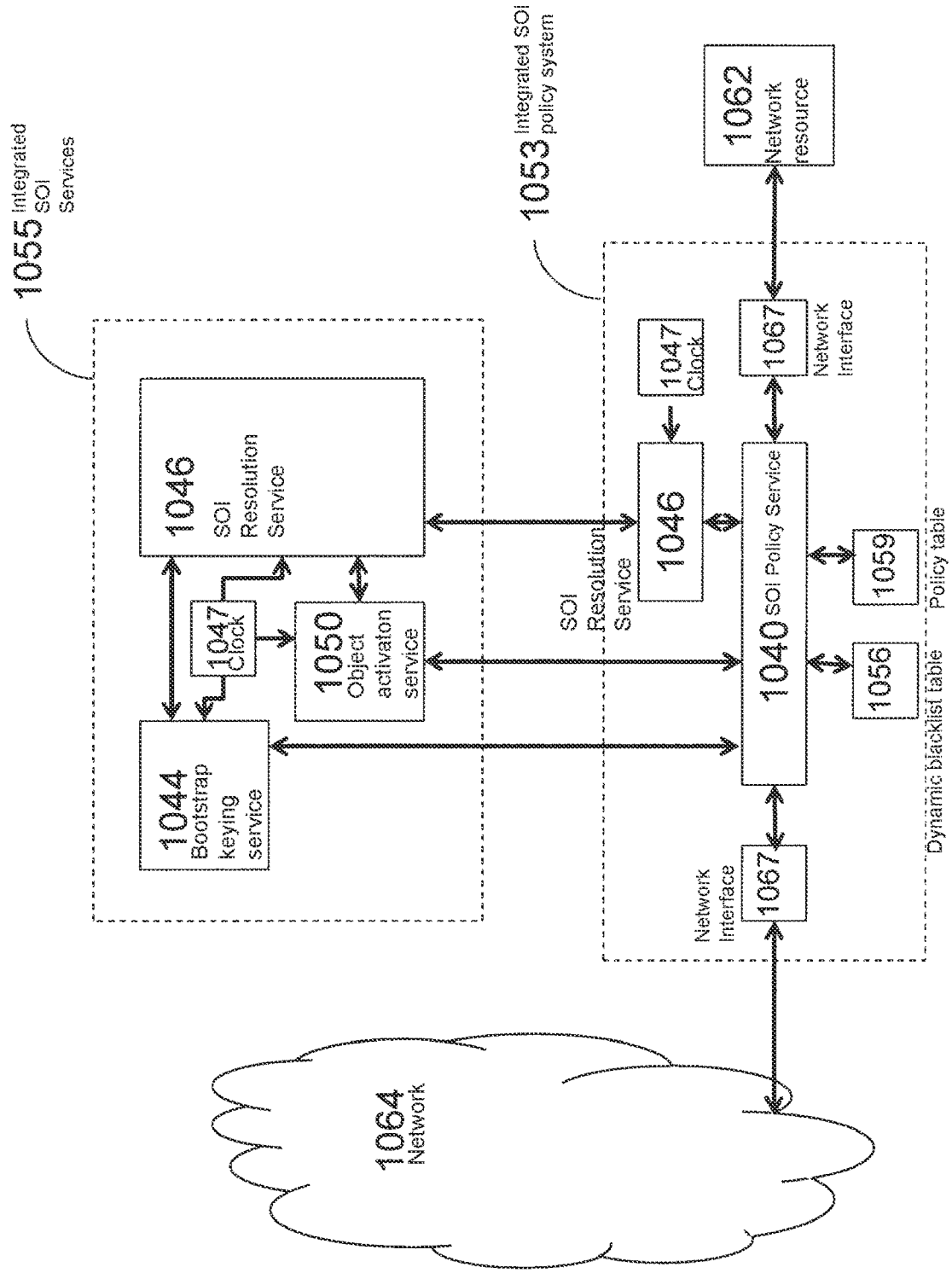
FIG. 56 is an illustration which shows an alternate embodiment of an integrated SOI policy system and integrated SOI services.

FIG. 56 is an illustration which shows an alternate embodiment of the present disclosure, a system of an integrated SOI policy system 1053 and integrated SOI services 1055. The integrated SOI policy system 1053 receives messages through two network interfaces 1067. In this embodiment, one of the network interfaces 1067 is connected to a network 1064 and the other network interface 1067 is connected to a network resource 1062. All traffic that is communicated between the network interfaces 1067 must traverse the SOI policy service 1040. The SOI policy service 1040 is aided locally by an SOI resolution service 1046, which is in turn aided by a local clock 1047. The SOI policy service 1040 is also aided by integrated SOI services 1055. The integrated SOI services 1055 is composed of a bootstrap keying service 1044, an SOI resolution service 1046, a clock 1047 and an object activation service 1050. The SOI policy service 1040 also has access to a dynamic blacklist table 1056 and a policy table 1059. Alternate embodiments of integrated SOI services 1055 may choose not to include a bootstrap keying service 1044, or an object activation service 1050.

Figure 57:
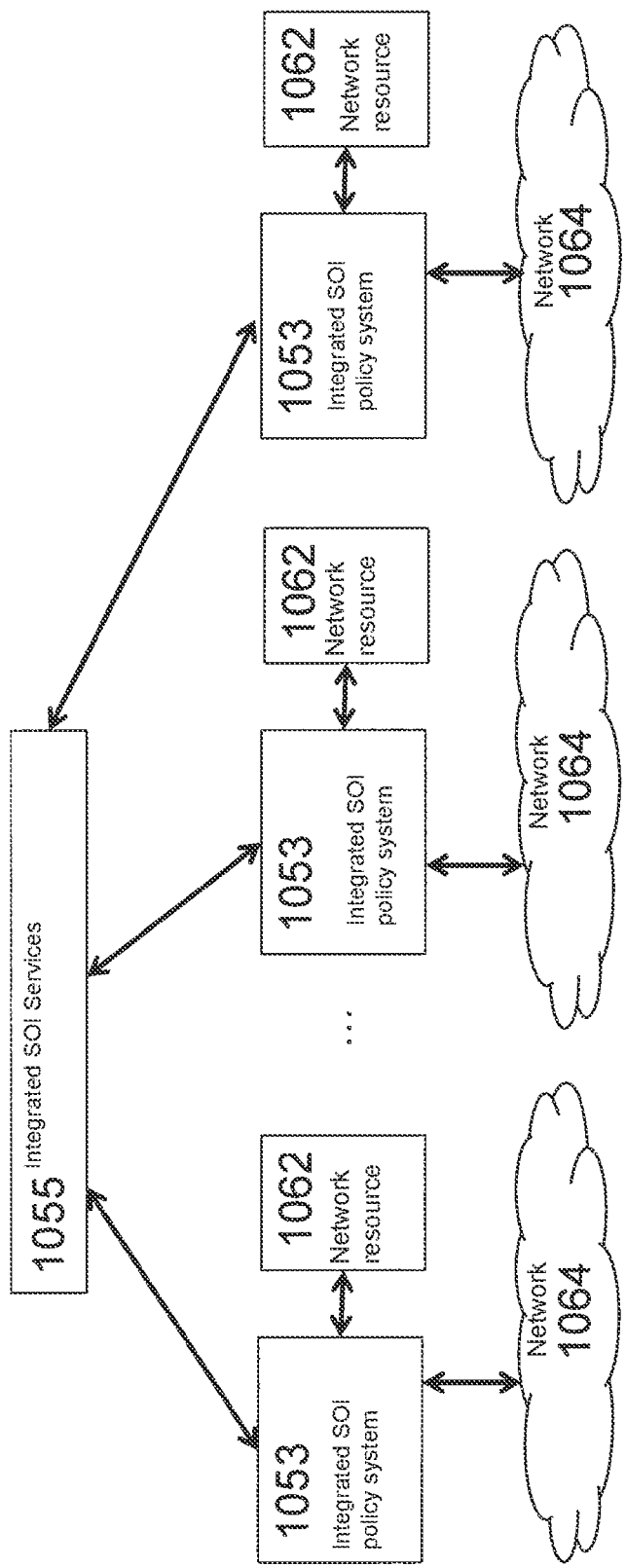
FIG. 57 is an illustration which shows an alternate embodiment of an SOI system with a simple hierarchy.

FIG. 57 is an illustration which shows an alternate embodiment of the present disclosure, a system of multiple instances of an integrated SOI policy system 1053 and a single instance of integrated SOI services 1055.

Figure 58:
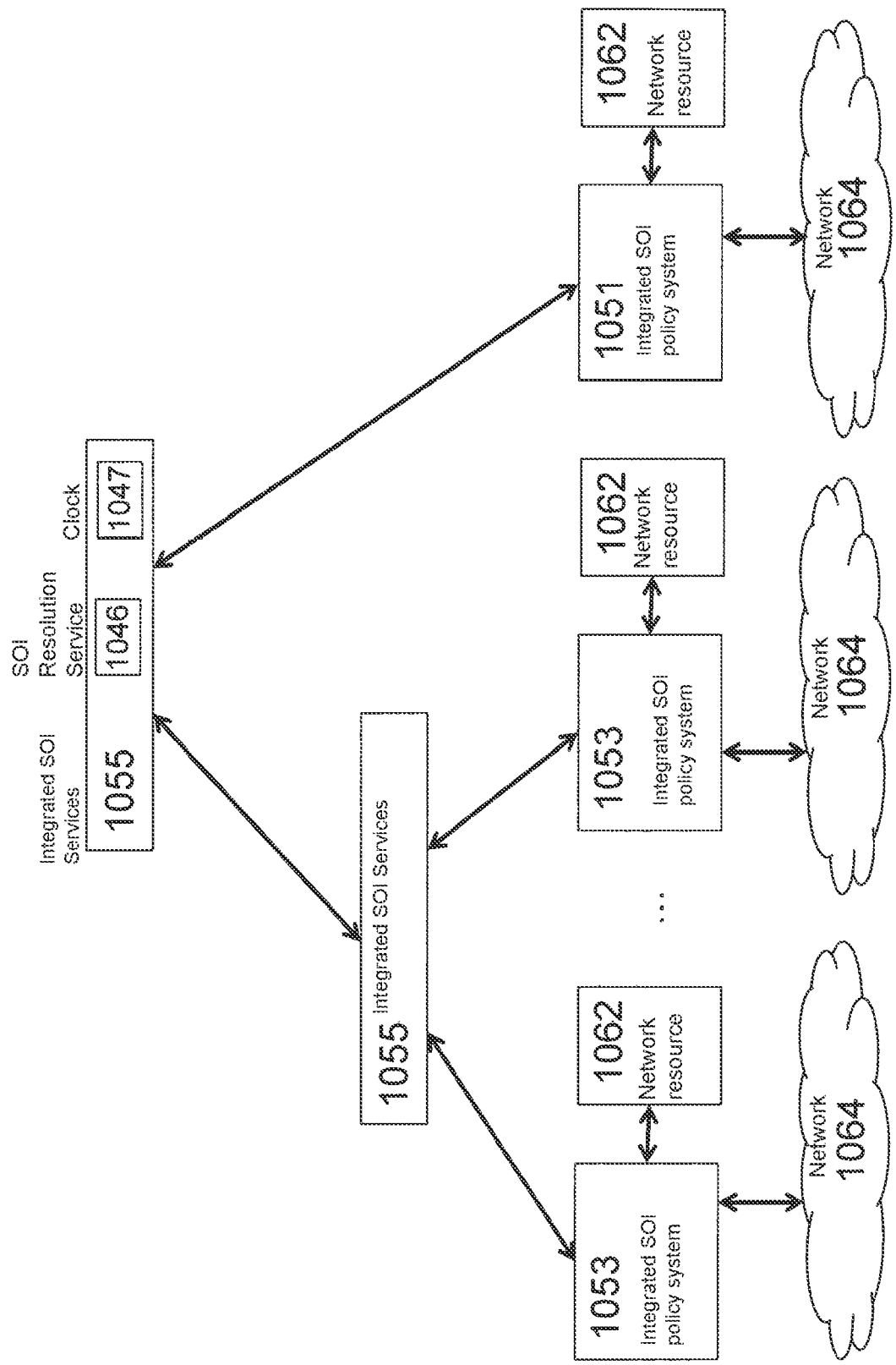
FIG. 58 is an illustration which shows an alternate embodiment of an SOI system with a more complex hierarchy.

FIG. 58 is an illustration which shows an alternate embodiment of the present disclosure, a system of multiple instances of an integrated SOI policy system 1053 and multiple instances of integrated SOI services 1055. In this embodiment, the top level instance of integrated SOI services 1055 does not include a bootstrap keying service 1044, or an object activation service 1050. The top level instance of integrated SOI services 1055 includes an SOI resolution service 1046 and a clock 1047.

Figure 59:
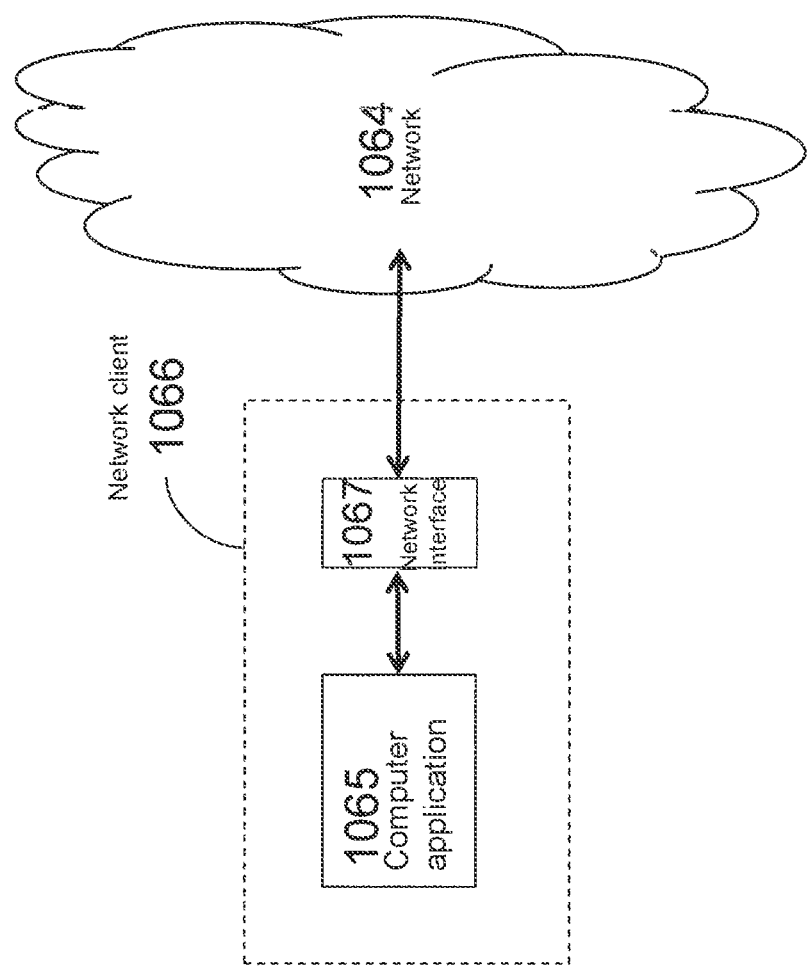
FIG. 59 is an illustration which shows a network client connected to a network.

FIG. 59 is an illustration which shows a network client 1066 connected to a network 1064. A network client 1066 includes a computer application 1065 that communicates through a network interface 1067 to the network 1064.

Figure 60:
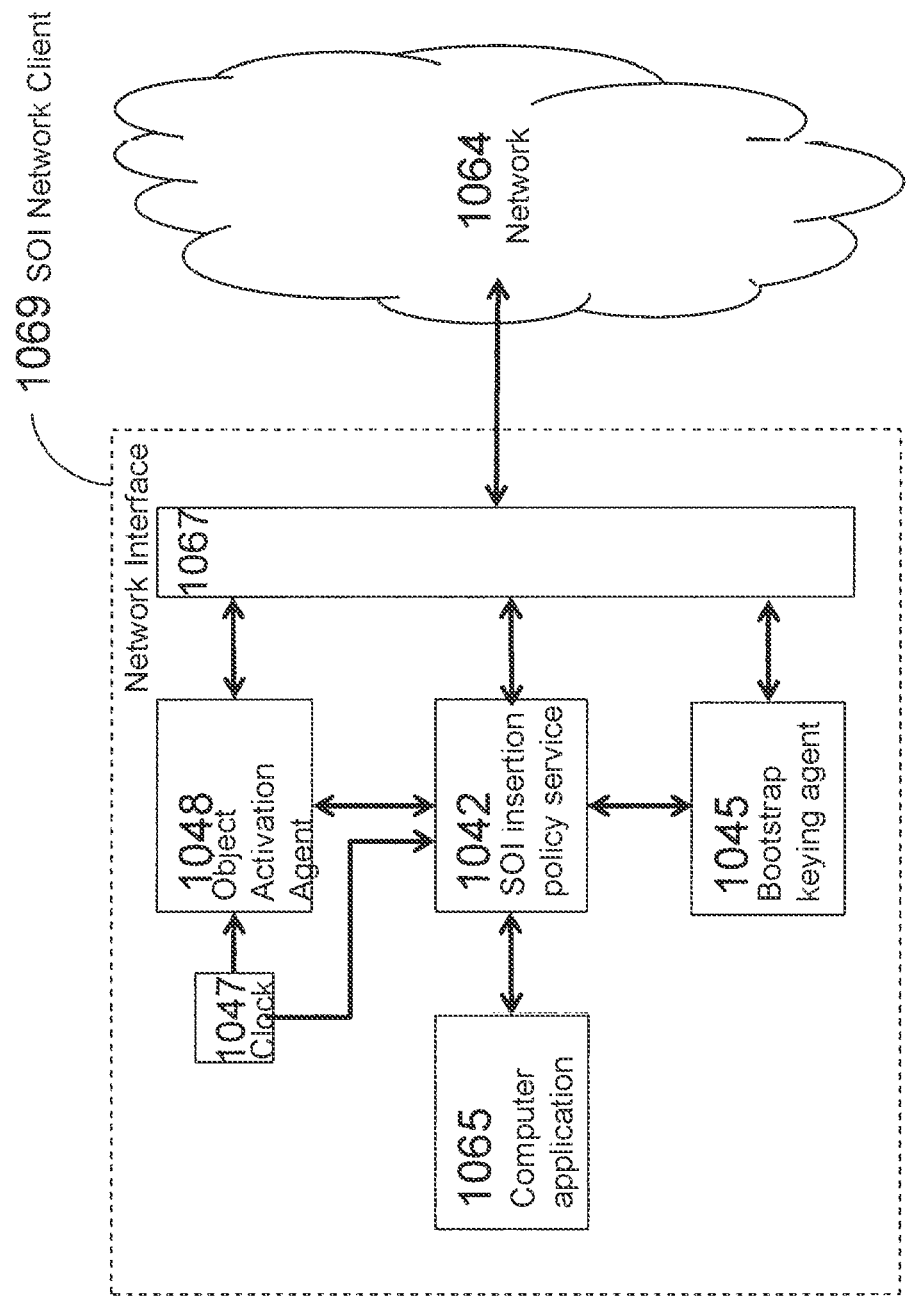
FIG. 60 is an illustration which shows an embodiment of a network SOI client.

FIG. 60 is an illustration which shows one particular embodiment of the present disclosure, which includes an SOI network client 1069. The SOI network client 1069 receives messages through a network interface 1067 and from a computer application 1065. All traffic that is communicated between the computer application 1065 and the network interfaces 1067 must traverse the SOI insertion policy service 1042. The SOI insertion policy service 1042 is aided by a bootstrap keying agent 1045, a clock 1047 and an object activation agent 1048. Alternate embodiments of an SOI network client 1069 may choose not to include a bootstrap keying agent 1045, or an object activation agent 1048.

Figure 61:
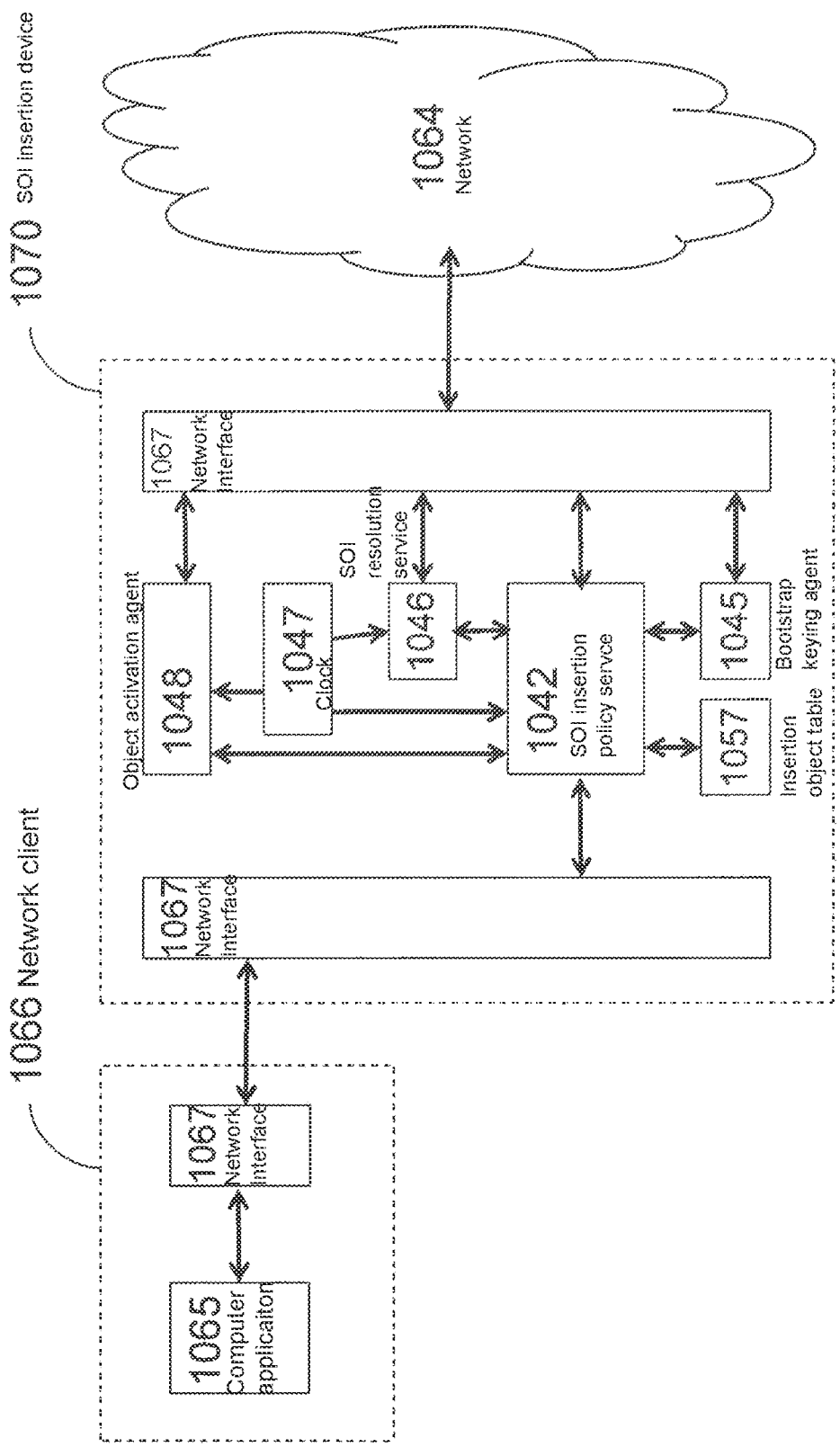
FIG. 61 is an illustration which shows an embodiment of an SOI insertion device.

FIG. 61 is an illustration which shows an alternate embodiment of the present disclosure; a system of a network client 1066 and an SOI insertion device I 070. The SOI insertion device 1070 receives messages from two network interfaces 1067. In this embodiment, one of the network interfaces I 067 is connected to a network 1064 and the other network interface 1067 is connected to a network client 1066. All traffic that is communicated between the network interfaces 1067 must traverse the SOI insertion policy service 1042. The SOI policy insertion service 1042 is aided by a bootstrap keying agent 1045, an SOI resolution service 1046, a clock 1047 and an object activation agent 1048. The SOI policy insertion service 1042 also has access to an insertion object table 1057. Alternate embodiments of an SOI network client 1069 may choose not to include a bootstrap keying agent 1045, an SOI resolution service 1046 or an object activation agent 1048.

Figure 62:
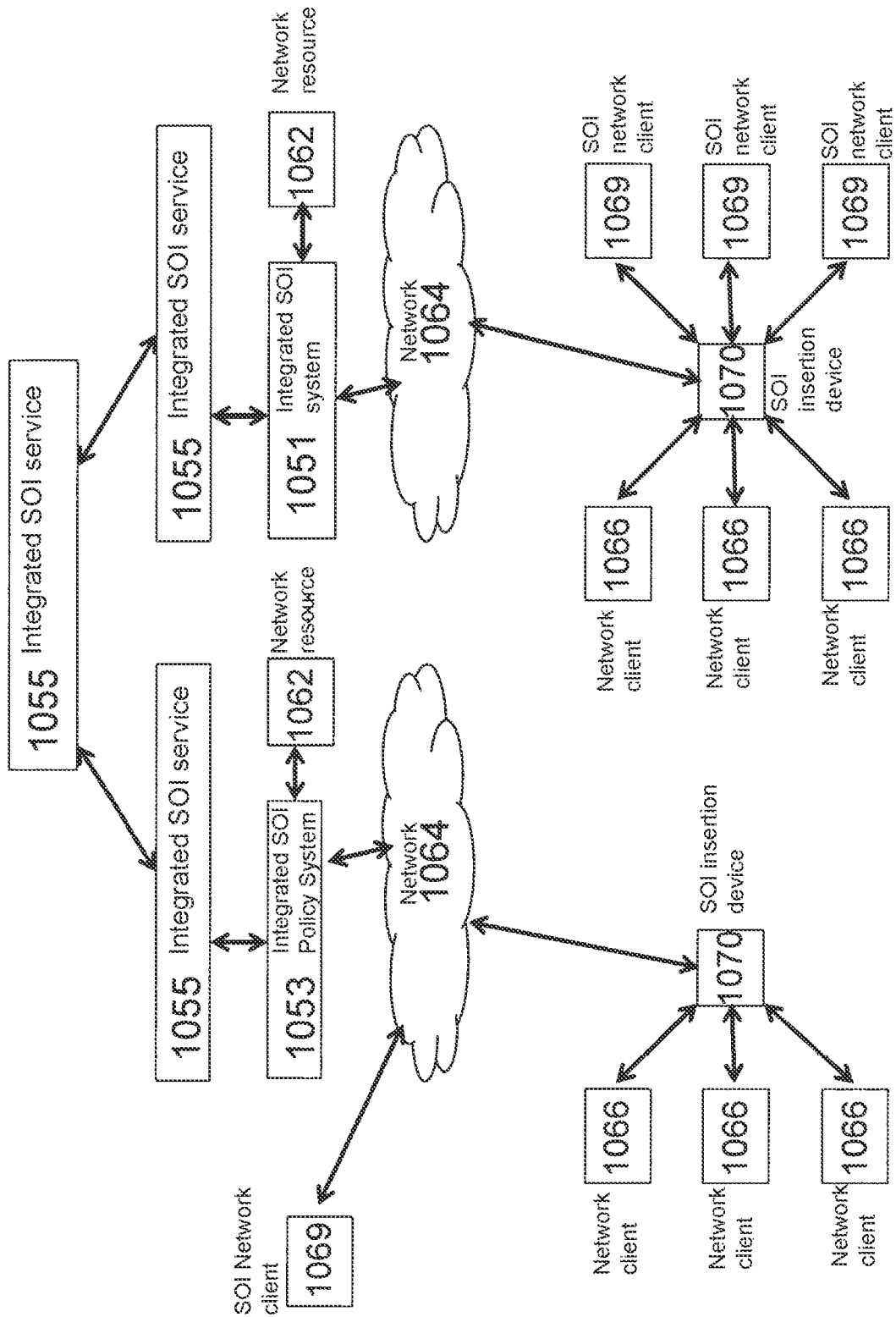
FIG. 62 is an illustration which shows a system of SOI devices.

FIG. 62 is an illustration of an embodiment of an SOI system. An SOI network client 1069 is connected to a network 1064. Other SOI network clients 1069 are connected through a SOI insertion device 1070. A series of network client 1066 are connected to SOI insertion devices 1070. The networks 1064 are connected to a series of integrated SOI systems 1051 and integrated SOI policy systems 1053. The integrated SOI systems 1051 and the integrated SOI policy systems are connected to a series of integrated SOI policy services 1055.

Figure 63:
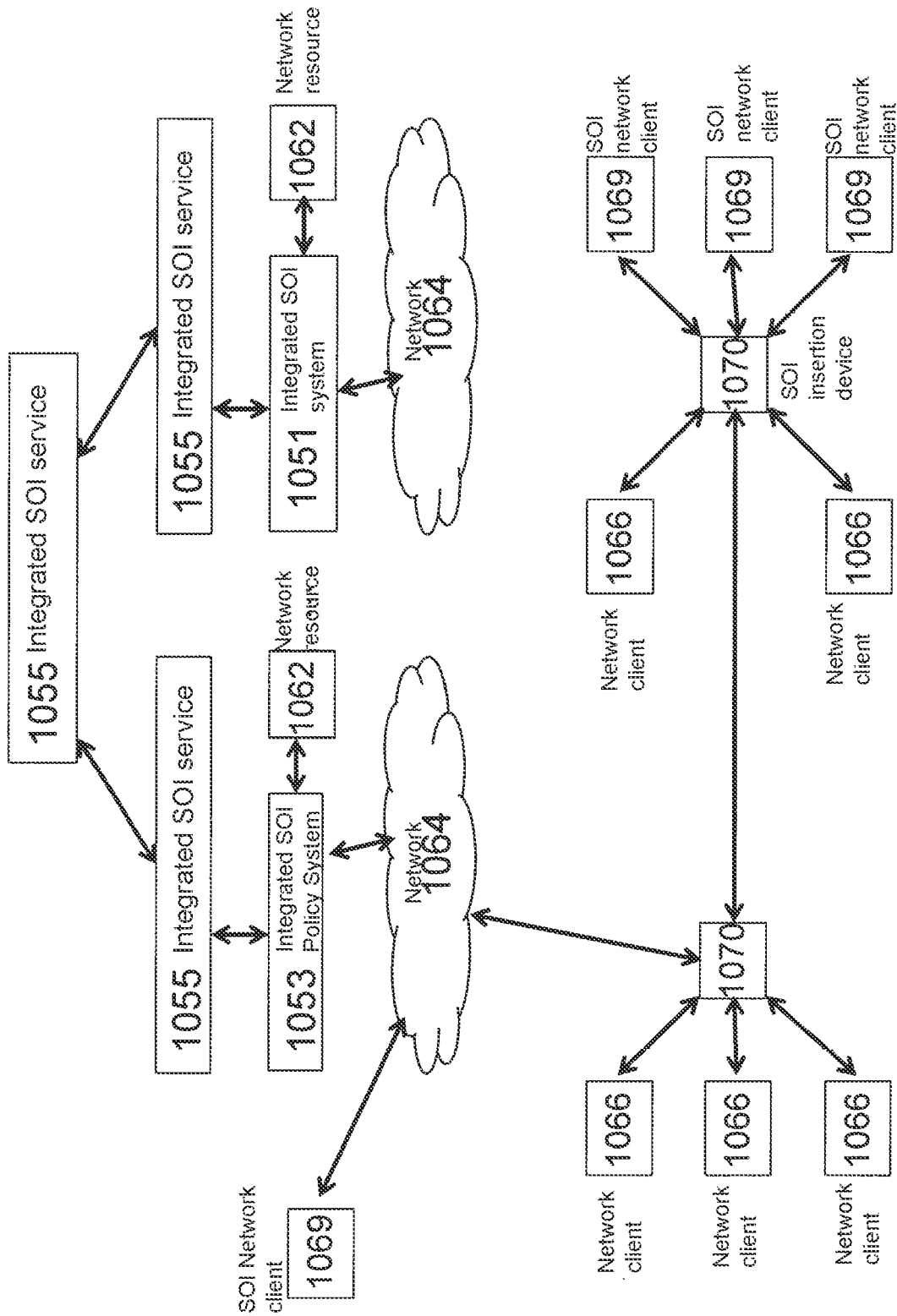
FIG. 63 is an illustration which shows an alternate system of SOI devices.

FIG. 63 is an illustration of an alternate embodiment of an SOI system. An SOI network client 1069 is connected to a network 1064. Other SOI network clients 1069 are connected through a SOI insertion device 1070. A SOI insertion device 1070 is connected to a second SOI insertion device 1070. A series of network client 1066 are connected to SOI insertion devices 1070. The networks 1064 are connected to a series of integrated SOI systems 1051 and integrated SOI policy systems 1053. The integrated SOI systems 1051 and the integrated SOI policy systems are connected to a series of integrated SOI policy services 1055.

XVI. Statistical Object Identification System Operation

The SOI systems presented here operate on the principle that original objects 1012S that are known to both an SOI network client 1069 or an SOI insertion device 1070 and an integrated SOI policy service 1040 or an SOI resolution service 1046. All other information, including the source address of an SOI network client 1069 or a network client 1066, the state of synchronization of a clock 1047 within an SOI network client 1069 or an SOI insertion device 1070 and knowledge of secure, shared keying material are presumed to be unknown. Furthermore, it is expected that all services contained within integrated SOI systems 1051, integrated SOI policy systems 1053 and integrated SOI service 1055 are protected against discovery, attack and compromise and thus require a secure, measured approach to obtaining this unknown information which is required for proper SOI operation. Operating an SOI system has up to three phases for each original object. These three phases of operation are bootstrap keying, object activation and statistical object identification.

The objective of the first phase of operation, bootstrap keying, is to provide a set of statistical objects 1014S to an SOI network client 1069 or an SOI insertion device 1070 to enable the authenticated accessing of the object activation service 1050. During the bootstrap keying phase, a bootstrap keying agent 1045 communicates with a bootstrap keying service 1044. During this communications, the bootstrap keying agent I 045 sends an original object 101 2S to the bootstrap keying service 1044. The bootstrap keying service 1044 responds by sending a set of statistical objects 1014S to the bootstrap keying agent 1045 to use in the object activation phase. The communication between the bootstrap keying agent 1045 and the bootstrap keying service 1044 must be secure and private, so that an eavesdropper cannot obtain the statistical objects 1014S. In a preferred embodiment, the Internet Engineering Task Force (IETF) protocol Internet Key Exchange version 2 (IKEv2) is used to provide bootstrap keying. Once bootstrap keying has been completed, operation moves to the second phase, object activation. The objective of the object activation phase is to provide an SOI network client 1069 or an SOI insertion device 1070 with the necessary information to generate statistical objects 1014S from original object 1012S such that the statistical objects 1014S will be resolved by an integrated SOI system 1051 or an SOI resolution service 1046. During the object activation phase, an object activation agent 1048 communicates with an object activation service 1050. During this communication, the object activation agent 1048 sends one or more original objects 1012S, metadata associated with the original objects 1012S and the time from a clock 1047 local to the SOI network client 1069 or SOI insertion device 1070 to the object activation service 1050.

The object activation service 1050 responds 1044 sending a set of keying information 1061 and expiration criterion 1063 to the object activation agent 1048. The keying information 1061 provided to the object activation agent I 048 includes a clock offset. This is used to provide synchronization between the clock 1047 that is local to the SOI network client 1069 or SOI insertion device 1070 and the clock 1047 that is local to the integrated SOI system 1051 or the SOI resolution service 1046. This is necessary because many clocks in networking and computing devices lack the ability to maintain high degrees of accuracy over long periods of time. In the present disclosure, the clocks are synchronized during the object activation phase and must only remain in synchronization until the provided expiration criterion is met. In a preferred embodiment, the expiration criterion should be met before the clocks lose synchronization due to clock drift. The synchronized clock is used as an input to the hashing algorithm that is used to generate statistical object 1014S.

The keying information 1061 provided to the object activation agent 1048 also includes a session key. This session key is used as an input to the hashing algorithm that is used to generate statistical objects 1014S. The use of session keys eliminates the need to securely store keys. When an SOI network client 1069 or an SOI insertion device 1070 is powered off, or if the link fails connecting to the network 1064, then the session key is lost and the SOI network client 1069 or SOI insertion device 1070 must perform object activation again to obtain a new session key.

The keying information 1061 provided to the object activation agent 1048 also includes an asynchronous clock reset value. This asynchronous clock reset value is used as an input to the hashing algorithm that is used to generate statistical objects 10 1 4S. The use of an asynchronous clock reset value eliminates the need for a high frequency clock. Higher frequency clocks can be more difficult to synchronize. Using an asynchronous clock with a reset value enables statistical objects 10 1 4S to be generated at a rate greater than the clock frequency while still maintaining unique statistical objects 1014S. On each tick of the synchronized clock 1047, the asynchronous clock is set to the asynchronous clock reset value. Whenever a statistical object is generated, the synchronous clock is incremented. In this way, the combination of the synchronized clock and the asynchronous clock will always result in a unique value.

When the object activation agent 1048 communicates original objects 1012S to the object activation service 1050, the object activation agent 1048 may also communicate metadata associated with the original object 1012S. This metadata may be geophysical information, biometric information, application metadata or any other metadata that an object activation service 1050 may use in its activation process. The object activation service 1050 may be presented with more than one original object 1012S from the object activation agent 1048. The keying information I 061 associated with the original object 1012S is provided at the discretion of the object activation service 1050. The object activation service 1050 may provide keying information 1061 for only a subset of the original objects 1012S or the object activation service 1050 may not provide keying information 1061 for any of the original objects 1012S. The object activation service 1050 may have policies or rules that govern what original objects 1012S or original objects 1012S and their associated metadata will be given keying information 1061. These policies or rules can be as simple as "IF the original object is Ben THEN provide keying information" or they can be more complex such as "IF the original object is Ben and the associated metadata indicates that Ben is in California THEN provide keying information" or "IF the original object is Ben and the associated metadata indicates that the requesting application is Email THEN provide keying information". A single original object 1012S with multiple metadata associations may be given multiple sets of keying information I 061 corresponding to the different metadata associations.

The communication between the object activation agent 1048 and the object activation service 1050 must be secure and private, so that an eavesdropper cannot obtain the keying information 1061. In a preferred embodiment, the communications is secured by using Transport Access Control, which uses a statistical object 1014S to establish a TCP session between the object activation agent 1048 and the object activation service 1050. Once the TCP session has been established, a TLS session is established to provide privacy for the information. In a preferred embodiment, the original object 1012S provided during TLS session establishment should be the same original object that was provided during the bootstrap keying phase.

Once object activation has been completed, operation moves to the third phase, statistical object identification. As this point, an SOI network client 1069 or an SOI insertion device 1070 has the information necessary to generate statistical objects 10 1 4S and an integrated SOI system 1051 or an SOI resolution service 1046 has the same information, enabling them to resolve received statistical objects 1014S generated by an SOI network client 1069 or an SOI insertion device 1070 to the original objects 1012.S. An SOI system has two primary components, an SOI insertion policy service 1042 and an SOI policy service 1040. Both of these services can reside in a single device. The SOI insertion policy service 1042 is responsible for generating statistical objects 1014S from an original object 1012S and inserting the statistical object 1014S into a message 1068. The SOI policy service 1040 is responsible for receiving the message 1068, extracting the statistical object 1014S and using a local SOI resolution service 1046, performing statistical object identification to determine the original object 1012S.

The SOI resolution service 1046 operates as device 1010. When a statistical object 1014S is successfully resolved to an original object 1012S and the probability threshold value 1027 has been met, the original object 1012S is communicated to the SOI policy service 1040 where the original object 1012S used as a key to locate policy information 1060 in a policy table 1059. The policy information 1060 describes what to do with the message 1068. Common policies include forwarding the message 1068 to its intended destination, discarding the message 1068, or rewriting the message 1068 or its corresponding communications characteristics 1022. In a preferred embodiment, when the SOI resolution service 1046 cannot find a matching statistical object 1014M that matches the statistical object 1014S associated with the message 1068, then the original object 1012S associated with the message 1068 is a special original object called "the unknown object". The unknown object is communicated to the SOI policy service 1040 where it is used as a key to locate policy information 1060 in a policy table 1059. The policy information 1060 describes what to do with the message 1068.

In an alternate preferred embodiment, when the SOI resolution service 1046 cannot find a matching statistical object 1014M that matches the statistical object 1014S associated with the message 1068, the SOI resolution service 1046 sends the message 1068 and the associated statistical object 1014S to a second SOI resolution service 1049. The entire message 1068 is sent so that the SOI resolution service 1046 can operate statelessly with respect to the message 1068. The second SOI resolution service 1049 operates as device 1010. The second SOI resolution service 1049 receives the message 1068 and the associated statistical object 1014S and performs statistical object identification. When a statistical object 1014S is successfully resolved to an original object 1012S and the probability threshold value 1027 has been met, the original object 1012S, the associated message 1068, keying information 1061, policy information 1060 and expiration criterion are all communicated to the SOI resolution service 1046. The SOI resolution service 1046 received the information and generates statistical objects 1014S until the expiration criterion 1063 is met. The original object 1012S, the message 1068 and policy information 1060 is communicated to the SOI policy service 1040 where the policy information 1060 is placed in the policy table 1059. The message 1068 is processed in accordance with the policy information 1060. Subsequent messages 1068 with statistical objects 1014S generated from the same original object 1012S will be processed solely by the SOI resolution service 1046 until the expiration criterion 1063 is met and this process does not require the assistance of the second SOI resolution service 1049. In this way, a local instance of an SOI resolution service 1046 can learn original objects 1012S and their associated keying information 1061, their associated policy information 1060 and their expiration criterion 1063. This process can also be extended with additional levels of SOI resolution services 1046.

The SOI system is vulnerable to brute force attacks unless defenses are made to detect and mitigate them. A brute force attack on SOI is when an attacker generates a large number of statistical objects 1014S in an attempt to guess a valid statistical object. In the present disclosure, a statistical object can only be tested for validity by presenting it to an SOI resolution service 1046. Although the statistical objects 1014S are generated with a timing component that enables then to be automatically expired, multiple attempts to guess a valid statistical object 1014S can still be made, with sophisticated attackers generating hundreds of thousands or millions of attempts per second. To combat this, in a preferred embodiment, the SOI resolution service 1046 maintains a count of failed statistical object resolutions and the communications characteristics 1022 associated with each failed resolution. When the number of failed resolutions exceeds a threshold, then an entry containing the communications characteristics 1022 is made in a dynamic blacklisting table 1056. The dynamic blacklisting table 1056 is used by the SOI policy service 1040 and is queried first. If the communications characteristics 1022 associated with a received message 1068 match an entry in the dynamic blacklisting table 1056, then the message is discarded before any additional work is performed. Each entry in the dynamic blacklisting table 1056 has an expiration criterion 1063. When the expiration criterion is met, then the entry is removed from the dynamic blacklisting table 1056. The expiration criterion 1063 should insure that all statistical object 1014S in the plurality of statistical objects 1014P have aged out before the expiration criterion 1063 is met. New entries to the dynamic blacklisting table 1056 should be communicated to all integrated SOI system 1051 and integrated SOI policy system 1053 entities.

An SOI insertion policy service 1042 is used by an SOI network client 1069 and an SOI insertion device 1070. In an SOI network client 1069, the SOI policy insertion service 1042 operates on the same device as the computer application 1065. An SOI network client 1069 generally presents a single original object 1012S during object activation, but may present multiple associated metadata relationships, which may result in multiple sets of keying information 1061. The SOI policy insertion service 1042 in an SOI network client 1069 only performs object activation and statistical object identification for itself and does not generate statistical objects on behalf of network clients 1066. In an SOI insertion device 1070, the policy insertion service 1042 operates on a separate device, logical or physical, as the computer application 1065. The SOI policy insertion service 1042 in an SOI insertion device 1070 performs object activation and SOI on behalf of other network clients 1066.

The object activation agent 1045 of an SOI network client 1069 may communicate metadata in addition to communicating an original object 1012S to the object activation service 1050. In response, the object activation service 1050 communicates sets of keying information 1061 and expiration criterion 1063 to the object activation agent 1045. Subsequently, when the computer application 1065 in an SOI network client 1069 attempts to communicate with a network resource 1062 by sending a message 1068, the SOI insertion policy service 1042 intercepts the message 1068, generates a statistical object 1014S based on the keying information 1061 provided to the object activation agent 1045 and inserts the statistical object 1014S into the message 1068. The message 1068 is then forwarded to the network resource 1062. If the object activation agent 1045 sent metadata to the object activation service 1050, the SOI insertion policy service 1042 must select the appropriate keying information 1061 when generating the statistical object 101 4S. For example, if the object activation agent 1045 uses a certificate showing the Identity of "Ben" as the original object 10 1 2S and also sends a list of application signatures as metadata components associated with the original object 1012S to the object activation service 1050 as follows:

| Index | Application | Signature |
|-------|-------------|-----------|
| 1 | email | application signature 1 |
| 2 | email | application signature 2 |
| 3 | Facebook | application signature 3 |

The object activation service 1050 may return a set of keying information 1061, with each element of the set being associated with a different metadata components as follows:

| Index | Keying Information |
|-------|-------------------|
| 1 | keying information 1 |
| 2 | keying information 2 |
| 3 | no keying information |

With this keying information 1061, and the computer application 1065 being "safari", when a message 1068 is received by the SOI policy insertion service 1042, the SOI policy insertion service 1042 will determine that the computer application 1065 that sent the message 1068 was "safari" and will then generate a statistical object 1014S based on the keying information 1061 "keying information 2". This enables an integrated SOI system 1051 or an integrated SOI policy system 1053 to determine that the message 1068 was sent by "Ben" using the application "safari". When an SOI insertion device 1070 is used in place of an SOI network client 1069, the SOI insertion device 1070 must be able to associate communications characteristics 1022 with an original object 10 1 2S before being able to generate a statistical object 1014S. When a network client 1066 sends a message 1068 to a network resource 1062, it is received by an SOI insertion device 1070. The communications characteristics 1022 associated with the received message 1068 are compared to entries in an insertion object table 1057 by the SOI policy insertion service 1042. If a matching entry is found, the corresponding keying information 1061 is used by the SOI policy insertion service 1042 to generate a statistical object 1014S and the statistical object 1014S is inserted into the message 1068 which is forwarded to the network resource 1062. The provisioning of entries of communications characteristics 1022 and associated keying information 1061 in the insertion object table 1057 can be accomplished manually or statically or can be automated and self-learning. In a preferred embodiment, when a message 1068 with associated communications characteristics 1022 is received by an SOI policy insertion service 1042 and the communications characteristics 1022 do not match any entries in the insertion object table 1057, the SOI policy insertion service 1042 can query an external service, using the communications characteristics 1022 as the query key. The external service may return an original object 1012S associated with the communications characteristics 1022. For example, for networks using IEEE 802.1x port authentication, the source MAC address may be used as the query key and the external service would return the authenticated identity associated with the source MAC address. Once the SOI policy insertion service 1042 has received an original object 1012S from the external service, an object activation agent 1048 will communicate the original object 1012S to an object activation service 1050, which may return keying information 1061 and expiration criterion 1063 back to the object activation agent 1048. This information is added to the insertion object table 1057. Periodically, the insertion object table 1057 must be checked to determine if any of the expiration criterion 1063 has been satisfied and if so, the entry corresponding to the satisfied expiration criterion is removed from the insertion object table 1057.

CONCLUSION

Although the present disclosure has been described in detail with reference to one or more preferred embodiments, persons possessing ordinary skill in the art to which this disclosure pertains will appreciate that various modifications and enhancements may be made without departing from the spirit and scope of the claims that follow. The various alternatives for providing an efficient means for peer authentication that have been disclosed above are intended to educate the reader about preferred embodiments of the disclosure, and are not intended to constrain the limits of the disclosure or the scope of Claims.

The List of Reference Characters which follows is intended to provide the reader with a convenient means of identifying elements of the disclosure in the Specification and Drawings. This list is not intended to delineate or narrow the scope of the Claims.

LIST OF REFERENCE CHARACTERS

| | |
|---|---|
| A | Airport Perimeter |
| B | Cargo Truck |
| C | Road to Airport Cargo Security Building |
| D | Airport Cargo Security Building |
| E | Road to Cargo Truck Authentication Building |
| F | Cargo Truck Authentication Building |
| G | Road to Airport Cargo Area |
| H | Airport Cargo Area |
| J | Path of Truck Entering Airport Perimeter traveling to Airport Cargo Security Building |
| K | Path of Truck Traveling from Airport Cargo Security Building to Cargo Truck Authentication Building |
| L | Path of Truck Traveling from Cargo Truck Authentication Building to Airport Cargo Security Building |
| M | Path of Truck Traveling from Airport Cargo Security Building to Airport Cargo Area Cargo Building |
| N | Security Officer |
| P | Security Camera |
| Q | Security Monitor |
| R | Image |
| S | Door Unlock Signal |
| T |  |
| 10 | Network endpoint device |
| 11 | Remote network device |
| 12 | IP packet |
| 14 | TCP header |
| 16 | TCP SYN bit |
| 18 | Authentication device |
| 20 | Network |
| 22 | Identity |
| 24 | Peering Service |
| 25 | Identity Recognizer |
| 26 | Policy rule |
| 27 | First table of policy rules |
| 28 | Session descriptor |
| 30 | Authenticated session table |
| 32 | TCP/IP protocol stack |
| 36 | Second table of policy rules |
| 42 | Logging device |
| 44 | Peer authentication management application |
| 46 | Peer authentication driver |
| 48 | Network device driver |
| 49 | Network interface |
| 50 | Log information |
| 100 | Flowchart 1, Step 1 |
| 102 | Flowchart 1, Step 2 |
| 104 | Flowchart 1, Step 3 |
| 106 | flowchart 1, Step 4 |
| 108 | Flowchart 1, Step 5 |
| 110 | Flowchart 1, Step 2a |
| 112 | Flowchart 1, Step 3a |
| 114 | Flowchart 1, Step 4a |
| 116 | Flowchart 2, Step 1 |
| 118 | Flowchart 2, Step 2 |
| 120 | Flowchart 2, Step 3 |
| 122 | Flowchart 2, Step 4 |
| 124 | Flowchart 2, Step 5 |
| 126 | Flowchart 2, Step 6 |
| 128 | Flowchart 2, Step 3a |
| 130 | Flowchart 2, Step 5a |
| 132 | Flowchart 3, Step 1 |
| 134 | Flowchart 3, Step 2 |
| 136 | Flowchart 3, Step 3 |
| 138 | Flowchart 3, Step 4 |
| 140 | Flowchart 4, Step 1 |
| 142 | Flowchart 4, Step 2 |
| 144 | Flowchart 4, Step 3 |
| 146 | Flowchart 4, Step 4 |
| 148 | Flowchart 4, Step 3a |
| 150 | Flowchart 5, Step 1 |
| 152 | Flowchart 5, Step 2 |
| 1010 | Device (Remote System) |

LIST OF REFERENCE CHARACTERS

| | |
|---|---|
| 1012M | Matched Original Object |
| 1012P | Plurality of Original Objects |
| 1012S | Original Object |
| 1012SEL | Selected Original Object |
| 1014A | Accumulated Statistical Object |
| 1014AP | Plurality of Accumulated Statistical Objects |
| 1014F | First Statistical Object |
| 1014M | Matching Statistical Object |
| 1014MA | Matching Accumulated Statistical Object |
| 1014MP | Plurality of Matching Statistical Objects |
| 1014NA | New Accumulated Statistical Object |
| 1014P | Plurality of Statistical Objects |
| 1014S | Statistical Object |
| 1016 | Communications Receiver |
| 1018 | Statistical Object Matcher |
| 1020 | Accumulated Statistical Object Selector |
| 1022 | Communications Characteristics |
| 1024 | Associated Original Object Selector |
| 1026 | Original Object Identifier |
| 1027 | Probability Threshold Value |
| 1028 | Associated Original Object Identifier |
| 1030 | Probability Calculator |
| 1032 | Threshold Comparator |
| 1034 | Indication |
| 1036 | Calculated Probability (All components from 1012M to 1036 are included in device 1010). |
| 1040 | SOT Policy Service |
| 1042 | SOI Insertion Policy Service |
| 1044 | Bootstrap Keying Service |
| 1045 | Bootstrap Keying Agent |
| 1046 | SOI Resolution Service |
| 1047 | Clock |
| 1048 | Object Activation Agent |
| 1049 | Second SOI Resolution Service |
| 1050 | Object Activation Service |
| 1051 | Integrated SOI System |
| 1052 | Identity Management System |
| 1053 | Integrated SOI Policy System |
| 1055 | Integrated SOI Services |
| 1056 | Dynamic Blacklisting Table |
| 1057 | Insertion Object Table |
| 1059 | Policy Table |
| 1060 | Policy Information |
| 1061 | Keying information |
| 1062 | Network Resource |
| 1063 | Expiration Criterion |
| 1064 | Computer Network |
| 1065 | Computer Application |
| 1066 | Network Client |
| 1067 | Network Interface |
| 1068 | Message |
| 1069 | SOI Network Client |
| 1070 | SOI Insertion Device |

What is claimed is:

1. An apparatus for authenticating an identity of network traffic using a network endpoint device (10), the network endpoint device (10) having a hardware processor, comprising:
said network endpoint device (10),
said network endpoint device (10) including a TCP/IP protocol stack (32) and an authenticated session table (30),
said network endpoint device (10) also for receiving an IP packet (12),
said IP packet (12) including a TCP header (14),
said TCP header (14) not including a TCP SYN bit (16),
said authenticated session table (30) for matching said IP packet (12) to a session descriptor (28),
said network endpoint device (10) also for conveying said IP packet (12) to said TCP/IP protocol stack (32); and
an authentication device (18),
said authentication device (18) including a network interface (49) and a peering service (24),
said peering service (24) including an identity recognizer (25) and a first table of policy rules (27),
said authentication device (18) for performing authentication,
said authentication device (18) for creating information to be conveyed to said network endpoint device (10) and stored in said session descriptor (28),
said authentication device (18) using statistical object identification to perform authentication,
said statistical object identification process requiring an exact match of said statistical object being evaluated,
an accumulated statistical object produced by said statistical object identification process,
said statistical object identification process calculating a probability of guessing said accumulated statistical object, and
said statistical object identification process requiring said calculated probability to exceed a threshold.

2. The apparatus as recited in claim 1, further comprising:
said authentication device (18) using transport access control to perform authentication.

3. The apparatus as recited in claim 1, wherein
said network endpoint device (10) is adapted to receive said IP packet (12), to select a matching policy rule (26) that matches some portion of said IP packet (12) from a second table of policy rules (36), and to apply said policy rule (26) to said IP packet (12).

4. The apparatus as recited in claim 1, wherein
said network endpoint device (10) is adapted to receive said IP packet (12), to select a policy rule (26) that matches said network interface (49) information from a second table of policy rules (36), and to apply said policy rule (26) to said IP packet (12).

* * * * *